(12) United States Patent
Ananth

(10) Patent No.: US 7,103,181 B2
(45) Date of Patent: *Sep. 5, 2006

(54) STATE-VARYING HYBRID STREAM CIPHER

(75) Inventor: Viswanath Ananth, Valencia, CA (US)

(73) Assignee: Mainstream Encryption, Los Angeles, CA (US)

( * ) Notice: Subject to any disclaimer, the term of this patent is extended or adjusted under 35 U.S.C. 154(b) by 595 days.

This patent is subject to a terminal disclaimer.

(21) Appl. No.: 09/904,962

(22) Filed: Jul. 13, 2001

(65) Prior Publication Data

US 2002/0176572 A1 Nov. 28, 2002

Related U.S. Application Data

(63) Continuation of application No. 09/846,042, filed on May 22, 2001, now Pat. No. 7,003,107.

(60) Provisional application No. 60/206,605, filed on May 23, 2000.

(51) Int. Cl.
*H04K 1/00* (2006.01)
*H04L 9/22* (2006.01)

(52) U.S. Cl. .................... 380/37; 380/29; 380/43; 380/44; 380/46

(58) Field of Classification Search ............. 380/37, 380/42–44, 46
See application file for complete search history.

(56) References Cited

U.S. PATENT DOCUMENTS

| | | | |
|---|---|---|---|
| 4,316,055 A | 2/1982 | Feistel | |
| 4,613,901 A | 9/1986 | Gilhousen et al. | |
| 4,953,208 A | 8/1990 | Ideno | |
| 5,020,106 A | 5/1991 | Rabold et al. | |
| 5,195,136 A | 3/1993 | Hardy et al. | |
| 5,509,073 A | 4/1996 | Monnin | |
| 5,590,194 A | 12/1996 | Ryan | |
| 5,621,799 A | 4/1997 | Katta et al. | |
| 5,673,319 A | 9/1997 | Bellare et al. | |
| 5,727,062 A | 3/1998 | Ritter | |
| 5,822,432 A * | 10/1998 | Moskowitz et al. | .......... 380/28 |
| 5,825,879 A | 10/1998 | Davis | |
| 5,852,472 A | 12/1998 | Prasad et al. | |
| 5,862,150 A | 1/1999 | Lavelle et al. | |
| 5,940,509 A | 8/1999 | Jovanovich et al. | |
| 5,963,646 A * | 10/1999 | Fielder et al. | .............. 380/259 |
| 6,005,940 A | 12/1999 | Kulinets | |
| 6,061,449 A | 5/2000 | Candelore et al. | |
| 6,122,379 A * | 9/2000 | Barbir | ........................ 380/269 |

(Continued)

FOREIGN PATENT DOCUMENTS

EP 0599366 A1 11/1993

(Continued)

OTHER PUBLICATIONS

Stallings, William; Cryptography and Network Security; Jun. 4, 1998; Prentice-Hall, Inc.; 2$^{nd}$ Edition; pp. 299-319.*

(Continued)

*Primary Examiner*—Gilberto Barron, Jr.
*Assistant Examiner*—Jung Kim
(74) *Attorney, Agent, or Firm*—Blakely Sokoloff Taylor & Zafman, LLP

(57) ABSTRACT

In one embodiment, a state-varying hybrid stream cipher operating within a computing device. The state-varying hybrid stream cipher comprises at least two software routines. A first routine is responsible for dividing incoming plain text into variable-sized blocks. A second software routine is for converting the plain text into cipher text based on an encryption key, an internal identifier and perhaps a percentage of random data value.

18 Claims, 41 Drawing Sheets

U.S. PATENT DOCUMENTS

| | | | |
|---|---|---|---|
| 6,154,541 A * | 11/2000 | Zhang | 380/28 |
| 6,167,136 A | 12/2000 | Chou | |
| 6,192,129 B1 * | 2/2001 | Coppersmith et al. | 380/259 |
| 6,212,635 B1 * | 4/2001 | Reardon | 713/165 |
| 6,243,470 B1 * | 6/2001 | Coppersmith et al. | 380/259 |
| 6,490,353 B1 * | 12/2002 | Tan | 380/37 |

FOREIGN PATENT DOCUMENTS

| | | |
|---|---|---|
| WO | WO96/06504 | 8/1995 |
| WO | WO99/19822 | 9/1998 |
| WO | WO99/18729 | 10/1998 |
| WO | WO01/17251 A1 | 8/2000 |

OTHER PUBLICATIONS

Schneier, Bruce; Applied Cryptography; 1996; John Wiley & Sons, Inc.; chapter 24.*

Schneier, Bruce; Applied Cryptography; 2$^{nd}$ Edition; 1996; John Wiley & Sons Inc.; Chapter 8.*

Heys, H., "Delay Characteristics of Statistical Cipher Feedback Mode," IEEE May 2001, 0-7803-7080, pp. 5-9.

Simmons, G., "Symmetric and Asymmetric Encryption," Computing Surveys, vol. 11, No. 4, Dec. 1979, pp. 305-330.

"High-bandwith Digital Content Protection System," Rev. 1.0, Feb. 17, 2000, Digital Content Protection LLC, ISBN 0-9675129-4-8, pp. 4-59.

Schneier, B., "Applied Cryptography: protocols, algorithms, and source code in C," Second Edition, Library of Congress, Copyright 1996, Chapters 2-6 and 12-17.

* cited by examiner dom data.# STATE-VARYING HYBRID STREAM CIPHER

This is a continuation of U.S. patent application Ser. No. 09/864,042, filed May 22, 2001, which has now matured to U.S. Pat. No. 7,003,107, which was based on U.S. Provisional Patent Application No. 60/206,605, filed May 23, 2000.

FIELD

The invention relates to the field of cryptography. In particular, one embodiment of the invention relates to a state-varying hybrid stream cipher for encrypting and decrypting data.

GENERAL BACKGROUND

As communications over public networks evolve, secure data communications between different computing devices have become increasingly important. Without security, any interloper can obtain access to data being transmitted. With security, however, the data can be protected from unauthorized access. In order to accomplish secure data communications, various encryption/decryption functions have been developed.

In general, there are two common types of encryption/decryption schemes. The first scheme involves symmetric cryptography while the second scheme involves asymmetric cryptography. For asymmetric cryptography, a key pair is utilized in which one key is used for encryption and the other key is used for decryption. However, computations involving asymmetric cryptographic algorithms are complex, which contributes to greater processing time and slower overall system performance. In contrast, symmetric cryptographic ciphers (referred to as "ciphers") utilize a single key for encryption and decryption operations. As a result, ciphers generally perform computations (e.g., encryption or decryption) faster than asymmetric cryptographic functions.

Normally, there are two types of ciphers, namely a stream cipher and a block cipher. One form of stream cipher, named "RC4," was developed by RSA Data Security, Inc. of Bedford, Mass. However, RC4 and other conventional stream ciphers suffer from a number of disadvantages. For example, RC4 is vulnerable to an attack if a portion of the plain text (original data) and its corresponding cipher text are known. The reason is that a pseudo-random data stream produced by a RC4 cryptographic engine is exclusively OR'ed with the plain text in order to produce the cipher text. Thus, the existence of an identifiable correlation between plain text and cipher text exposes the data produced from the stream cipher to cryptographic attack.

Another disadvantage is that the initial byte of the pseudo-random data stream generated by RC4 is correlated to bytes of the key. In effect, this correlation also exposes the data produced by RC4 to cryptographic attack.

A common feature of encryption is that a plain text maps uniquely to a cipher text for a known encryption key. Thus, if the same plain text is encrypted at a different time with the same encryption key, the same cipher text is generated. This allows an interloper to investigate any correlation between cipher text and plain text in efforts to predict further communications.

Thus, it would be very desirous to have a cipher that overcomes these and other disadvantages associated with RC4 and stream ciphers, and generate different cipher text sequences for the same plain text and a given key, and have all the different cipher text sequences decrypt to the plain text with the same key.

BRIEF DESCRIPTION OF THE DRAWINGS

The features and advantages of the invention will become apparent from the following detailed description of the invention in which.

DETAILED DESCRIPTION

Herein, the exemplary embodiments of the invention relate to a state-varying hybrid stream cipher for encrypting and decrypting data. The state-varying hybrid stream cipher may be implemented in hardware, software and/or firmware form and operating within a computing device. In particular, the state-varying hybrid stream cipher is configured as a stream cipher but the input data is segmented into random sized blocks consistent with block cipher technology. The combination of operations, as described below, provides additional features and greater security than RC4 and other current cipher technology. For instance, these additional features include, but are limited or restricted to the following:

1. Cipher text is dependent on the mapped plain text and a variable (TW). Thus, the actual encryption function uses a table lookup on the shuffled data in order to avoid a linear relationship between the plain text to be encrypted and the cipher text as generally shown in FIGS. 1A, 1B, 11B and 25.

Figure 1A:
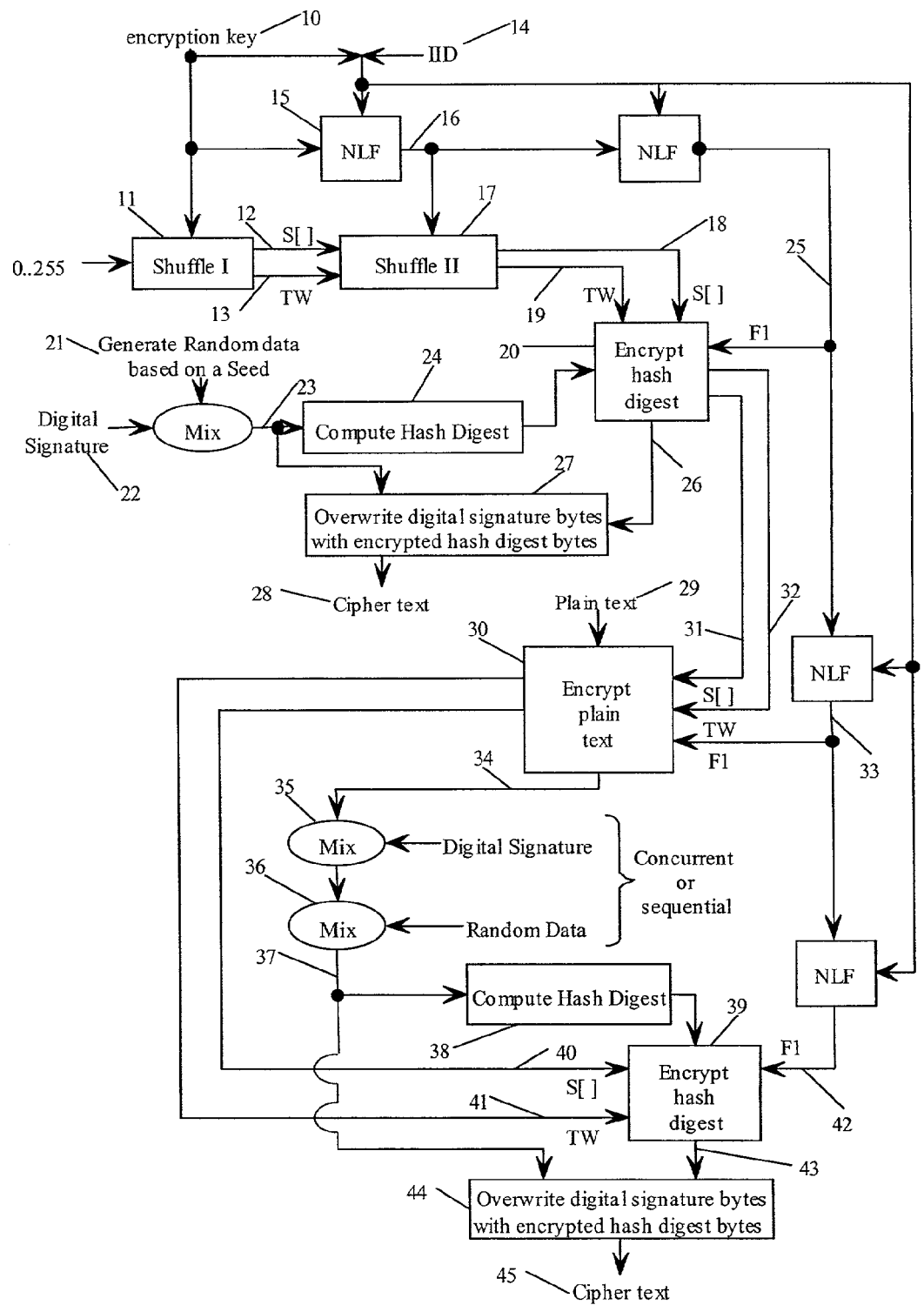
FIG. 1A is an exemplary embodiment of an overview of an encryption function for a state-varying hybrid stream cipher.
Figure 1B:
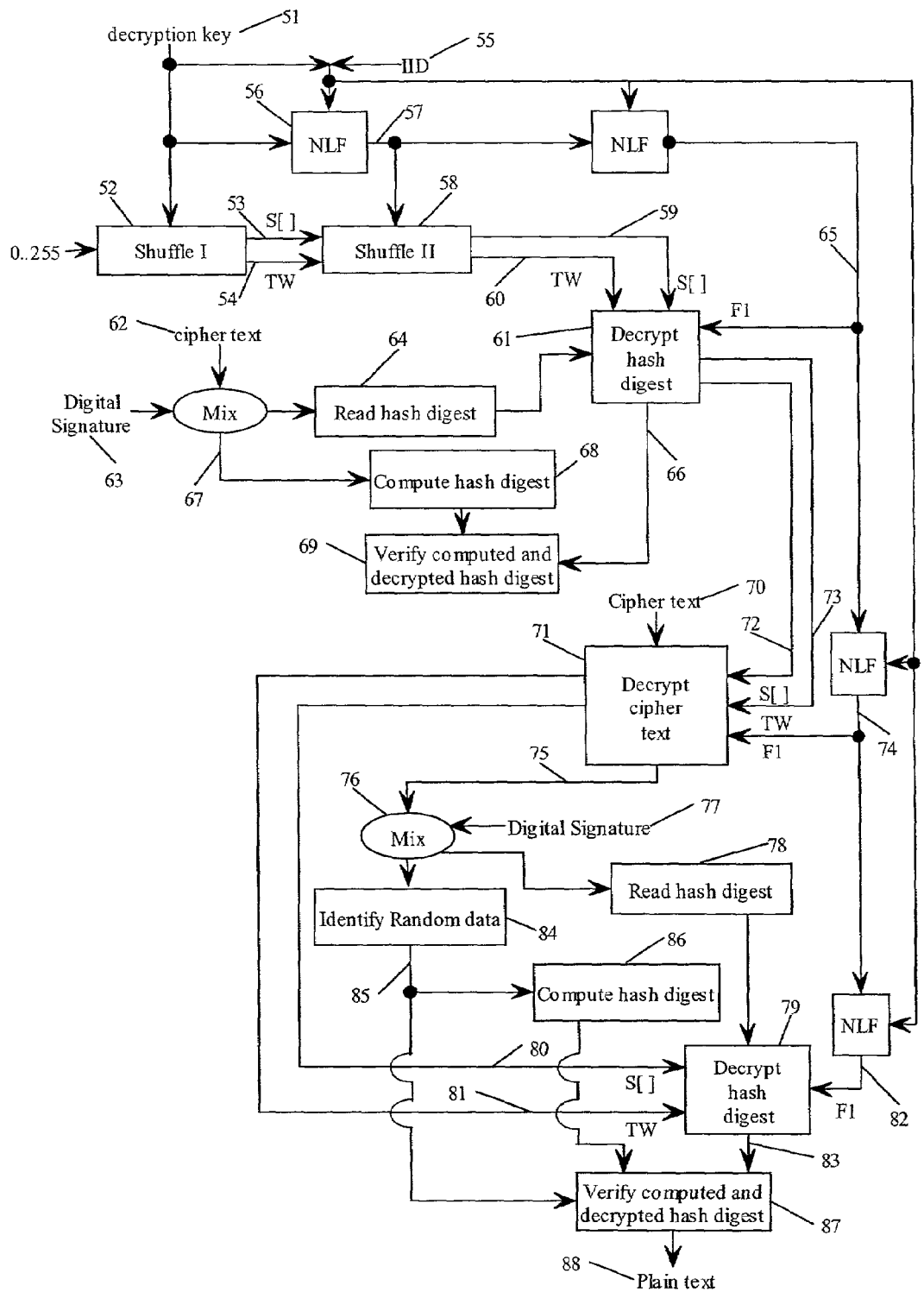
FIG. 1B is an exemplary embodiment of an overview of a decryption function for a state-varying hybrid stream cipher.

2. Encryption is performed using multiple length keys and an internal identifier (IID) as generally shown in FIGS. 1A and 1B.

3. The cipher text is computed based on the encryption key and the IID. The combination of the IID and an encryption key uniquely determines the values of the generated cipher text as generally shown in FIGS. 1A and 1B. As a result, even though the computing device actually sends the same plain text data to all destinations, each destination would receive different cipher text, which only the cipher at that location can decrypt. This allows as many distinct encryption schemes with the same cipher as there are combinations of the IID and the encryption key. In one embodiment, the user would manage the keys and application software, firmware or hardware of the computing device would manage the IID. Moreover, the value of the IID actually used is dependent on the encryption key and may be recalculated by a non-linear function for each new block of data.

4. The plain text is divided into variable-sized blocks. The size of each block is dependent on the encryption key, the IID and an output of the non-linear function. New block sizing is calculated at the completion of the current block. The range of block sizes is based on efficiency and security, where larger block sizes are more computationally efficient and provide enhanced security.

5. The decryption is performed by an inverse table lookup in order to decrease processing time.

Figure 11A:
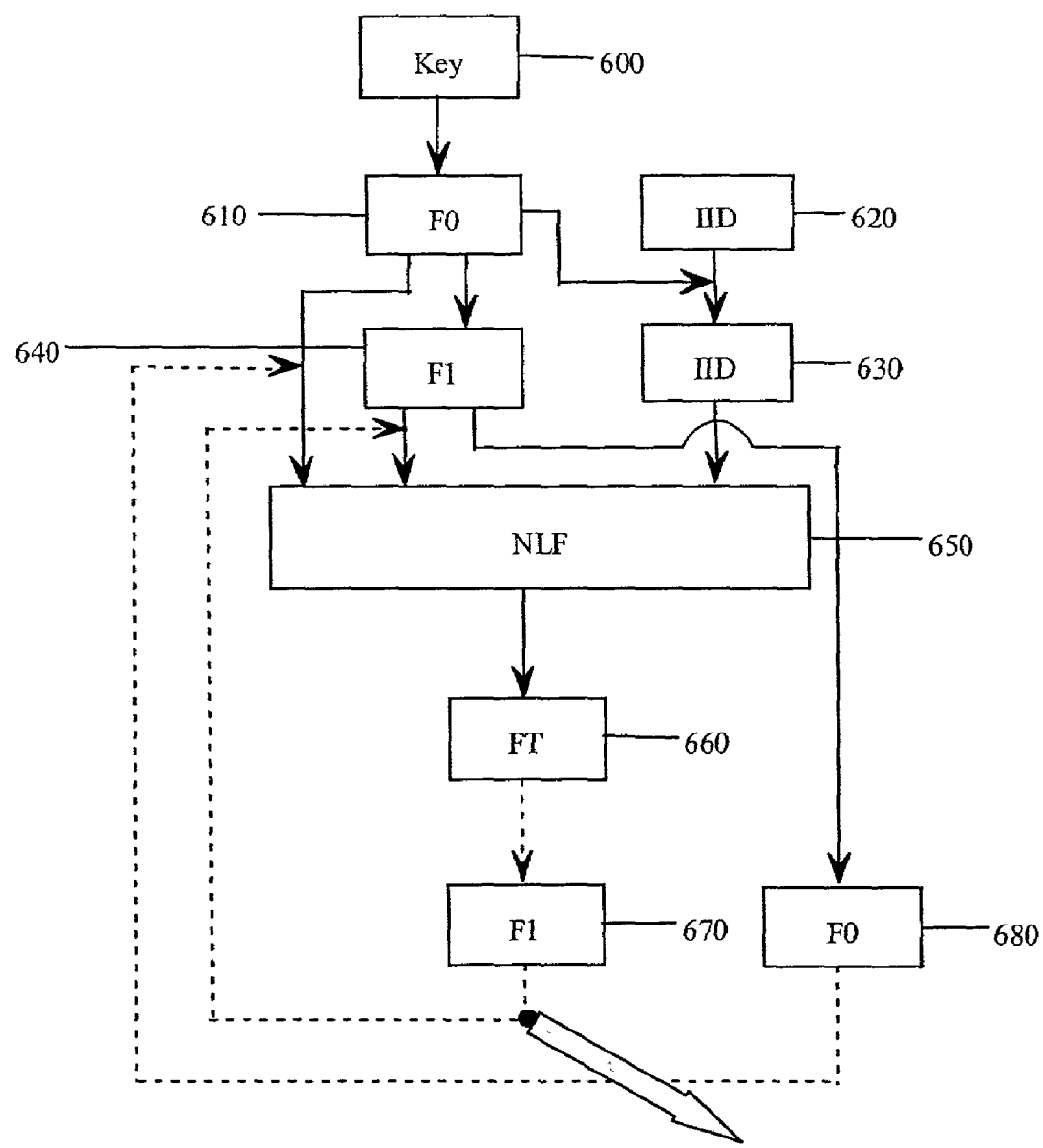
FIG. 11A is an exemplary embodiment of the non-linear function utilizing a variable F1 for the encryption and decryption functions.
Figure 11B:
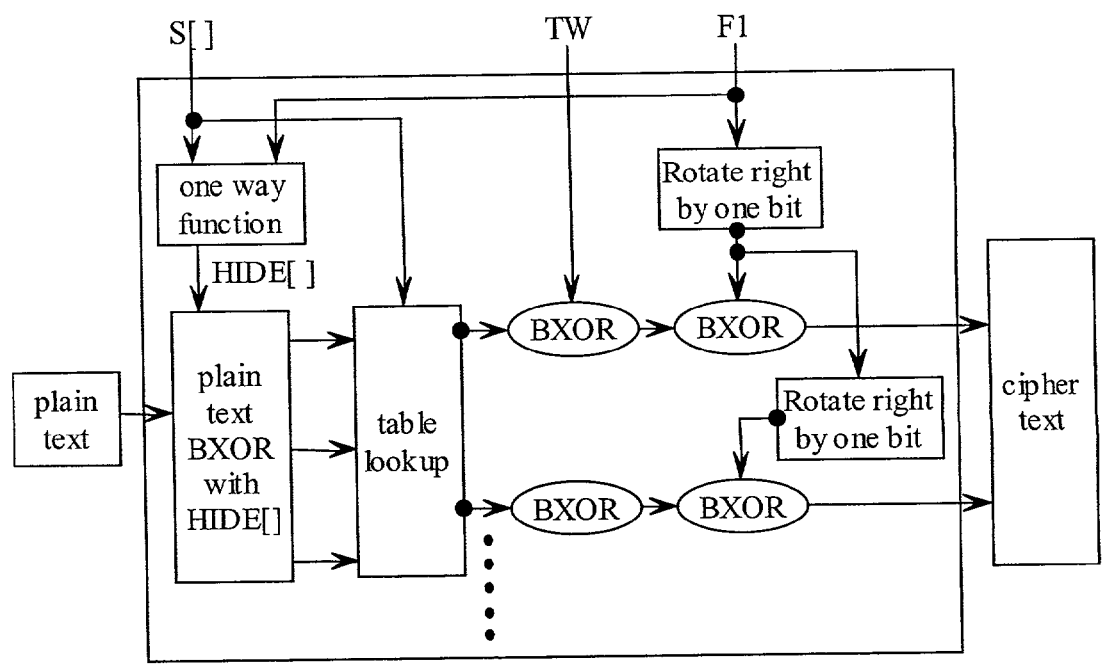
FIG. 11B is an exemplary embodiment of a core process of the encryption function.

6. The input plain text is mapped before undergoing encryption to ensure that the statistics of the plain text do not reflect the internal state of the computing device as generally shown in FIG. 11B. This feature enhances security over the complete encryption and decryption functions.

7. The initial shuffling of the table is affected if even one bit of the encryption or decryption key changes.

8. Random data may be inserted in the resultant cipher text to provide a variable data length as generally shown in FIGS. 1A and 1B. The amount of random data may be either (1) programmable by the user through selection of a percentage of random data elements per cipher text data elements or (2) static in nature (e.g., randomly set by the software, hardware or firmware at manufacture) or (3) automatic in nature (e.g., based on the encryption key, internal identification and the internal state of the computing device. The random data is interspersed randomly during generation of the cipher text and may be dependent on the value of the encryption key and the IID. Thus, the decryption function would need to use the same percentage of randomness in order to decipher and recover the plain text 9. A hash digest of the cipher text may be calculated, encrypted and distributed throughout the cipher text as generally shown in FIGS. 1A and 1B. The calculation of the hash digest is based on the cipher text and additional data, which may not be part of the cipher text or the pseudorandom data stream. This allows the insertion of a digital signature for enhanced security. The positions of the hash bytes in the cipher text are dependent on the IID and/or the encryption key. If no digital signature is included, the state-varying hybrid stream cipher may add its own digital signature based on the encryption key and IID. The added signature or sequence may be used as generated, modified or encrypted in the function as a concurrent or an additional operation in the function.

10. The cipher text data stream in the decryption process contains encrypted hash bytes distributed in the data stream. The encrypted hash bytes are copied into an array and decrypted, and the hash positions may be initialized with the digital signature used at the time of encryption. If no digital signature is included, the state-varying hybrid stream cipher may add its own digital signature based on the decryption key and IID. The hash digest of the data stream is then computed, and compared with the digest obtained from the data stream. If these digests match, the decryption process continues. Otherwise, the decryption process aborts enhancing security.

11. Cipher text generated is dependent on a key, the IID and an additional input possibly including random bytes, which may be generated in software/hardware or initialized by any other mechanism. For example, the additional input may include a time when the encryption process started. The key used at the time of encryption is used to decrypt the cipher text so that the additional input is not necessary for the decryption process. This invention thus enables the generation of variable cipher text for a given key and a given plain text, which greatly enhances security. The feature is achieved by the state-varying hybrid stream cipher that is shown generally in FIGS. 1A and 1B, and includes introducing a random data block at the beginning of the encryption process, which affects the internal state of the computing device "S[ ]", and thus the complete behavior of the system is modified.

12. The length of the cipher text generated changes when the encryption key, the IID, and the plain text sequence being encrypted are identical. This feature ensures that an interloper will be unable to correlate plain text with cipher text for a given encryption key.

13. An additional variation of the state-varying hybrid stream cipher can include the use of an additional pseudorandom generator or non-linear function to iterate the block sizes used in the encryption and decryption functions.

14. An additional variation of the state-varying hybrid stream cipher could include the use of statistical, non-uniform, non-linear, chaotic or may be fuzzy logic functions, or may be any mathematical function with or without modifications, and the like for the mixing process generally shown in FIGS. 1A and 1B.

Figure 25:
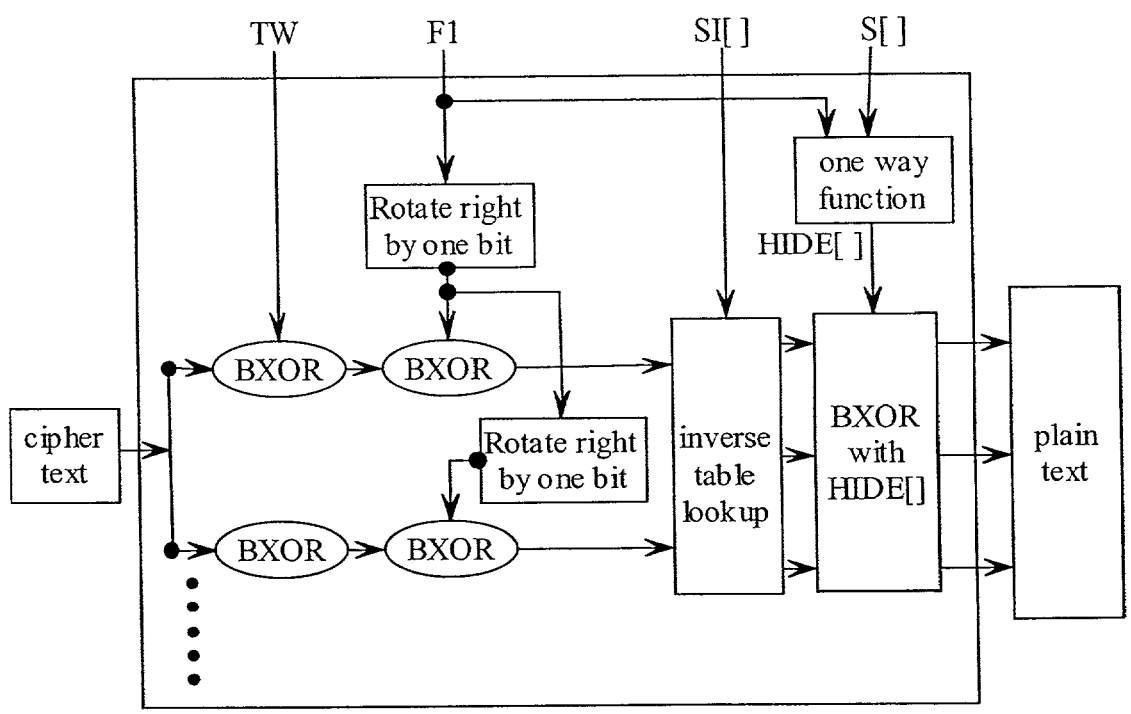
FIG. 25 is an exemplary embodiment of a core process of the decryption function.

15. An additional variation of the state-varying hybrid stream cipher could include the use of one-way functions, which may be hash functions, mathematical functions or even general functions with or without modifications, for mapping the plain text in the encryption as generally shown in FIG. 11B, or mapping the cipher text in the decryption process as generally shown in FIG. 25.

The embodiments described herein are not exclusive; rather, they merely provide a thorough understanding of the invention. Also, well-known circuits are not set forth in detail in order to avoid unnecessarily obscuring the invention.

In the following description, certain terminology is used to describe features of the invention. For example, a "cipher" is a function that is implemented in software, firmware and/or hardware and is responsible for encrypting and/or decrypting incoming data. The function may be based on a plurality of routines operating in cooperation with each other. The cipher may be processed by an electronic component implemented in any computing device such as, for example, a computer (e.g., server, desktop, laptop, hand held such as a personal digital assistant, mainframe, etc.) or computer peripheral, data transfer equipment (e.g., router, switch, brouter, etc.), television set-top box, wireless handset, a card form factor (e.g., smart card, circuit board, etc.), digital video disc (DVD) player, home appliances, security systems, and the like. In general, a "computing device" is any product employing an electronic component (e.g., an integrated circuit), or an opto-electronic component, or an optical component, and the like that processes data.

In addition, a "link" is broadly defined as one or more physical or virtual information-carrying mediums to establish a communication pathway. Examples of the medium include a physical medium (e.g., electrical wire, optical fiber, cable, bus trace, etc.) or a wireless medium (e.g., air in combination with wireless signaling technology). Thus, as a result, the invention could be applied to a variety of applications including wireless, point-to-point communication, virtual private networks, streaming video, secure music distribution and even financial network implementations.

A "data element" is one or more bits such as for example $2^N$ bits, where "N" is equal to 0 (single bit), 3 (byte), 4 (word), 5 (double word) and the like. The operators "&&" and "BXOR" are logical bit-wise AND and XOR operations, respectively. An internal identifier "IID" is an alphanumeric sequence that uniquely identifies a single source or a group. The contents or value of a variable/array as well as the variable/array themselves may be referenced similarly. For instance, PR may be used to denote the variable PR or the value (e.g., contents) associated with the variable PR. A "file" is generally considered herein as a collection of information in a selected format. Various types of files include code (e.g., source, object, executable), applications, applets, operating systems, a digital document (e.g., word processing, spreadsheet, etc.), an electronic mail (e-mail) message and the like.

I. Software Architecture of the State-Varying Hybrid Stream Cipher

Referring to FIG. 1A, an exemplary embodiment of an overview of an encryption function for a state-varying hybrid stream cipher is shown. An encryption key 10 is provided to a first shuffling routine 11 (described in FIG. 12), which permutes array S[ ] and outputs S[ ] 12 and a variable TW 13. The shuffling by the first shuffling routine 11 is performed to avoid any identifiable correlation for closely related encryption keys. Both the encryption key 10 and an internal identifier (IID) 14 are provided to a non-linear function (NLF) 15 to produce a result 16 that is input into a second shuffling routine 17. As shown in FIG. 13, the second shuffling routine 17 ensures that an internal state of the computing device, represented by a value of S[ ], is not dependent directly on the encryption key 10. The newly permuted values of S[ ] 18 and TW 19 are provided as inputs to an encryption function 20. Thus, for any change of the encryption key 10 or the IID 14, the permuted values of S[ ] 18 and TW 19 change.

Figure 3:
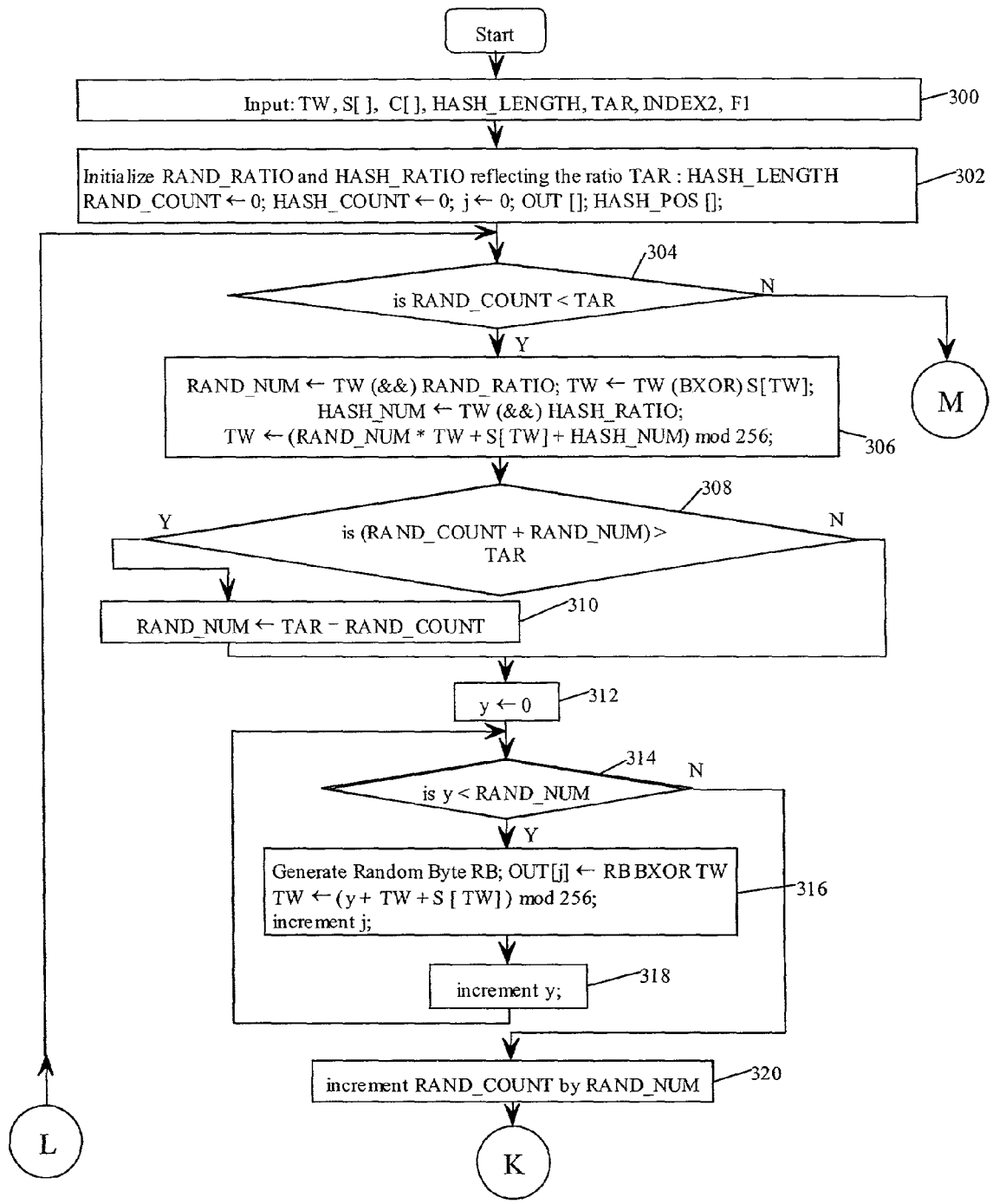
FIGS. 3 and 4A–4C are an exemplary embodiment of a first mixing routine for distributing hash bytes among random data.
Figure 4A:
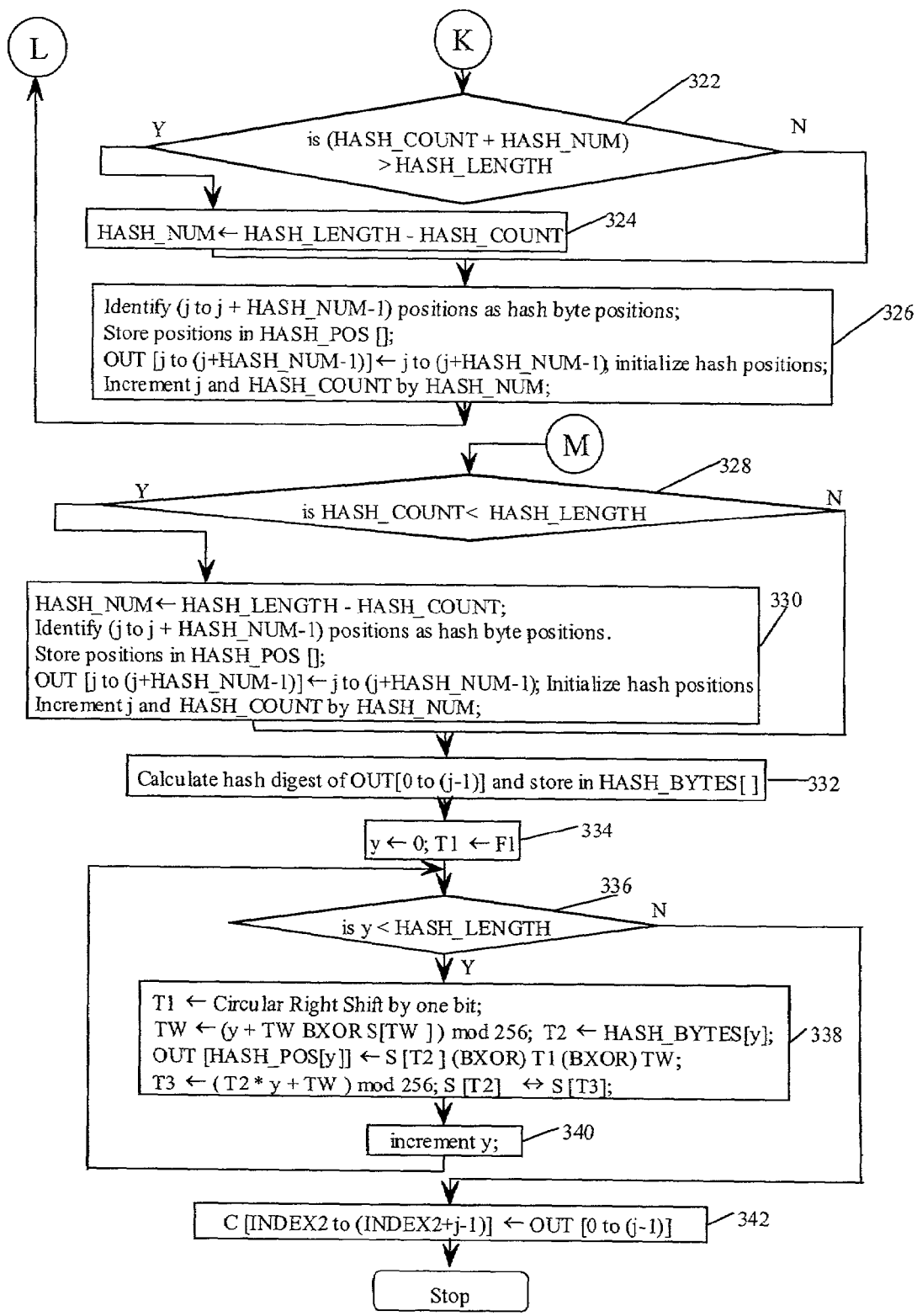
Figure 4B:
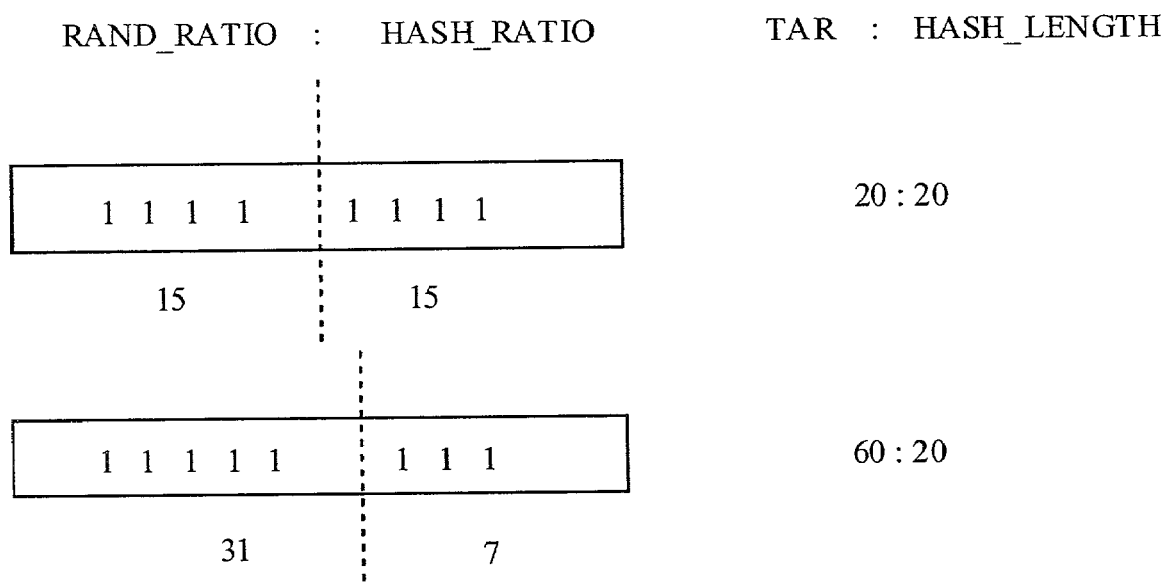

As shown in FIG. 1A, random data 21 is provided for mixing with a digital signature 22 in accordance with FIGS. 3, 4B and 4C described later. In particular, bytes from the digital signature 22 are used to initialize hash byte positions. The computed hash digest 24 is encrypted using the encryption function 20, for example as shown in FIG. 11A using S[ ] 18, TW 19 and another variable F1 25 (a result of a NLF with the encryption key 10, IID 14, and the previous result of the NLF 16 as parameters) as input. The encryption function 20 produces an encrypted hash digest 26. The encrypted hash digest 26 overwrites digital signature byte positions 27 in the mixed data stream 23 to produce the cipher text 28. This technique now ensures that the state of the computing device S[ ] 31 is dependent on the random data 21, which in turn is based on a random seed. This facilitates the feature that encrypting the same plain text will produce different cipher text because S[ ] is dependent on the random seed, which for example may be the time of encryption, and/or may be based on other additional hardware/software features, and the like. However, the random seed used to generate random data 21 is not a necessary input for the decryption process.

As further shown in FIG. 1A, plain text 29 is provided to an encryption function 30 that produces an encrypted result 34 based on subsequent permuted inputs S[ ] 31, TW 32 and a variable F1 33, which is a non-linear function result of the encryption key 10 and IID 14, and the previous result 25 of the NLF. The encrypted result 34 undergoes multiple mixing routines 35 and 36 that may be performed concurrent or sequential to each other to generate a data stream 37. One example of the mixing function is described and discussed in FIGS. 5 to 10. The hash digest 38 of the data stream 37 is computed as a result of the mixing processes. The computed hash digest 38 undergoes encryption 39 based on newly computed inputs S[ ] 40, TW 41 and F1 variable 42. The encrypted hash digest 43 overwrites digital signature byte positions 44 in the data stream 37 to produce the cipher text 45.

Referring now to FIG. 1B, an exemplary embodiment of an overview of a decryption function for the state-varying hybrid stream cipher is shown. The decryption key 51 is provided to the first shuffling routine 52 (described in FIG. 12), which permutes array S[ ] and outputs S[ ] 53 and a variable TW 54. Both the decryption key 51 and the internal identifier (IID) 55 are provided to a non-linear function (NLF) 56 to produce a result 57 that is input into the second shuffling routine 58. The second shuffling routine 58 produces newly permuted values of S[ ] 59 and TW 60, which are provided to a decryption function 61.

As shown in FIG. 1B, the cipher text 62 (equivalent to cipher text 28 of FIG. 1A) is provided for mixing with a digital signature 63. In particular, bytes from the digital signature 63 are used to initialize hash byte positions and the encrypted hash digest at these positions in the cipher text is read (see block 64). The encrypted hash digest is decrypted (see block 61) to recover the hash digest 66 stored in the cipher text using S[ ] 59, TW 60 and another variable F1 65 as inputs. These values would be equivalent to the values S[ ] 18, TW 19 and F1 25 of FIG. 1A. Then, a hash digest 68 of the data 67 obtained after the mixing the cipher text 62 with digital signature 63 is computed and compared with the hash digest 66 (see block 69). If the hash digests 66 and 68 are identical, then the decryption continues. Otherwise, the process is aborted. Thus, a tamperproof feature is introduced to ensure that the data encrypted has not been modified by an interloper or due to errors in transmission and the like. This enhances the security of the process.

As further shown in FIG. 1B, cipher text 70 (equivalent to the cipher text 45 of FIG. 1A) is provided to a decryption function 71 controlled by the following inputs for this embodiment: permuted S[ ] 72, TW 73 and a variable F1 74 being a non-linear function result of the decryption key 51, IID 55, and the previous value of the variable F1 65. This produces a decrypted result 75. The decrypted result 75 undergoes a mixing routine 76 with the digital signature 77 to produce mixed data. In particular, bytes from the digital signature 77 are used to initialize hash byte positions, and the encrypted hash digest at these positions in the cipher text is read (see block 78). The hash digest read from the cipher text 70 undergoes a decryption function 79 based on newly computed inputs S[ ] 80, TW 81 and F1 variable 82 to recover the hash digest 83 stored in the cipher text 70. The random data in the mixed data is identified (see block 84), and the hash digest of the mixed data 85 is computed (see block 86). The hash digest is compared with the hash digest 83 stored in the cipher text 70. Upon successful verification (see block 87), the identified random data may be removed from the mixed data 85 to effectively recover plain text 88 (e.g., equivalent to the plain text 29 of FIG. 1A). If the verification 87 fails, the process is aborted.

A. Illustrative Embodiment of the Encryption Function

Figure 2A:
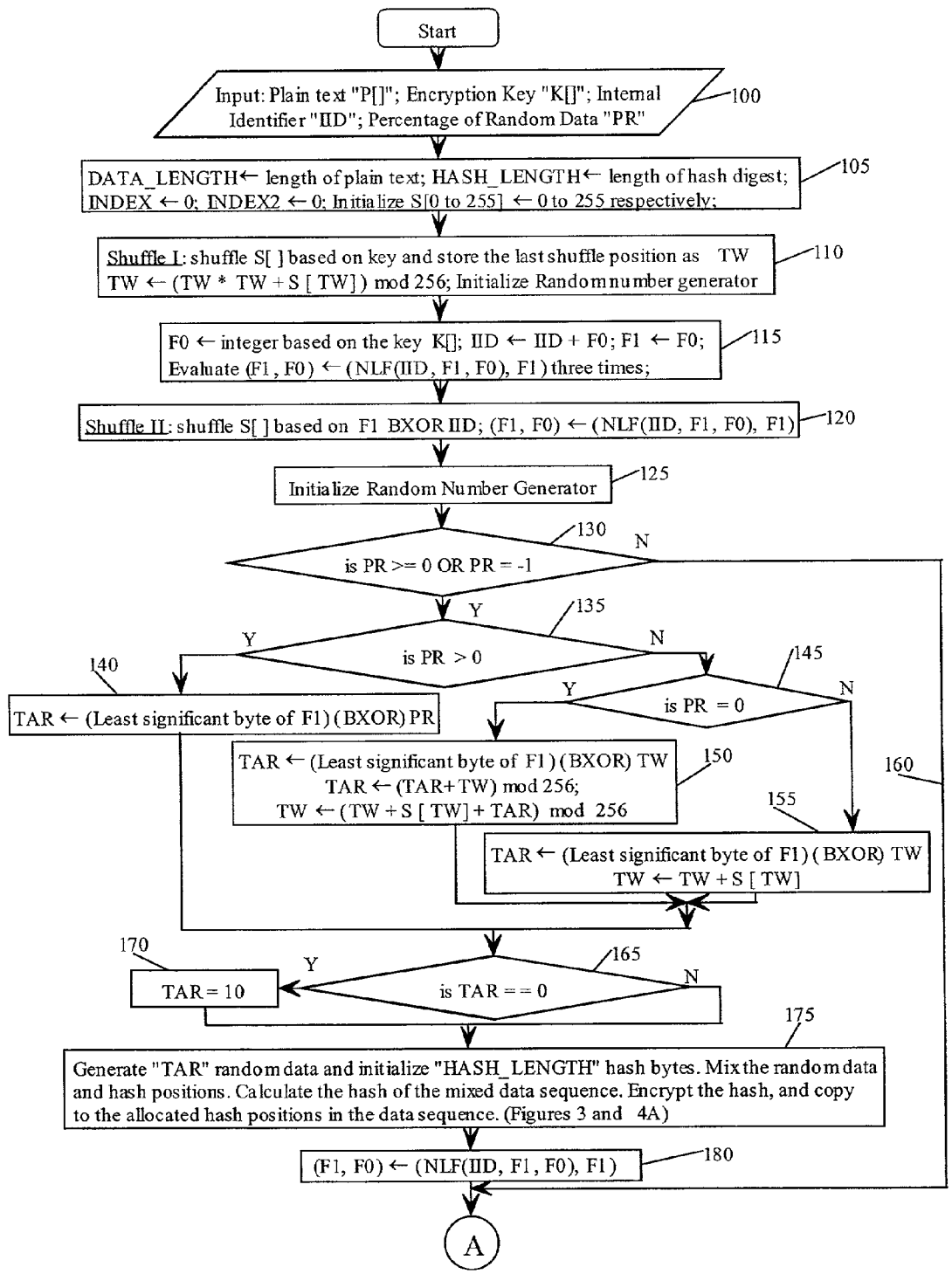
FIGS. 2A and 2B are an exemplary embodiment of a flowchart of the encryption function for the state-varying hybrid stream cipher of FIG. 1A.
Figure 2B:
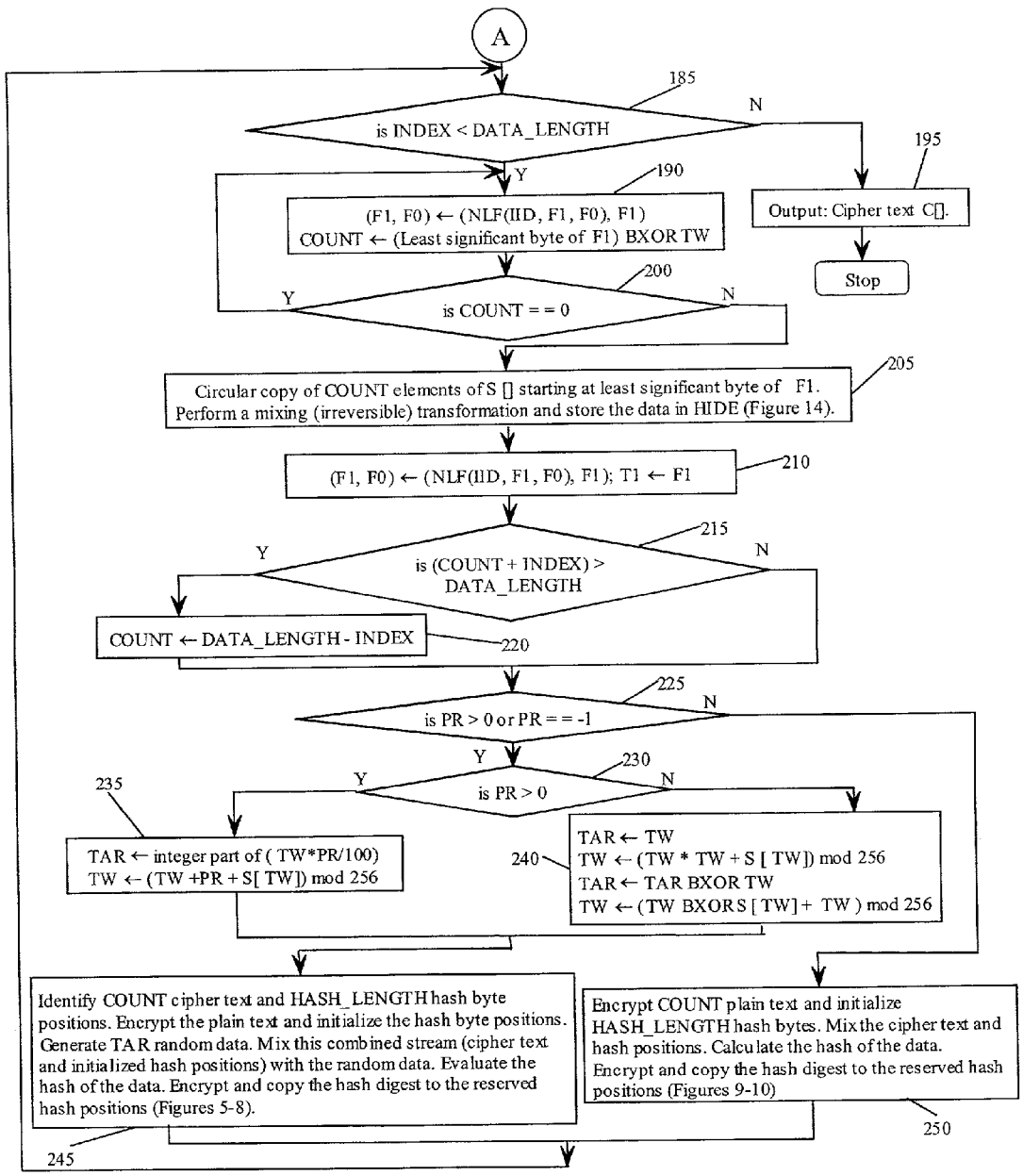

Referring now to FIGS. 2A and 2B, an exemplary embodiment of an encryption function for a state-varying hybrid stream cipher is shown. The details set forth in this embodiment of the encryption function are merely illustrative for purposes in understanding the internal operations of the state-varying hybrid stream cipher.

Initially, the state-varying hybrid stream cipher receives inputs including the plain text to be encrypted, encryption key and a percentage of random data (see item 100). In the event that the state-varying hybrid stream cipher is software or firmware code, the plain text to be encrypted may be stored in an array P[ ] and the encryption key may be stored as a sequence of bytes in the array K[ ]. The internal identifier (IID) is unique per user or per copy of the cipher application. The variable "PR" represents the percentage of random data to be added to the cipher text. Thus, as shown, P[ ], K[ ], IID and PR are inputs for the encryption function of the state-varying hybrid stream cipher.

As shown in item 105, a variety of variables used by the state-varying hybrid stream cipher are initialized. For example, an array S[ ], representative of the state of the computing device, may be configured as a M-bit table warranting initialization of table entries S[0] through S[$2^{M-1}$]. As shown, S[ ] is an 8-bit table with entries from S[0] to S[255] for illustration purposes. The variables INDEX and INDEX2 are the indices that correspond to the plain text data element(s) being encrypted and the cipher text data element(s) being generated, respectively. These indices are initialized to 0, pointing to a first element in the corresponding arrays.

The array S[ ] is permuted in accordance with a plurality of shuffling routines as described below and shown in FIGS. 12 and 13. The permutation (or shuffling) performed by a first shuffling routine is performed to avoid any identifiable correlation with the encryption key, especially as key lengths increase and for closely related keys (see item 110). Since the first shuffling routine is based on the input encryption key, if one bit of the encryption key sequence differs from the prior encryption key sequence, operations for the current shuffling operation would differ from those operations performed in the prior shuffling operation. The last permutation performed on array S[ ] is stored in a variable TW, which is subsequently used by the cipher.

As shown in item 115, a unique integer value F0 is calculated based on the key bytes K[ ]. To ensure more security, the IID is mapped to a new value, dependent on the key. The variable "F1" is used in the encryption process, and is initialized to F0. The contents of variable F1 are iterated through multiple nonlinear function evaluations to remove correlation of the value of F1 with the IID. The number of iterations could be based on the contents of TW, or values generated in the F1 variable itself. In a different method, an additional non-linear or random generator can be used to calculate the number of iterations to be performed at this stage.

The user generally provides the encryption key. From a security standpoint, the internal state of the computing device should not be directly dependent on the key. The "internal state of the computing device" is the value of the array S[ ]. Thus, to ensure that the internal state is not dependent directly on the key, a second shuffling routine is added as described below and shown in FIG. 13 (see item 120). In general, the second shuffling routine is based on the IID being bitwise XOR'ed with contents of variable F1 discussed above. This customizes each encryption function to a particular entity or individual.

Another feature of the state-varying hybrid stream cipher is the distribution of random data in the cipher text as described below and illustrated in FIGS. 3 and 4A. Random data is added at the beginning of the cipher text to ensure that the internal state of the computing device is not directly visible. This prevents potential hackers from correlating plain text with cipher text, and predicting the internal state of the computing device. The random number generator is then initialized with a random seed which maybe dependent on the encryption key, the IID and perhaps the time of execution of the encryption process or any other random process based on hardware or any random system (see item 125; FIG. 2A). The variable "PR" identifies the percentage of random data to be added. This percentage may be selected by the user or may be a certain amount or random that is automatically added by the state-varying hybrid stream cipher. The amount/type of random data may be selected based on the internal state of the computing device.

Herein, the variable TAR identifies the amount of random data to be added. If PR satisfies a first threshold (e.g., PR>0), then TAR is dependent on variables F1 and PR (see items 130, 135, 140). The value of TAR is between 1 and 255. The range of values of TAR may be varied for different implementations. If the value of PR satisfies a second threshold (e.g., PR=0), then the state-varying hybrid stream cipher adds random numbers automatically (see items 145, 150). If the value of PR satisfies a third threshold (e.g., PR=−1), then the state-varying hybrid stream cipher adds random numbers automatically (see item 155). For instance, automatic random data insertion is useful for Secure Socket Layer (SSL) type transactions or encryption. The amount of random data (TAR) would depend on the values of F1 and TW at this stage. If the value of TAR becomes zero (see item 165), it may be either set to a predetermined value (e.g., greater than 3, TAR=10 for this example) as shown in item 170, set equal to TW or perhaps initialized with another sequence. Also, the value of TW may be mapped to a new value based on the internal state of the computing device S[ ] (see items 150 and 155). This ensures that random data is added at the beginning of the stream. If the user or application chooses PR as a negative value other than −1, no random data is added to the cipher text (160).

Another feature introduced in the state-varying hybrid stream cipher involves a first mixing routine for distribution of encrypted hash bytes throughout the data stream (see item 175). Herein, TAR random data are mixed with initialized "HASH_LENGTH" hash positions. A "hash digest" is a result of a hash operation performed on the mixed data. The hash digest computed is then encrypted and copied to the hash positions. The value in the variable HASH_LENGTH depends on the type of hash function used to calculate the digest. For example, one implementation of Secure Hash Algorithm (e.g., SHA-1) generates a hash digest of 20 bytes for a message. The distribution of the hash bytes also allows for a digital signature to be hidden in the data stream before the hash digest is calculated. The digital signature may be useful in detecting tampering at the time of decryption. The value of the variable in F1 may be used in encrypting the hash values. Therefore, a new value of F1 is evaluated (see item 180).

The routine iterates until all the plain text data have been encrypted and stored in the cipher text array C[ ] (see item 185). On completion of the whole encryption process, the cipher text data is sent to the output device such as an output stream, file, memory component, transceiver and the like (see item 195).

Another feature introduced in the state-varying hybrid stream cipher is the division of plain text into randomly sized blocks. The size of the block is calculated and stored in the variable COUNT (see item 190). Successive estimates of F1 computed using the non-linear function produces a pseudo-random sequence, and the block size is given by the least significant byte of the contents of variable F1. Thus, the successive values of block sizes represent a pseudo-random sequence. The process ensures that the block size is never zero (see items 190,200) so that in a given iteration, "COUNT" plain text data elements are encrypted. Any other mathematical function, elements from a pseudo-random sequence and the like may be used to estimate block sizes.

The state-varying hybrid stream cipher further generates an array of data to hide the plain text frequencies and relationships (see item 205). Thus, the internal state of the computing device performing the state-varying hybrid stream cipher would be difficult to determine based on cipher text and plain text statistics. The array HIDE[ ] is generated by an non-invertible operation based on the internal state of the computing device S[ ], nonlinear value generated at this stage F1, and the variable TW. The values of the array HIDE[ ] may be different for different blocks. The details of the routine for hiding the plain text frequencies and relationships are described and illustrated in FIG. 14. General mathematical functions or one-way functions and the like maybe used to generate the array HIDE[ ]. A new value of F1 is calculated as the current value of F1 has been used in the routine that generates the array HIDE[ ] (see item 210).

The state-varying hybrid stream cipher ensures that there are "COUNT" data elements in the plain text data stream to encrypt in the current block. If the number of data elements available is less than COUNT, the variable COUNT is adjusted to the amount of data elements remaining (see items 215 and 220). Thus, it is not necessary to append zeros or any data to the input plain text. Therefore, the encryption function may work on any given length of plain text.

Figure 8:
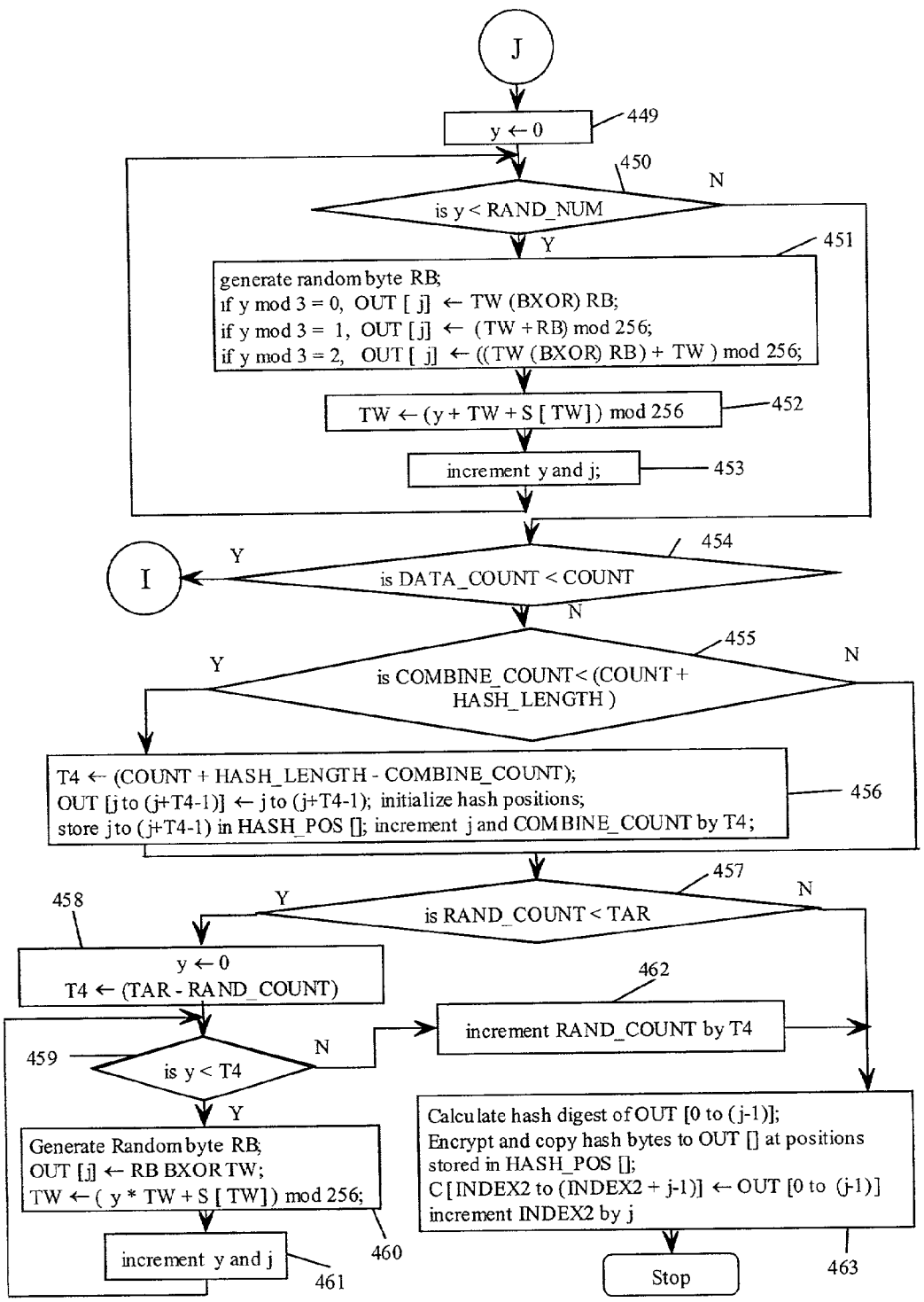
Figure 9:
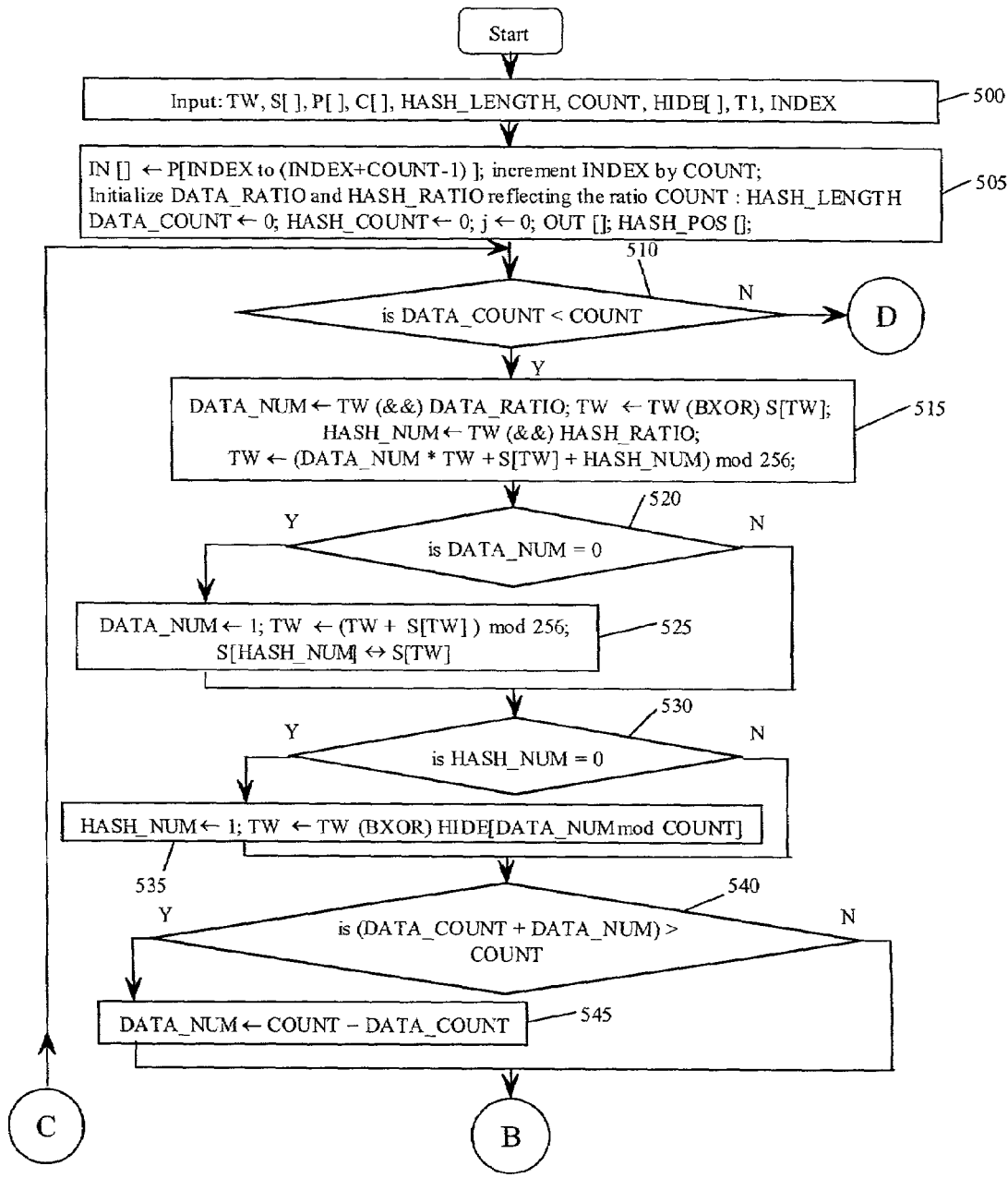
FIGS. 9 and 10 are an exemplary embodiment of a third mixing routine for distributing hash bytes among cipher text data.
Figure 10:
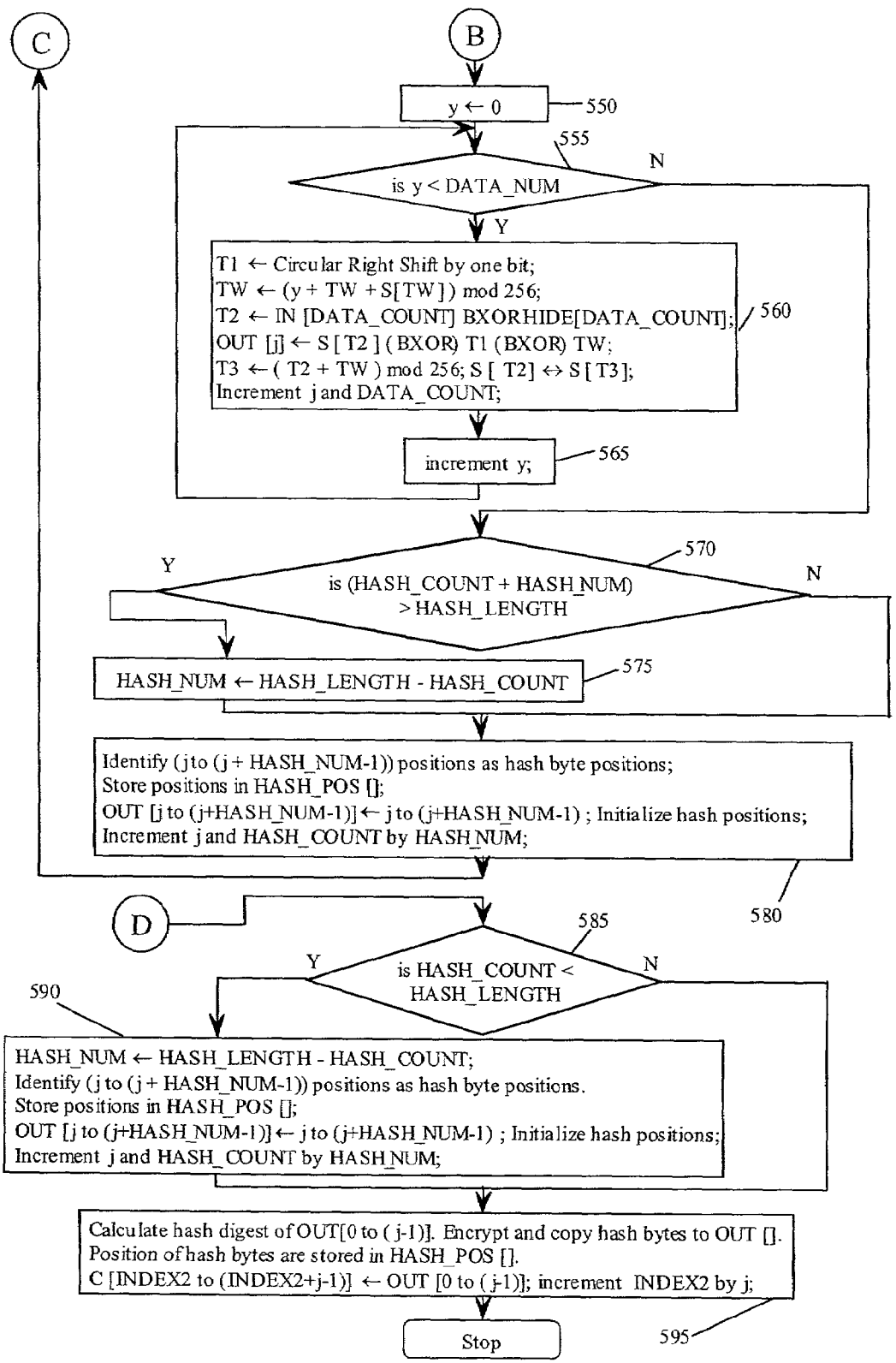

The state-varying hybrid stream cipher differentiates the encryption function based on the percentage of randomness being specified by the user (see item 225). For this embodiment, if the percentage of randomness (PR) selected by the user is zero, encryption is accomplished by a third mixing routine (see item 250), where one embodiment of the same is shown in FIGS. 9–10. If the percentage of randomness is non-zero or −1, then encryption is accomplished by a second mixing routine (see item 245), where one embodiment of the same is shown in FIGS. 5–8.

For instance, in the event that the percentage of randomness (PR) selected is greater than the first threshold (PR>0), the amount of random data added is a result of a multiplying the contents of the variables TW and PR and the result is stored in the variable TAR (see items 230 and 235). This enhances security, as it would be difficult to determine the exact amount of random data added at the current block. Thus, PR is not directly used in the amount of random data added. As the contents of variable TW changes with each block, an interloper monitoring the cipher text length and plain text length would not be able to determine the amount of randomness added. Additionally, knowing the plain text length and the value stored within the variable PR, an interloper would still not be able to predict the cipher text length. All these factors tend to increase computing device security by increasing the amount of brute force searches necessary to uncover the plain text.

If the value of the variable PR is equal to the second threshold (PR=−1), the routine considers the amount of randomness to be added as automatic, and performs bitwise XOR (BXOR) operations on consecutive values of TW to calculate the amount of random data to be added (see item 240). Since the variable TW varies as the encryption proceeds, the amount of random data added at each block is difficult to predict based on a simple functional analysis. Additionally, one may use a mathematical function or perhaps elements from a pseudo-random sequence and the like to generate the amount of random data added.

Yet another feature introduced by the state-varying hybrid stream cipher involves a second mixing routine, which includes mixing cipher text, random data and the hash digest (see item 245). The details of the complete mixing process are presented in FIGS. 5–8. In general, cipher text is mixed with the hash byte positions. The positions of cipher text and hash bytes are identified based on the ratio of COUNT to HASH_LENGTH. Next, the combined stream of cipher text and hash byte positions is mixed with the random data. The mixing routine further includes encrypting plain text at the identified cipher text positions, and initializing the hash byte positions that have been previously identified. In the same mixing routine, portions of the random data are generated and interlaced into the combined stream. Then, the hash digest of the data generated is computed. The hash digest is then copied into the hash positions identified above. Thus, the hash digest has overwritten the digital signature, which provides greater security because the signing data is not visible in the cipher text. If changes have occurred to the cipher text or any byte in the mixed data stream, it is detected at the decryption stage.

If the percentage of randomness (PR) is equal to zero, no random data is added to the cipher text stream. A third mixing routine is executed in which the cipher text is mixed with hash bytes (see item 250). The third mixing routine encrypts plain text data elements, and then identifies and initializes the hash byte positions. At the end of this mixing routine, the hash digest of the data is evaluated. The hash digest is then copied into the identified hash positions. Thus, the cipher text is signed with a digital signature. As the signature bytes are not part of the cipher text, it gives the encryption function a high level of security.

1. Exemplary Embodiment of the First Mixing Routine for Distributing Hash Bytes Among Random Data Referring now to FIGS. 3, and 4A–4C, an exemplary embodiment of a first mixing routine for distributing hash bytes among random data is shown. The amount of random data to be added at the beginning of the cipher text stream is stored in the variable TAR. The variable HASH_LENGTH stores the number of bytes generated by the hash function. This number is dependent on the hash function being used (see item 300).

The values of variables RAND_RATIO and HASH_RATIO are initialized to be proportional to the ratio TAR: HASH_LENGTH (see item 302). Namely, the values of RAND_RATIO and HASH_RATIO reflect the values corresponding to the bit length ratio proportional to TAR and HASH_LENGTH. As an example, as shown in FIG. 4B, consider the value of TAR to be 20 and the value of HASH_LENGTH to be 20. Thus, the values of both RAND_RATIO and HASH_RATIO are 15 corresponding to 4 bits "1111". As a second case, consider the values of TAR as 60 and HASH_LENGTH as 20. The value of RAND_RATIO would be 31 corresponding to 5 bits "11111". Similarly the value of HASH_RATIO would be 7 corresponding to 3 bits "111" as described in FIG. 4C. The mixing routine uses these values as guidelines to produce the mixed stream of random data and the hash bytes. The actual distribution of random values to the hash bytes is dependent on the internal state of the computing device S[ ] and the variable TW. The variable OUT[ ] is used to store the generated random data and the hash bytes, and the variable HASH_POS[ ] is used to store information about the positions in the sequence that belong to the hash bytes (see item 302).

Referring back to FIG. 3, as shown in item 304, one iteration of the first mixing routine is to ensure that "TAR" random numbers are added to the cipher text. Herein, the variable RAND_NUM is computed as a result from a bitwise AND operation on variables TW and RAND_RATIO (TW && RAND_RATIO) as shown in item 306. Since TW has been used, it is mapped to a new value using the transformation TW=TW BXOR S[TW]. Hence, the next value of TW depends on the internal state of the computing device S[ ]. The variable HASH_NUM is computed as TW && HASH_RATIO and TW is mapped to a new value. The number of random data elements added is stored in the variable RAND_COUNT. The routine then determines the effect of adding RAND_NUM to RAND_COUNT (see item 308) to ensure that only "TAR" random data is added. If the addition increases the value of RAND_COUNT beyond the value of TAR, the first mixing routine adjusts the value of RAND_NUM to the difference between TAR and RAND_COUNT (see item 310).

In the next operation of the first mixing process, "RAND_NUM" random data is added to the output data stream (see items 312–320). A pseudo-random generator is used to generate a random byte (RB) as shown in item 316. The output data OUT[ ] is obtained by performing a bitwise XOR (BXOR) operation of the random byte generated with TW (RB BXOR TW). This operation hides the statistics of the pseudo-random generator in the output sequence, and thus enhances security. Again, since TW has been used, it is mapped to a new value (see item 316).

The number of hash bytes identified is stored in the variable HASH_COUNT. The first mixing routine checks the effect of adding HASH_NUM to HASH_COUNT (see item 322) to ensure that only "HASH_LENGTH" bytes are added to the mixed output stream. If the addition increases the value of HASH_COUNT beyond HASH_LENGTH, the first mixing routine adjusts the value of HASH_NUM (see item 324). Then, "HASH_NUM" hash positions are identified and initialized. If the user has specified a digital signature, bytes from the signature, or may be sequence of bytes generated based on the signature may be used to initialize the hash positions in OUT[ ]. If the user has not specified a digital signature, the process initializes the hash bytes with an internal positional variable, which is equivalent to adding a digital signature automatically. The hash positions identified in this operation are stored in the variable HASH_POS[ ] (see line 2 of item 326). The addition of "RAND_NUM" random data and initializing "HASH_NUM" hash bytes is performed in an iterative fashion (see items 304–326) until "TAR" random data have been added to the output array OUT[ ].

The first mixing routine determines the value of HASH_COUNT (see item 328) to ensure that "HASH LENGTH" hash bytes have been added in the mixed stream. If this value is less than HASH_LENGTH, the remainder (HASH_LENGTH–HASH_COUNT) of the hash positions are identified and initialized (see item 330). As a result, the first mixing routine mixes "TAR" random data with "HASH_LENGTH" hash bytes. Finally, the digest of the output array OUT[ ] is computed and stored in the variable HASH_BYTE[ ] (see item 332). The digest is then encrypted and copied into the positions identified for the hash bytes in HASH_POS[ ] (see items 334–340), and the data is copied to the output cipher text array C[ ] (see item 342).

The operations for encrypting hash bytes, as presented in item 338, is described below and generally shown in FIG. 1B. The value in T1 is right shifted by one bit. This value is one of the elements used in the encryption process. One byte of the hash digest stored in the array HASH_BYTE[ ] is copied to the variable T2. The value in variable T2 is used as an index to perform a table lookup from the shuffled table S[ ]. The cipher text is then obtained as a result of a BXOR operation of the value looked up from the table S[T2] with T1 and TW, and is stored in the array OUT[ ]. The data element of the table S[ ] at index T2 used in the encryption process is exchanged with another element of the same table. This shuffling process may be dependent on the value of encrypted hash byte and the value of TW. Thus, the encryption process has modified the internal state of the computing device. This technique, in general, allows generation of different cipher texts for a given encryption key and given plain text as the system would be in a different internal state.

Figure 4C:
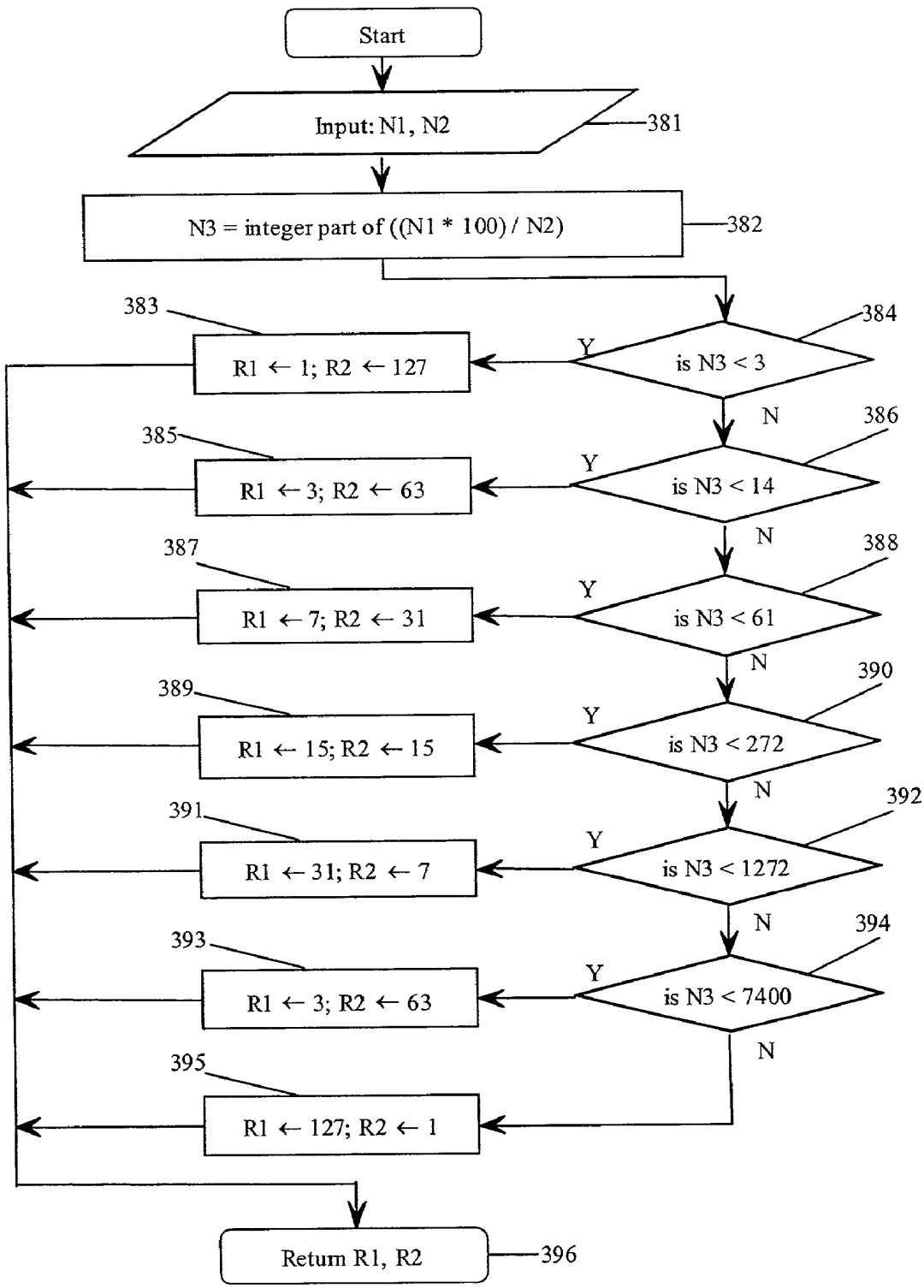
Figure 5:
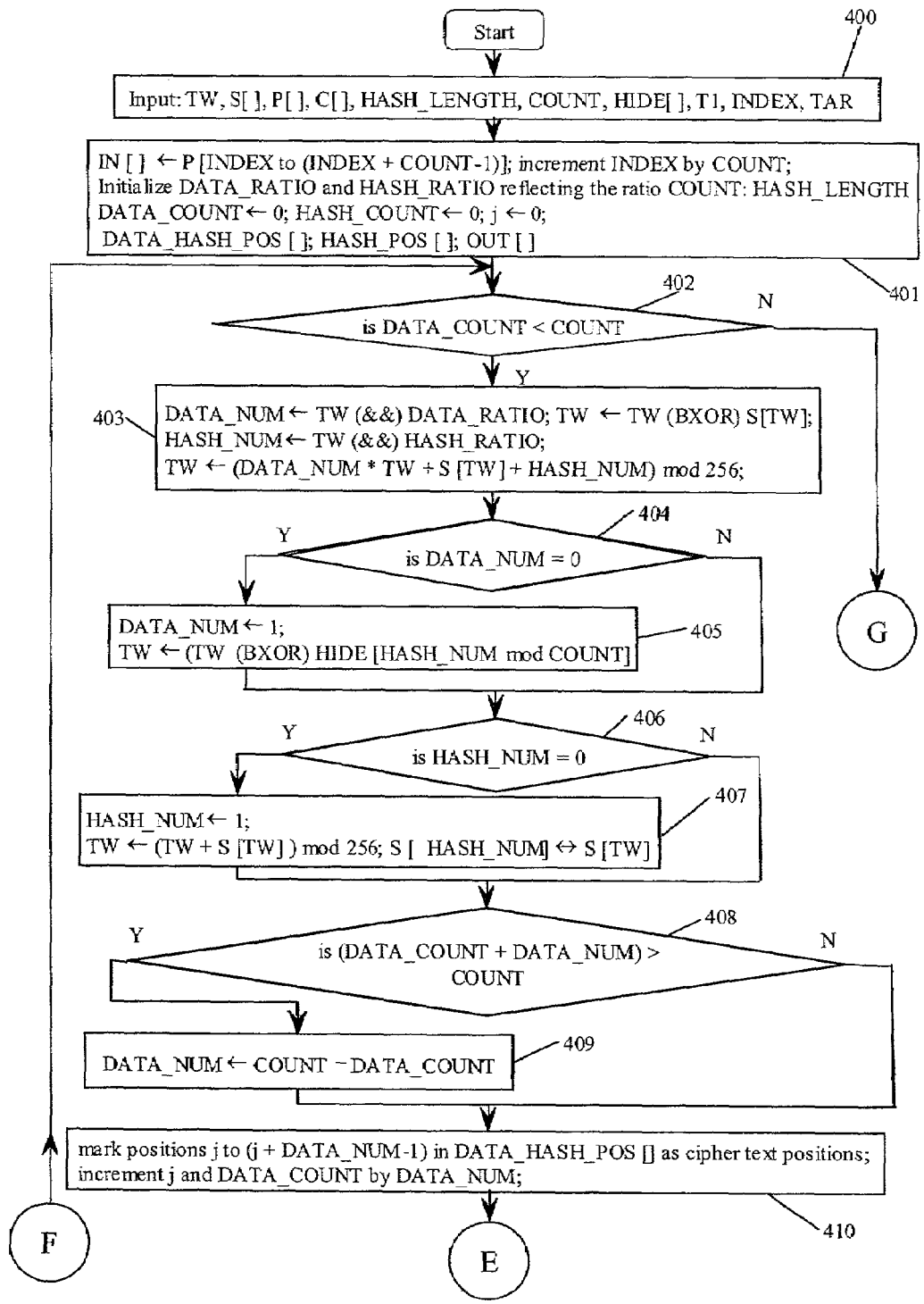
FIGS. 5, 6, 7 and 8 are an exemplary embodiment of the second mixing routine for mixing random data, cipher text and hash bytes in the current data block.

Referring now to FIG. 4C, one exemplary embodiment of the mixing ratio function used in the encryption and decryption function in the state-varying hybrid stream cipher, is described next. The operations of this routine will identify the ratio to be used during the mixing process in the encryption and decryption routines. The variables N1 and N2 store the quantity of data being mixed in the two data streams (see item 381). The first operation involves computing the percentage of N2 with respect to N1 (see item 382) as an integer value, and this percentage is stored in the variable "N3".

The remaining operations of this function determine the mixing ratio. The particular thresholds of the mixing ratio are obtained by dividing a byte consisting of all ones into two parts and estimating the percentage of one part against the other. For example, dividing the 8-bit byte into two equal parts produce 4 bits of "1111" for one part and 4 bits of "1111" for the other part. So, this will give a percentage of 100. Dividing the 8 byte into one part of 5 bits of "11111" and 3 parts of "111" gives a percentage of 443. The mid-point of 443 and 100 is 271.5, which is rounded to the nearest decimal to give 272 (see item 390), which is one threshold where the mixing ratio function changes. Similarly, other thresholds have been calculated.

The output ratios to be used in the mixing process are stored in the variables R1 and R2 In the event the value of the variable N3 is less than 3 (see item 384), the variables R1 and R2 are set 1 and 127 respectively (see item 383). However if the value of N3 is less than 14 and more than 3 (see item 386), the variables R1 and R2 are set to 3 and 63 respectively (see item 385). The values of R1 and R2 become 7 and 31 (see item 387), when the value of N3 is less than the threshold 61 and more than threshold 14 (see item 388). If the value of the variable N3 is less than the threshold 272, and greater than 61 (see item 390), the variables R1 and R2 are set 15 and 15 respectively (see item 389). In the event where the value of N3 exists between 272 and 1272 (see item 392), the variables R1 and R2 are set to the values of 31 and 7 respectively (see item 391). The function then determines if the value of N3 is less than the threshold 7400 (see item 394), and sets the values of R1 and R2 as 3 and 63 respectively (see item 393). Finally, for values greater than 7400, the routines R1 and R2 take on values of 127 and 1 respectively (see item 395). The values stored in R1 and R2 are returned (see item 396) to the main routine where there are used as guidelines to perform the mixing based on the internal state of the computing device S[ ], and the value of the variable TW.

The output mixed sequence that arises is based on the above mixing routine. However, any statistical function, or a fuzzy logic function, or may be a mathematical function that may be used as is, or appropriately modified may be used to generate the values of the mixing ratios R1 and R2 In a different approach, elements of a pseudo-random sequence, or may be elements of an iterative mathematical function, or may be a non-linear or chaotic function may be used to generate the mixing ratios. This enables different implementations to have different mixing patterns and hence different cipher text statistics for security enhancement.

2. Exemplary Embodiment of the Second Mixing Routine for Mixing Random Data, Cipher Text and Hash Bytes Referring now to FIGS. 5–8, an exemplary embodiment of the second mixing routine for mixing random data, cipher text and hash bytes in the current data block is shown. The amount of random data to be added is stored in the variable TAR. The variable HASH_LENGTH stores the number of bytes generated by the hash function. The number of plain text data elements to be encrypted in the current data block is stored in the variable COUNT. The plain text to be encrypted is copied into an input array IN[ ] (see item 400 and 401).

In the first operation in the second mixing routine, hash bytes are distributed in the cipher text stream. The values of DATA_RATIO and HASH_RATIO are evaluated to be proportional to the ratio COUNT:HASH_LENGTH (see item 401). The values of DATA_RATIO and HASH_RATIO reflect the values corresponding to the bit lengths ratio proportional to COUNT and HASH_LENGTH (see FIG. 4C). The actual distribution of cipher text values and hash bytes is dependent on the internal state of the computing device S[ ] and the variable TW. The main iteration of the second mixing routine ensures that COUNT cipher text positions are identified (see item 402).

Moreover, "DATA_NUM" cipher text positions are identified and "HASH_NUM" hash positions are identified. The contents of variable DATA_NUM may be computed as TW && DATA_RATIO. Since TW has been used, it is mapped to a new value using the transformation TW=TW BXOR S[TW]. It can be observed that the next value of TW depends on the internal state of the computing device S[ ]. The variable HASH_NUM is then computed as TW && HASH_RATIO. As TW has been used, it is mapped to a new value (see item 403).

Thereafter, as shown in items 404–407, the second mixing routine ensures that DATA_NUM and HASH_NUM are non-zero to ensure proper mixing. The count of cipher text positions identified is stored in the variable DATA_COUNT. The mixing routine then checks the effect of adding DATA_NUM to DATA_COUNT (see item 408) to ensure that only COUNT cipher text elements are used in the mixing process. If this addition of DATA_NUM increases the value of DATA_COUNT beyond COUNT, the second mixing routine adjusts the value of DATA_NUM accordingly (see item 409). The next DATA_NUM positions in the data stream are identified as cipher text positions (see item 410). The count of hash bytes identified is stored in the variable HASH_COUNT.

Figure 6:
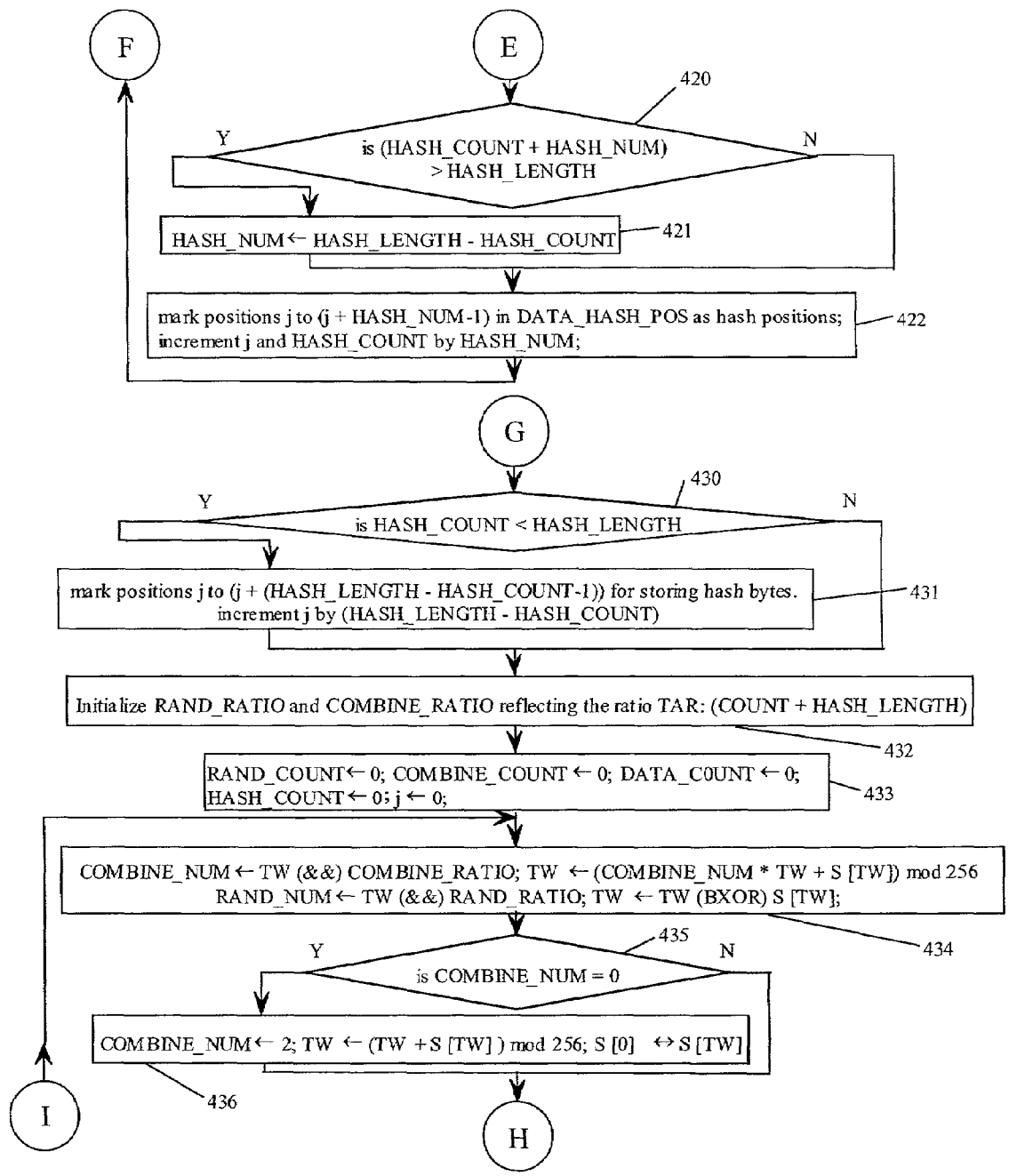
Figure 7:
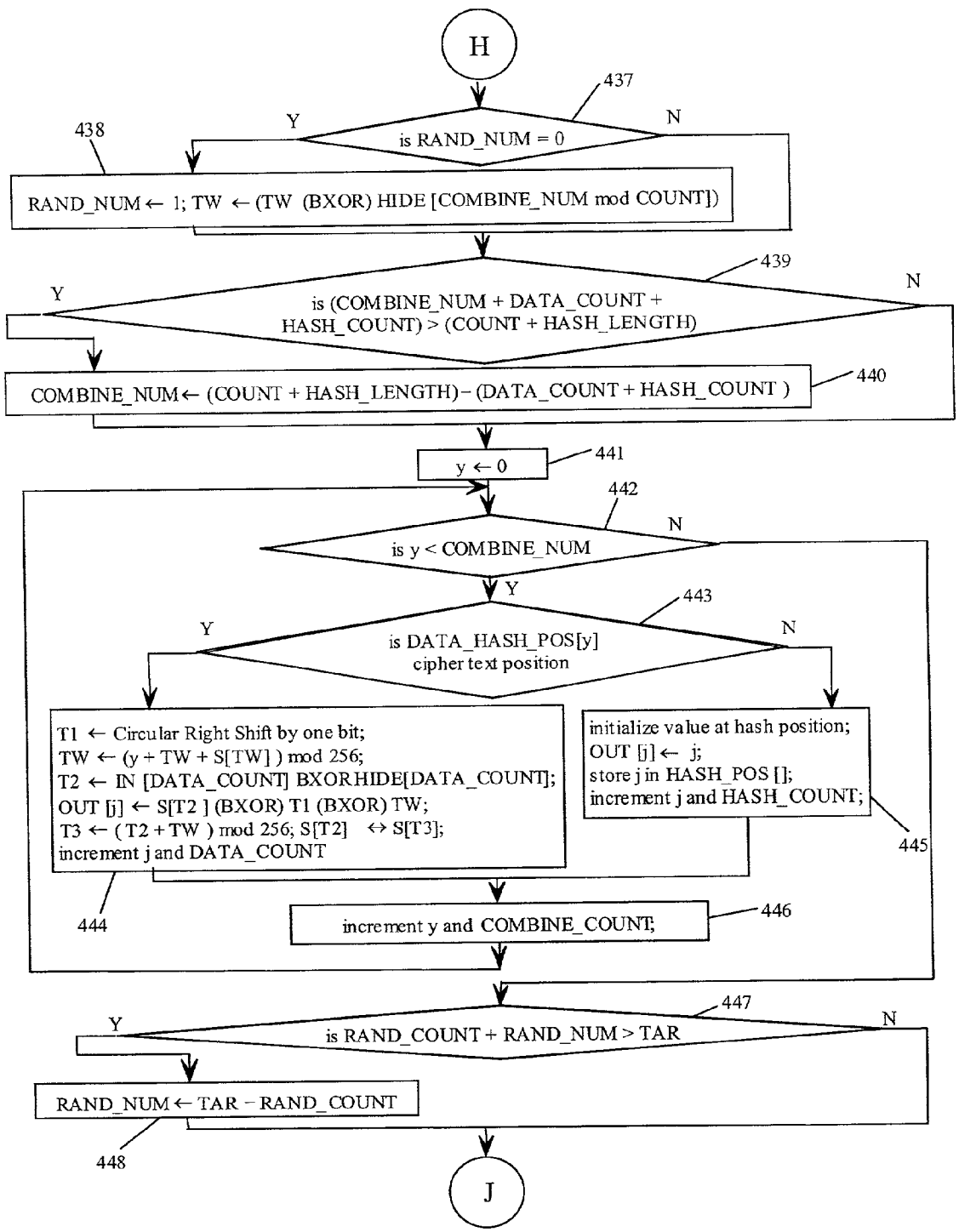

As shown in FIG. 6, the second mixing routine further checks the effect of adding HASH_NUM to HASH_COUNT to ensure that only "HASH_LENGTH" hash bytes are identified (see item 420). If the addition increases the value of HASH_COUNT beyond HASH_LENGTH, the second mixing routine adjusts the value of HASH_NUM accordingly (see item 421). The next "HASH_NUM" positions in the data stream are identified as hash positions (see item 422). This sequence is iterative until "COUNT" cipher text positions have been identified in the array DATA_HASH_POS[ ] (see items 402–422).

In the event that "COUNT" cipher text positions have been identified, the second mixing routine then checks the value of HASH_COUNT (see item 430) to ensure that all "HASH_LENGTH" positions have been identified. If this value is less than HASH_LENGTH, the remainder (HASH_LENGTH−HASH_COUNT) of the hash positions is identified in DATA_HASH_POS[ ] (see item 431). Thus, the second mixing routine mixes cipher text with hash bytes.

The random data is then distributed throughout the combined stream. The combined stream is the cipher text and hash positions mixed above (see items 402–431). For mixing the random data into the combined stream, the values of RAND_RATIO and COMBINE_RATIO are initialized to be proportional to the ratio TAR:(COUNT+HASH_LENGTH) as shown in item 432 and explained in detail in FIG. 4C. The number of plain text elements encrypted is stored in the variable DATA_COUNT, and is initialized to zero at the start of the mixing process (see item 433). The variable HASH_COUNT stores the number of hash bytes identified, and is initialized to zero. The variable RAND_COUNT stores the number of random data elements added in the mixing process, and is initialized to zero (see item 433). The variable COMBINE_NUM stores the number of data elements to be used from the combined stream for mixing, and is computed as TW && COMBINE_RATIO (see item 434) to reflect the proper mixing ratio identified earlier. Since TW has been used, it is mapped to a new value using the transformation TW=(COMBINE_NUM*TW+S[TW]) mod 256. It can be observed that the next value of TW depends on the internal state of the computing device S[ ] and the value of COMBINE NUM (see item 434).

Next, the variable RAND_NUM stores the number of random numbers to be added to the mixed stream, and is computed as TW && RAND_RATIO to reflect the proper mixing ratio identified earlier in item 432. Then, the second mixing routine ensures that COMBINE_NUM and RAND_NUM are non-zero (see items 435–438) to ensure proper mixing.

The second mixing routine checks the effect of processing "COMBINE_NUM" positions in the combined stream (see item 439) to ensure that data elements are still available in the combined stream. The second mixing routine adjusts the value of COMBINE_NUM if there are insufficient positions in the combined stream (see item 440) and processes "COMBINE NUM" data elements of the combined stream (see item 441–442) as described below. The combined stream includes cipher text positions mixed with hash byte positions, and this information is available in the array DATA_HASH_POS[ ] (see items 401–431). The routine then checks whether the current position is reserved as a cipher text position in DATA_HASH_POS[ ] (see item 443). If the current position is reserved for a cipher text position, one plain text data element from IN[ ] is encrypted and stored in OUT[ ] (see item 444). Otherwise, the second routine initializes the hash positions in OUT[ ] with the internal positional variable j (see item 445). If the user has specified a digital signature, bytes from the signature may be used to initialize hash positions in OUT[ ], or may be data elements from a pseudo-random sequence.

The operations for encrypting plain text, as presented in item 444, is described below and generally shown in FIG. 11B. The variable T1 has been initialized with the value F1 (see item 190, FIG. 2). The value in T1 is right shifted by one bit. This value is one of the elements used in the encryption process. The plain text stored in IN[ ] is mapped using HIDE[ ] to remove relationships in the plain text sequence, and is stored in the variable T2. The value in variable T2 is used as an index to perform a table lookup from the shuffled table S[ ] instead of the plain text. If the plain text was used for table lookup, brute force methods would search within the range of ASCII values of the table, which is much less then the length of the shuffled table S[ ]. However, if T2 is used for the table lookup, brute force methods would have to search the complete shuffled table S[ ]. The cipher text is then obtained as a result of a BXOR operation of the value looked up from the table S[T2] with T1 and TW, and is stored in the array OUT[ ]. Since the plain text is 8 bits long, the cipher text is also 8 bits long. The data element of the table S[ ] at index T2 used in the encryption process is exchanged with another element of the same table. This shuffling process may be dependent on the value of plain text and TW.

The number of random data added is stored in the variable RAND_COUNT. To ensure that the routine does not add more than "TAR" random data, the second mixing routine checks the effect of adding RAND_NUM to the current count stored in RAND_COUNT (see item 447). If the addition increases the value of RAND_COUNT beyond TAR, the second mixing routine adjusts the value of RAND_NUM (see item 448). At this stage, "RAND_NUM" random data is added (see items 449–453). A pseudo-random generator is used to generate a random byte. To ensure good pseudo-random statistics in the whole cipher text stream, different combinations of the random byte generated and TW are used to generate the random data as shown in FIG. 8 (see item 451). The generated data is stored in OUT[ ]. Since TW has been used, it is remapped to a new value (see item 452). The cycle of mixing combined stream data with random data is repeated until "COUNT" plain text data elements have been encrypted (see items 434–454).

Once "COUNT" plain text data elements have been encrypted, the second mixing routine checks the value of COMBINE_COUNT (see item 455) to ensure that all elements of the combined stream have been processed. If this value is less than (COUNT+HASH_LENGTH), the remainder of the hash positions are identified and initialized (see item 456). The second mixing routine further determines the value of RAND_COUNT (see item 457) to ensure that "TAR" random data has been mixed in the data stream. If this value is less than TAR, the remainder (TAR−RAND_COUNT) of the random bytes are generated and stored in OUT[ ] (see items 458–462). Thus, the second mixing routine mixes "TAR" random data with "COUNT" cipher text, and "HASH_LENGTH" hash bytes. Subsequently, the hash digest of the output array OUT[ ] is computed. The hash digest is then encrypted in the manner described in items 334–340 of FIG. 4A and copied into the positions identified for the hash bytes, and the data is finally copied to the output cipher text array C[ ] (see item 463).

3. Exemplary Embodiment of the Third Mixing Routine for Distributing Hash Bytes Among Cipher Text Referring now to FIGS. 9 and 10, an exemplary embodiment of a third mixing routine for distributing hash bytes among cipher text data is shown. The amount of plain text data elements (e.g., bytes) encrypted for this operation is stored in the variable COUNT. The variable HASH_LENGTH stores the number of data elements (e.g., bytes) generated by the hash function. This number is dependent on the hash function being used (see item 500).

Initially, the third mixing routine initializes the values of DATA_RATIO and HASH_RATIO to be proportional to the bit length ratio of COUNT:HASH_LENGTH as illustrated in FIG. 4C. The actual distribution of cipher text position and the hash bytes is dependent on the internal state of the computing device S[ ] and the variable TW. The plain text to be encrypted is copied into an input array IN[ ] (see item 505). This routine loops until COUNT plain text data elements have been encrypted (see item 510).

The variable DATA_NUM stores the number of plain text elements to be encrypted and mixed in the data stream. As shown in item 515, the variable DATA_NUM is computed as TW && DATA_RATIO. Since TW has been used, it is mapped to a new value using the transformation TW=TW BXOR S[TW]. Thus, the next value of TW depends on the internal state of the computing device S[ ]. The variable HASH_NUM stores the number of hash bytes to be mixed, and is computed as TW && HASH_RATIO. The value of TW is mapped to a new value based on S[ ], DATA_NUM and HASH_NUM (see item 515).

As shown in items 520–535, the third mixing routine ensures that DATA_NUM and HASH_NUM are non-zero to enable proper mixing of the cipher text and hash bytes. The number of data elements encrypted is stored in the variable DATA_COUNT. In particular, the third mixing routine checks the effect of adding DATA_NUM to DATA_COUNT (see item 540) to ensure that only "COUNT" data elements are encrypted. If the addition of DATA_NUM increases the value of DATA_COUNT beyond COUNT, the value of DATA_NUM is adjusted accordingly (see item 545). In the next operation, "DATA_NUM" plain text elements are encrypted, and stored in OUT[ ] (see items 550–565).

The variable "y" is used as a counter (see item 550) to encrypt "DATA_NUM" plain text elements. The operations for encrypting plain text (see item 560) is accomplished by initializing the value of variable T1 with the value F1 (see item 190, FIG. 2). Thus, value in T1 used in the encryption function, is right shifted by one bit (see item 560). The plain text stored in IN[ ] is mapped using HIDE[ ] to remove relationships in the plain text sequence (see line 3 of item 560), and is stored in the variable T2. The value in variable T2 is used as an index to perform a table lookup from the shuffled table S[ ] (see item 560) instead of the plain text. If the plain text was used for table lookup, brute force methods would search within the range of ASCII values of the table, which is much less then the length of the shuffled table S[ ]. However if T2 is used for the table lookup, brute force methods would have to search the complete shuffled table S[ ]. The cipher text is then obtained as a result of a BXOR operation of the value looked up from the table S[T2] with T1 and TW (see item 560), and is stored in the array OUT[ ]. Since the plain text is 8 bits long, the cipher text is also 8 bits long. The data element of the table S[ ] at index T2 used in the encryption process is exchanged with another data element of the same table (see item 560). This shuffling process is dependent on the value of plain text and TW.

The count of hash bytes identified is stored in the variable HASH_COUNT. The third mixing routine determines the effect of adding HASH_NUM to HASH_COUNT (see item 570) to ensure that only "HASH_LENGTH" bytes are added to the data stream. If the addition increases the value of HASH_COUNT beyond HASH_LENGTH, the routine adjusts the value of HASH_NUM accordingly (see item 575). Then, the hash positions are identified and initialized in OUT[ ] (see item 580). If the user has specified a digital signature, bytes from the digital signature may be used to initialize the hash byte positions, or perhaps data elements from a sequence generated based on the signature bytes. If there is no digital signature, the function initializes the hash bytes using the internal positional variable or perhaps data elements from a pseudo-random sequence, which is equivalent to automatically adding a signature to the cipher text. The iterations continue until "COUNT" plain text data elements have been encrypted as denoted by loop (C) (see items 510–580).

As further shown in FIG. 10, the third mixing routine monitors the value of HASH_COUNT (see item 585) to ensure that all of "HASH_LENGTH" bytes have been identified and initialized. If this value is less than HASH_LENGTH, the remainder (HASH_LENGTH–HASH_COUNT) of the hash positions are identified and initialized in OUT[ ]. If the user has specified a digital signature, bytes from the digital signature are used to initialize the hash byte positions. If there is no digital signature, the function initializes the hash bytes using the internal positional variable or perhaps using elements from a pseudo-random sequence, which is equivalent to automatically adding a signature to the cipher text. Thus, the third routine mixes "COUNT" cipher text with "HASH_LENGTH" hash bytes (see items 505–590).

Finally, the hash digest of the mixed output array OUT[ ] is computed. The hash digest is then encrypted in the manner described in items 334–340 of FIG. 4A and copied into the positions identified for the hash bytes, and the data is copied to the output cipher text array C[ ] (see item 595).

4. Exemplary Embodiment of the Non-Linear Function

Referring now to FIG. 11A, an exemplary embodiment of the non-linear function utilizing the variable F1 for the encryption and decryption functions is shown. The operations of the non-linear function demonstrate the dependence on the IID and the encryption key. The non-linear function is used in two different aspects. For one aspect, the values produced by this function are used to determine the size of plain text block to be encrypted. For another aspect, the values produced by this function are used as one of the variables in the XOR operation in the encryption function.

In particular, as shown, the non-linear function computes an integer F0 unique to a given encryption key (see items 600 and 610). The conversion may be based on a simple function that uses the ASCII values of the characters of the key. Alternative conversion techniques include a one-way conversion function such as a hash function. Next, the IID is converted into a new number that depends upon the contents of variable F0 (see items 620 and 630).

Herein, the non-linear function is initiated by the value of F0 and the IID. The non-linear function requires three inputs. F1 is the third variable and is initialized to value of F0 (see item 640). Using F0, F1, and the IID, the non-linear function calculates a new value FT (see items 650 and 660). One example of a simple non-linear function is FT= (((F0*F1+1073741823)*IID) % 2147483647+right shift IID by one bit). The new value FT becomes F1, and the previous value of F1 becomes F0 (see items 670 and 680). Successive iterations of the non-linear function use the current value, F1 and the previous value F0 as variable parameters as represented by dashed feedback lines. The re-mapped IID is not changed in successive iterations. A wide range of non-linear functions, chaotic functions, data from a pseudo-random sequence, and the like may be used in this operation.

5. Exemplary Embodiment of the First Shuffling Routine

Figure 12:
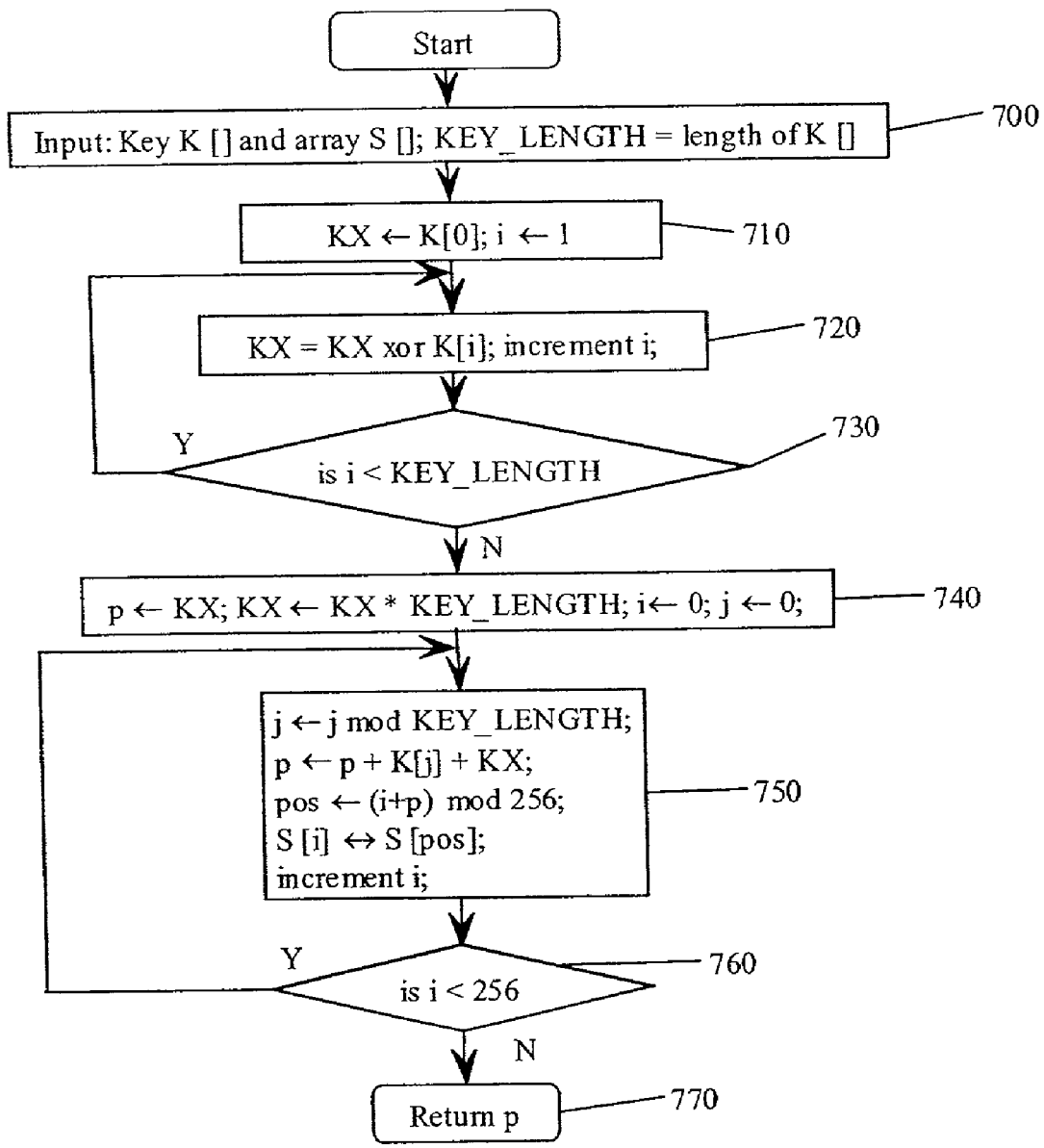
FIG. 12 is an exemplary embodiment of a first shuffling routine used by the encryption function of FIGS. 1A, 2A and 2B and decryption function of FIGS. 1B, 15 and 16.
Figure 13:
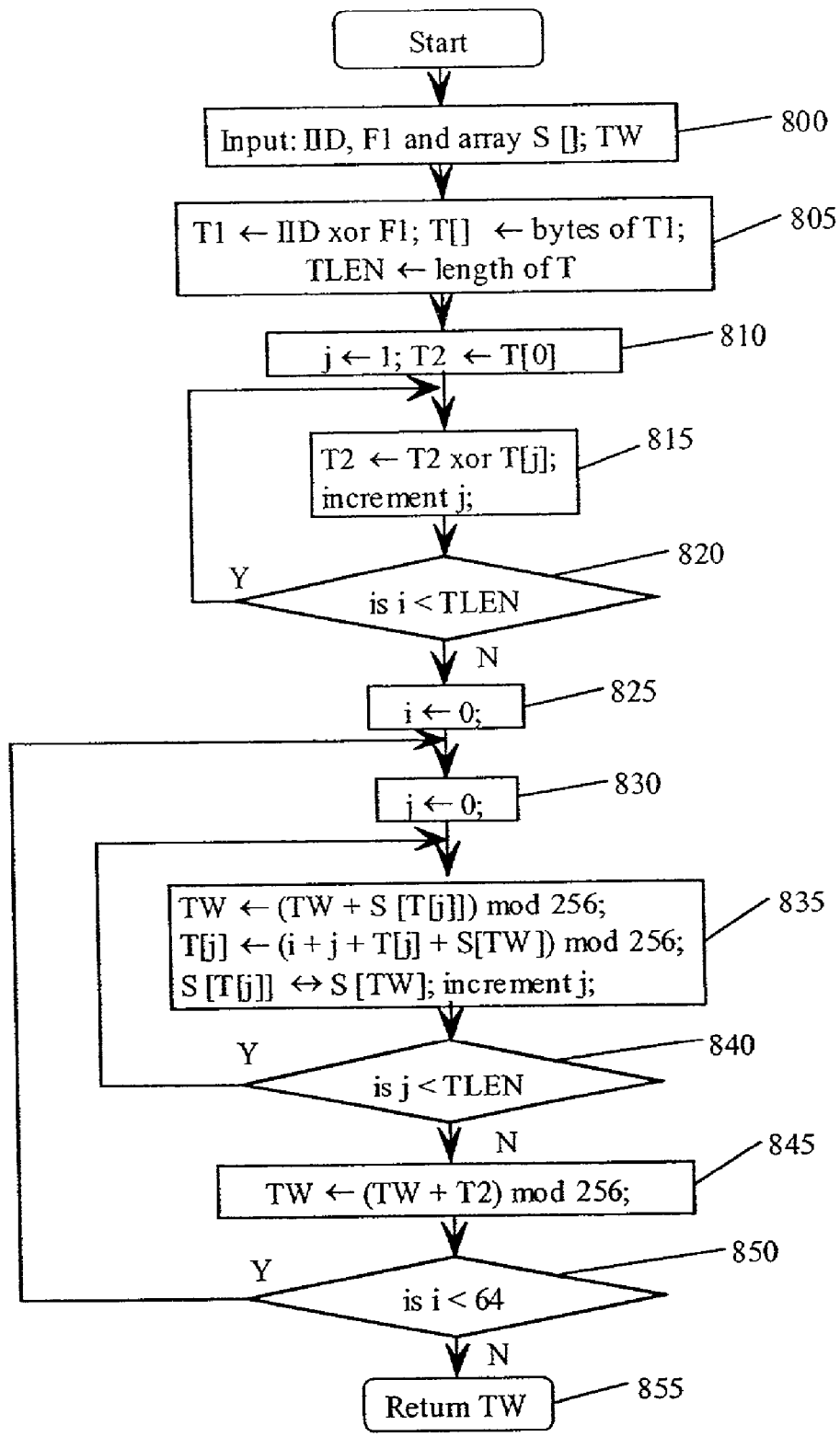
FIG. 13 is an exemplary embodiment of a second shuffling routine used by the encryption function of FIGS. 1A, 2A and 2B and the decryption function of FIGS. 1B, 15 and 16.

Referring to FIG. 12, an exemplary embodiment of a first shuffling routine used by the encryption function of FIGS. 1, 2A and 2B is shown. In general, the encryption key is converted into its ASCII values and stored in a byte array K[ ] (see item 700). The variable KX is the bitwise XOR (BXOR) of all the values in the array K[ ] (see items 710–730). The first shuffling routine is initiated by KX. Hence, even if one of the bits of the key has changed, the shuffle sequence for the first shuffling routine will change. One advantage is that keys that are close to each other in terms of bit patterns will have diverse shuffling paths.

The initial value of KX is stored in the variable p, and KX is re-mapped to a new value based on its initial value and the length of the encryption key (see item 740). The value KX is a bias applied to the first shuffling routine. The benefit of this bias is that even if one of the bit of the encryption key is different, the bias changes, and as a consequence the shuffling operations change. Thus, changing one bit of the encryption requires complete re-calculation of the internal state S[ ], which differs from conventional shuffling methods where operations for the identical bit positions are identical. This gives the encryption function more security.

As shown in items 750, the variables "p" and "pos" are computed. Then, these variables are used to exchange elements in the state array S[ ], where S[ ] is shown to have 256 entries in this exemplary embodiment. The exchange process is iterated until all 256 data elements in the array have been exchanged (see items 740–760). The last value of "p" is returned to the application, which is used in the encryption and distribution (see item 770). If an 8-bit table or S-box is used, the values of "p" and "pos" are within 256. The whole shuffling routine could be also done without any change on an N-bit or higher basis too. The only change necessary for an N-bit table is that the number of iterations would be $2^N-1$, and all functions are modulo $2^N-1$.

6. Exemplary Embodiment of the Second Shuffling Routine

Referring to FIG. 13, an exemplary embodiment of a second shuffling routine used by the encryption function of FIGS. 1–2 is shown. A single shuffling process based only on the encryption key sometimes gives rise to "weak keys," which allow part of the internal state of the computing device S[ ] to be predicted for the given key. Therefore, a second shuffling routine has been added, and it is based on the IID (see item 800). In this discussion, for the purpose of illustration, we have considered IID to be a long value, and this may be one possible implementation. The value in the variable IID is converted into a byte array T[ ] (see item 805).

Initially, the second shuffling routine evaluates a bitwise XOR (BXOR) of all the bytes in T[ ] (see items 810–820). As this shuffling routine proceeds, the values in T[ ] are modified based on the state of the computing device S[ ], and current value of T[ ]. The variables TW, T2 and T[ ] are used in the shuffling routine (see items 825–850). Since we have considered IID as a long variable, it is made up of 4 bytes. With respect to the exemplary embodiment of S[ ] being an 8-bit table, to iterate through 256 values of the S[ ], we would require 64 iterations. In each loop, all the bytes of T[ ] are used in the shuffling. Hence, the routine executes a total of 256 shuffling operations. The final value of TW is returned and used in the encryption process (see item 855).

7. Exemplary Embodiment of the Hiding Function

Figure 14:
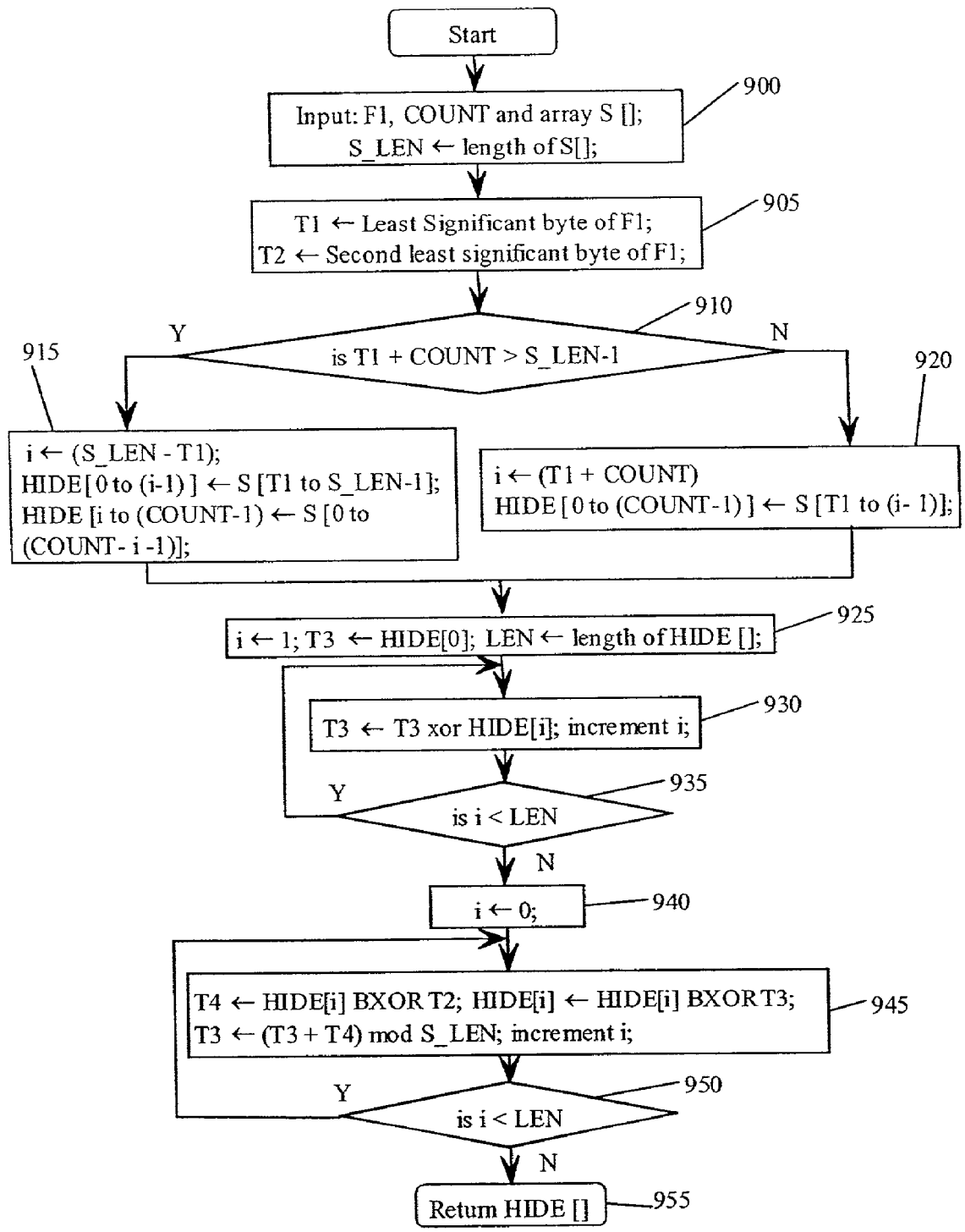
FIG. 14 is an exemplary embodiment of a hiding routine utilized by the encryption function of FIGS. 1A, 2A and 2B and the decryption function of FIGS. 1B, 15 and 16.

Referring now to FIG. 14, an exemplary embodiment of a hiding routine utilized by the encryption function of FIGS. 1–2 is shown. One purpose of the hiding routine is to essentially obfuscate the internal state of the computing device from a known plain text data. This routine is designed to be a one-way function, and hence does not have an inverse. The input to this function is the array S[ ], the variable F1 (value generated by the non-linear function), and the variable COUNT (see item 900). The variable COUNT contains the number of elements being encrypted in the current block. Hence, this routine will generate "COUNT" elements in HIDE[ ] to obfuscate the plain text data elements before encryption. The length of the shuffled array S[ ] is stored in the variable S_LEN (see item 900).

Initially, the least significant byte of the variable F1 is calculated (see item 905) and stored in variable T1. The next most significant byte of F1 is stored in the variable T2 (see line 2 item 905). The next operation involves copying "COUNT" data elements from S[ ] starting at the index T1 to HIDE[ ]. The routine then checks to see if "COUNT" data elements are available in S[ ] starting at the index T1 (see item 910). If "COUNT" data elements are available, they are copied to the array HIDE[ ] (see item 920). Otherwise, the routine copies the elements available from index T1 to the end of the array to HIDE[ ] (see line 2 of item 915). The remainder of the data elements (i.e., COUNT−(S_LEN−1)) are copied from the beginning of the array S[ ] at index 0 (see lines 3–4 of item 915).

The next operation involves evaluating the bitwise XOR (BXOR) of all values stored in the array HIDE[ ] (see items 925–935). Using the value T2 obtained from F1 and the generated value T3 the elements of HIDE[ ] are modified through usage of a BXOR operation (see items 940–950). The use of the modulus function in the computation of variable T3 combined with the bitwise XOR (BXOR), makes this routine a one-way function (see item 945). One may also use any one-way functions, a mathematical function or operation or data elements from a pseudo-random sequence, and the like to generate HIDE[ ]. The values thus evaluated in HIDE[ ] are returned (see item 955) to the main routine where they are used to obfuscate the plain text before the encryption process.

B. Illustrative Embodiment of the Decryption Function

Figure 15:
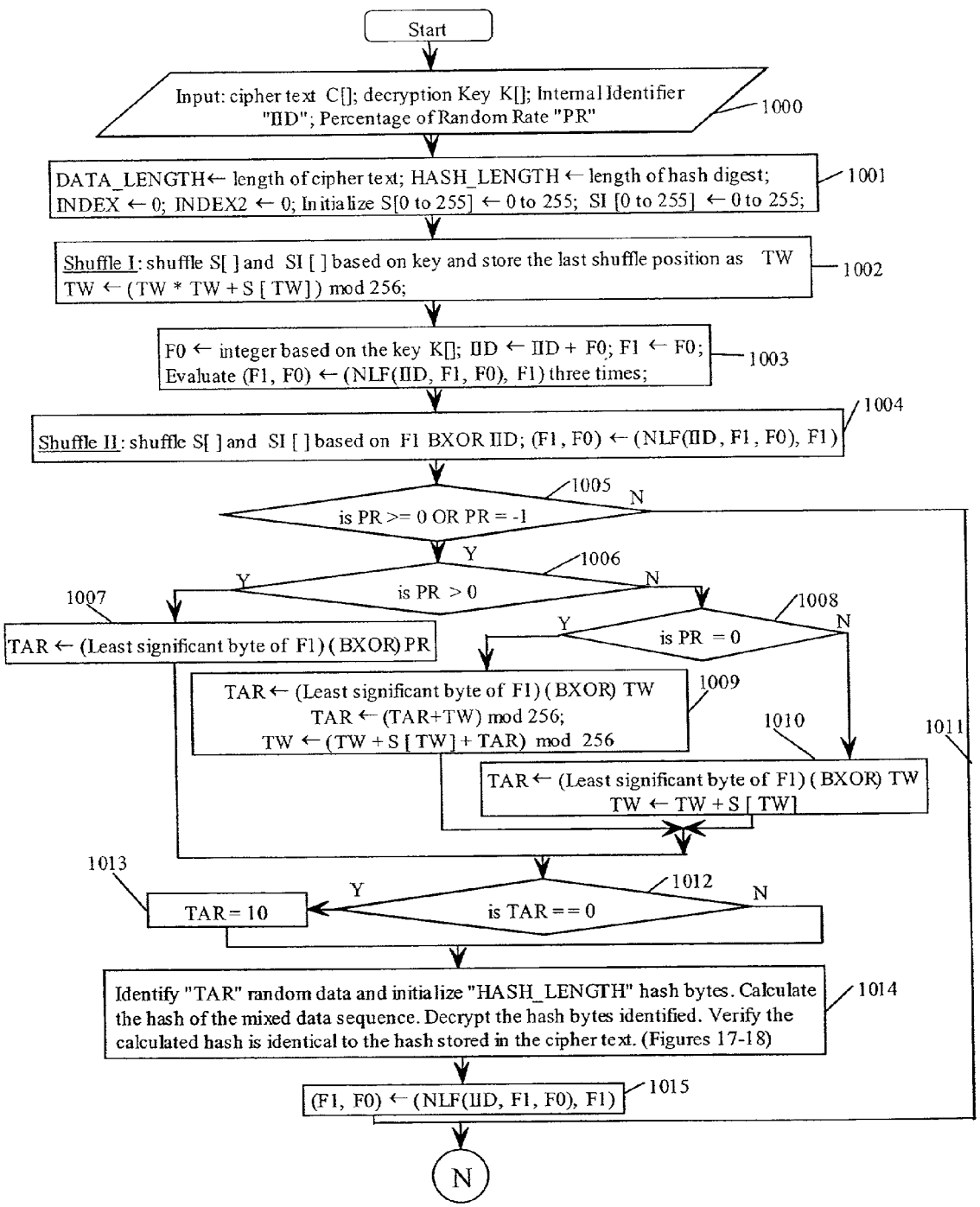
FIGS. 15 and 16 are an exemplary embodiment of a decryption function for the state-varying hybrid stream cipher.
Figure 16:
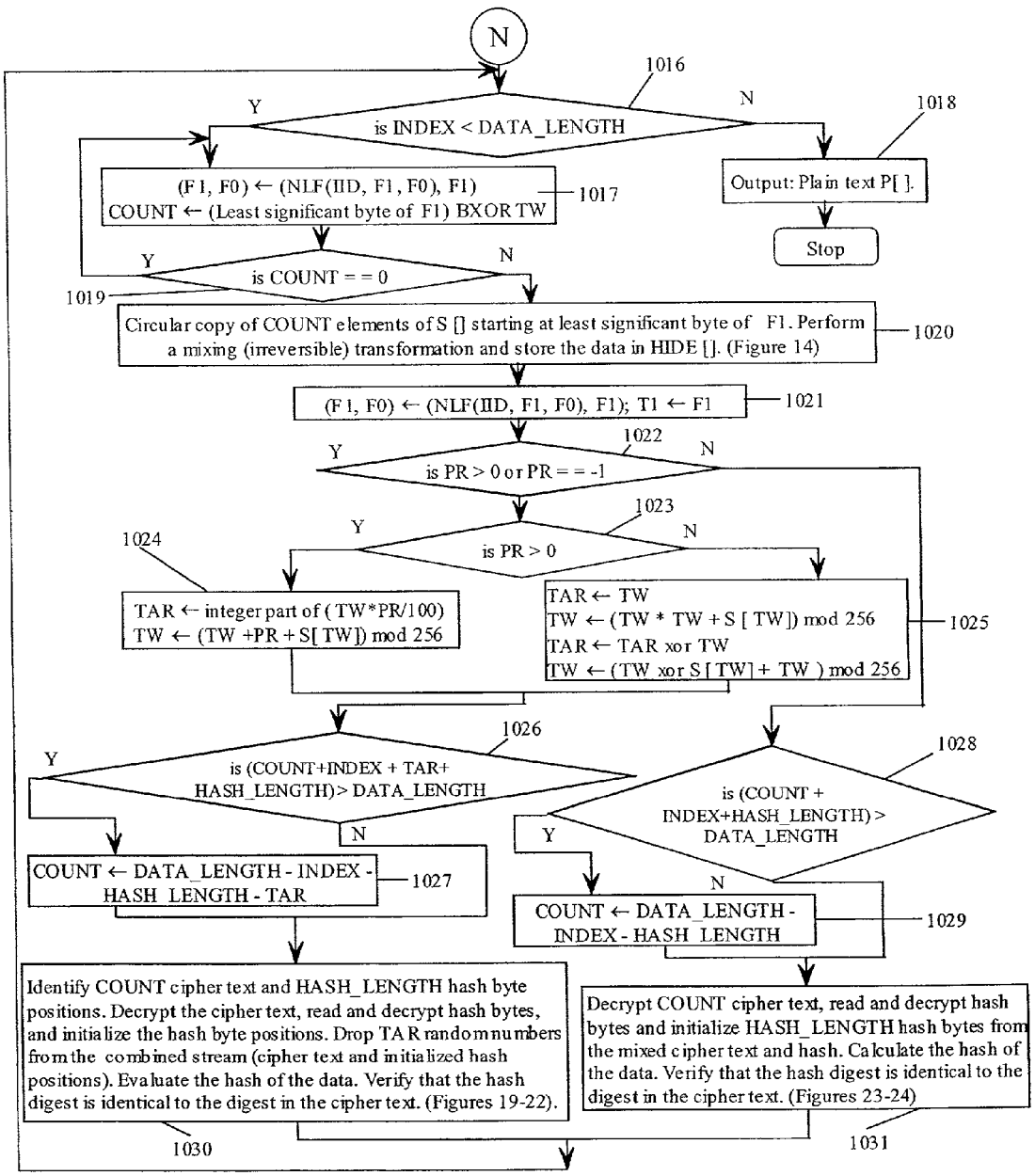

Referring now to FIGS. 15 and 16, an exemplary embodiment of a decryption function for a state-varying hybrid stream cipher is shown. The state-varying hybrid stream cipher receives inputs including the cipher text to be decrypted, decryption key and a percentage of random data (see item 1000). In the event that the state-varying hybrid stream cipher is software or firmware code, the cipher text to be decrypted may be stored in the array C[ ] and the decryption key may be stored as a sequence of bytes in the array K[ ]. The internal identifier (IID) is unique per user or per copy of the cipher application. The variable "PR" represents the percentage of random data to be removed from the cipher text. Thus as shown C[ ], K[ ], IID and PR are the inputs for the decryption function of the state-varying hybrid stream cipher (see item 1000).

As shown in item 1001, the arrays S[ ] and S[ ] are initialized. The array S[ ] is representative of the state of computing device, may be configured as a M-bit table warranting initialization of table entries from S[0] to $S[2^{M-1}]$. As shown, S[ ] is an 8-bit table with entries from S[0] to S[255] for illustration purposes. The array SI[ ] is a table related to the internal state of the computing device S[ ], and helps to accelerate the decryption function. The table SI[ ] is also an 8-bit table with entries from SI[0] to SI[255]. The variables INDEX and INDEX2 are the indices that correspond to the cipher text data element(s) being decrypted and the plain text element(s) being generated respectively. These variables are initialized to 0, pointing to the first element in the corresponding arrays (see item 1001).

The decryption function is similar to the encryption function. The arrays S[ ] and SI[ ] are permuted in accordance with the plurality of shuffling routines shown in FIGS.

12 and 13 (see items 1002 and 1004). In the decryption function, a second array SI[ ] is permuted at the same time as array S[ ]. The elements of array SI[ ] are permuted so that a lookup on the SI[ ] corresponds to the inverse of lookup on S[ ]. Thus, encryption and/or decryption may be achieved through table lookups. Decryption does not require searching the table. The initialization in item 1003 is identical to the initialization in the encryption function as shown in item 115 FIG. 2A.

Random data was added at the beginning of the cipher text data stream during encryption (see item 175, FIG. 2A). The random data is identified and removed at the decryption function. The variable TAR represents the amount of random data to be removed, and the variable is initialized based on the value of the variable PR (see item 1005). The initialization of the variable TAR in items 1005–1013 is identical to the initialization discussed in items 130–170 of FIG. 2A. If the user or application chooses PR as any negative value other than −1, no random data is removed (see item 1011).

Figure 17:
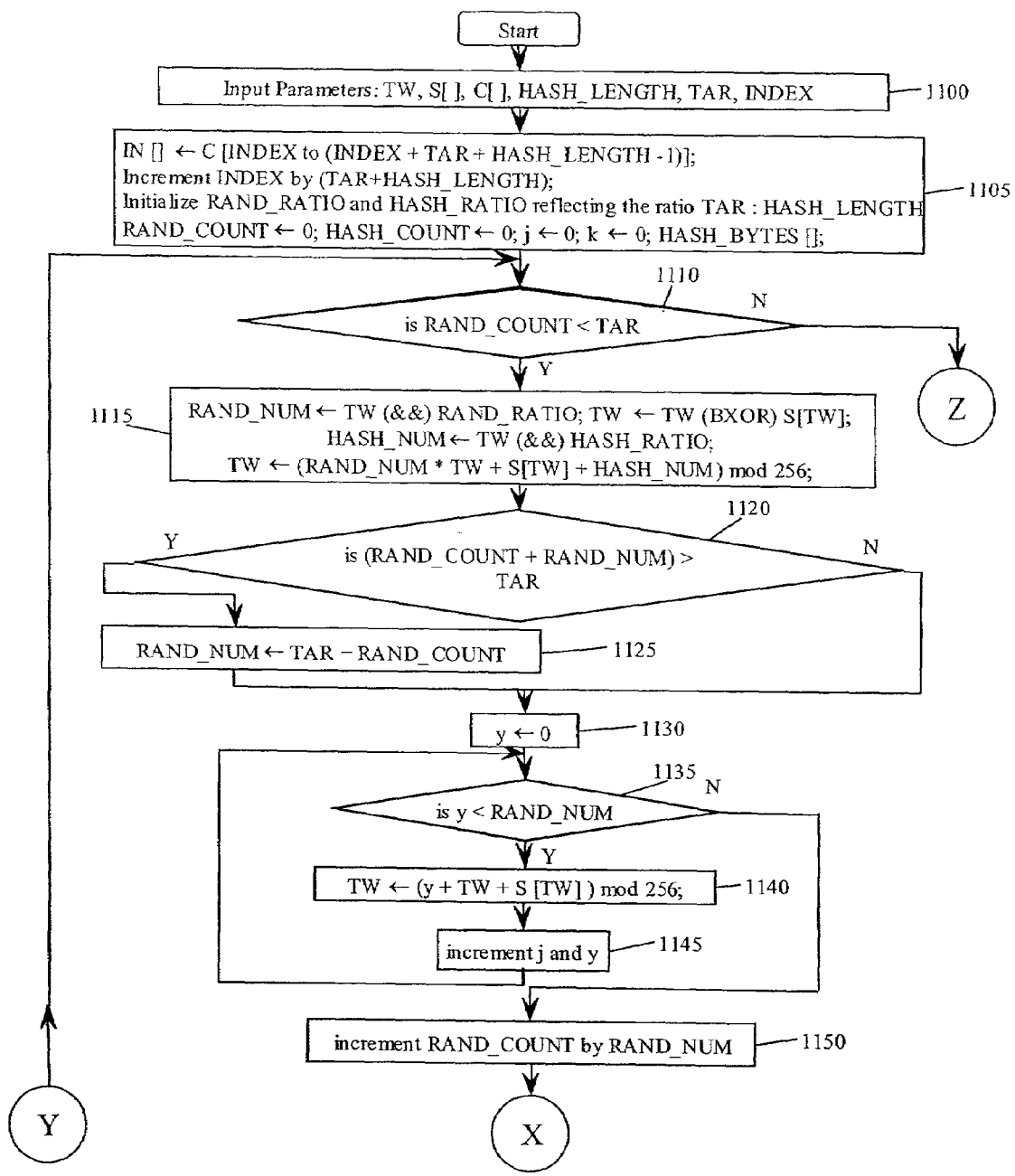
FIGS. 17 and 18 are an exemplary embodiment of a first verification routine for verifying hash bytes among random data stream.
Figure 18:
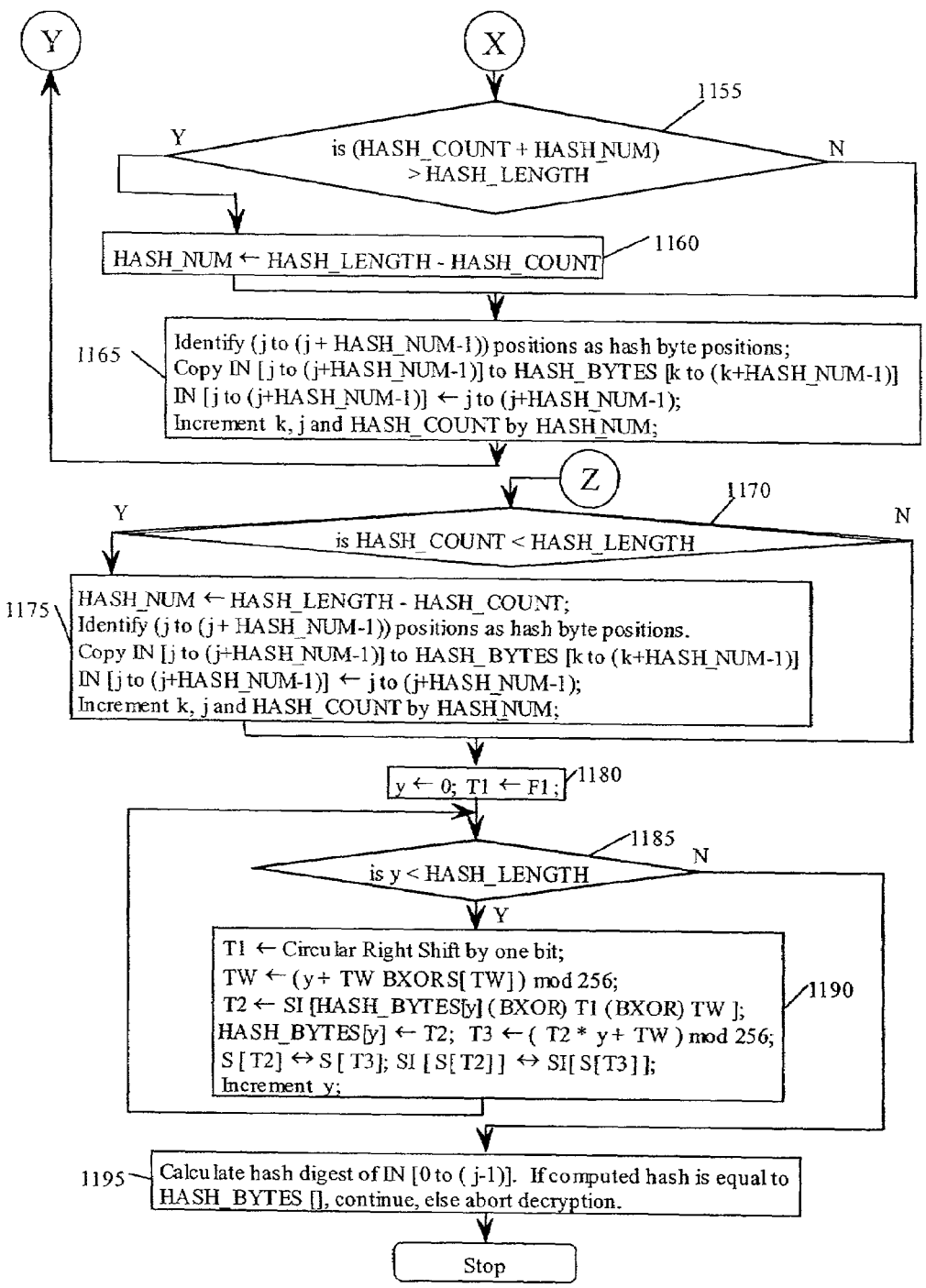
Figure 19:
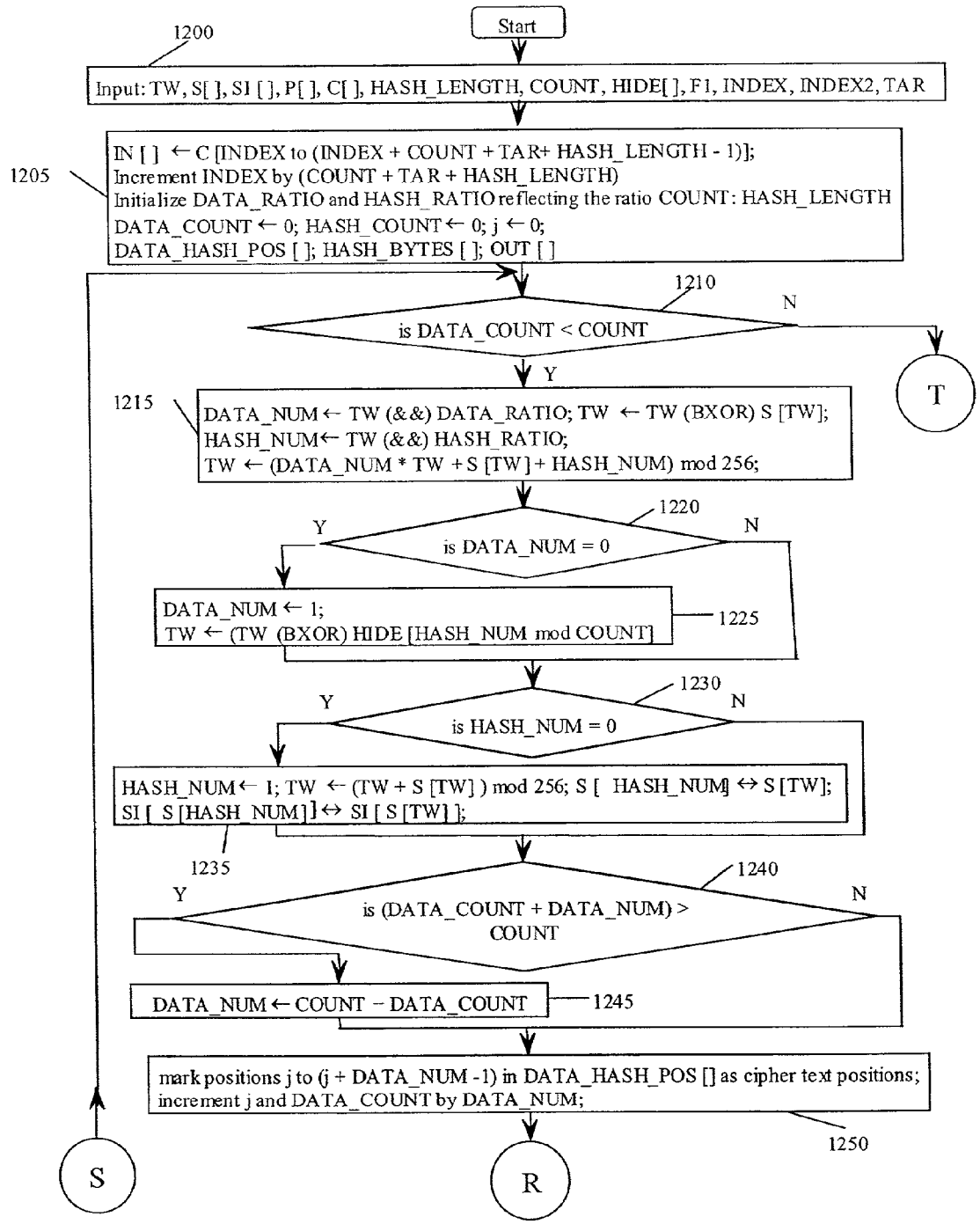
FIGS. 19, 20, 21 and 22 are an exemplary embodiment of a second verification routine for removing random data, decrypting cipher text and verifying hash bytes in the current data block.

Another feature introduced in the state-varying hybrid stream cipher is the verification of the hash bytes mixed with the random data added at the beginning of the stream (see item 1014 discussed in more detail in FIGS. 17–18). Generally, the first operation in this routine involves identifying the random data and the hash byte positions. Hash bytes from the identified positions are copied into an array HASH_BYTES[ ], and these positions are initialized with the digital signature. If the user has not specified a digital signature, the hash byte positions may be initialized with the internal positional variable or elements from a pseudo-random sequence, which is equivalent to automatically adding a signature to the cipher text. The data in the variable HASH_BYTES[ ] is then decrypted and stored in HASH_BYTES[ ]. The hash digest of the data stream is computed and compared to the bytes stored in the array HASH_BYTES[ ]. If the digests are identical, the routine continues with the decryption. If the digests are not identical, the decryption function is aborted. This is important from the point of security, as an improper hash signature would indicate that some error has occurred. Errors could arise due to transmission errors. Data storage errors (media on which data is stored is damaged or corrupted) would also generate these errors. Virus infected encrypted files would also have errors at decryption. Data modified or changed during transmission through the internet or any public domain links would also generate these errors. Another feature that can be incorporated is that error-correcting codes can be interspersed in the data stream and could be used to correct errors in transmission bits or media storage errors, or may be correct bits modified by an interloper. The value of the variable F1 has been used in the decryption of the hash bytes. Therefore, a new value of F1 is evaluated (see item 1015).

The function iterates until all the data in the cipher text has been processed (see item 1016), and the plain text is stored in the array P[ ]. On completion of the whole decryption function, the plain text is sent to the output device (see item 1018) such as an output stream, file, memory component, transceiver and the like.

The decryption function identifies the number of elements to be decrypted in the current block, and stores the value in the variable COUNT (see item 1017). The routine ensures that the block size is never zero (see items 1017, and 1019), and in each iteration "COUNT" plain text data elements are decrypted.

The state-varying hybrid stream cipher generates data elements in the array HIDE[ ] (see item 205 of FIG. 2B) to modify the plain text statistics and to hide the internal state of the computing device. Hence, the array HIDE[ ] may be used by the routine to reverse the process and generate original plain text. The generation of values in the array HIDE[ ] (see item 1020) is described in FIG. 14. A new value of F1 (see item 1021) is calculated as the current value of F1 has been used in the generation of the array HIDE[ ].

Figure 22:
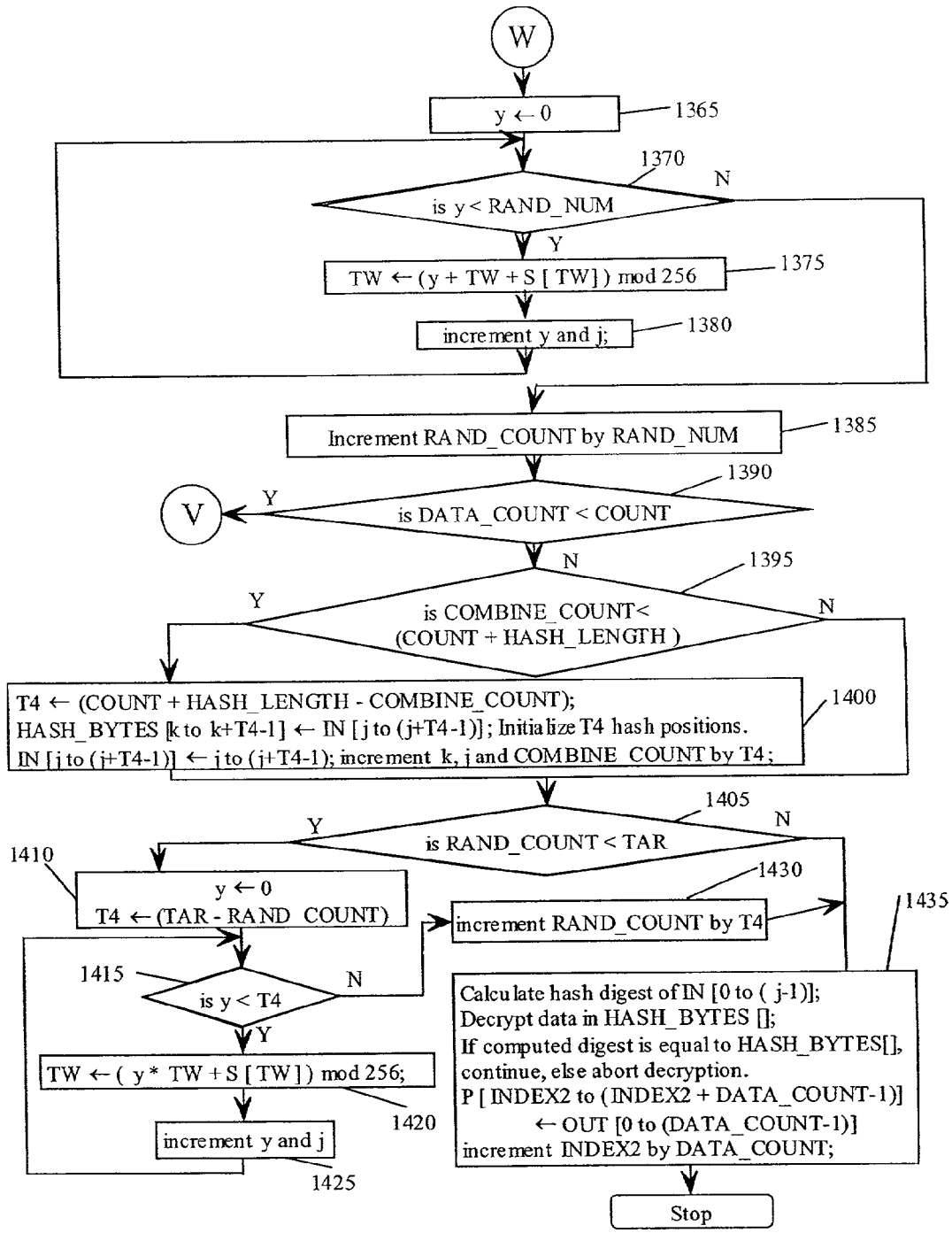
Figure 23:
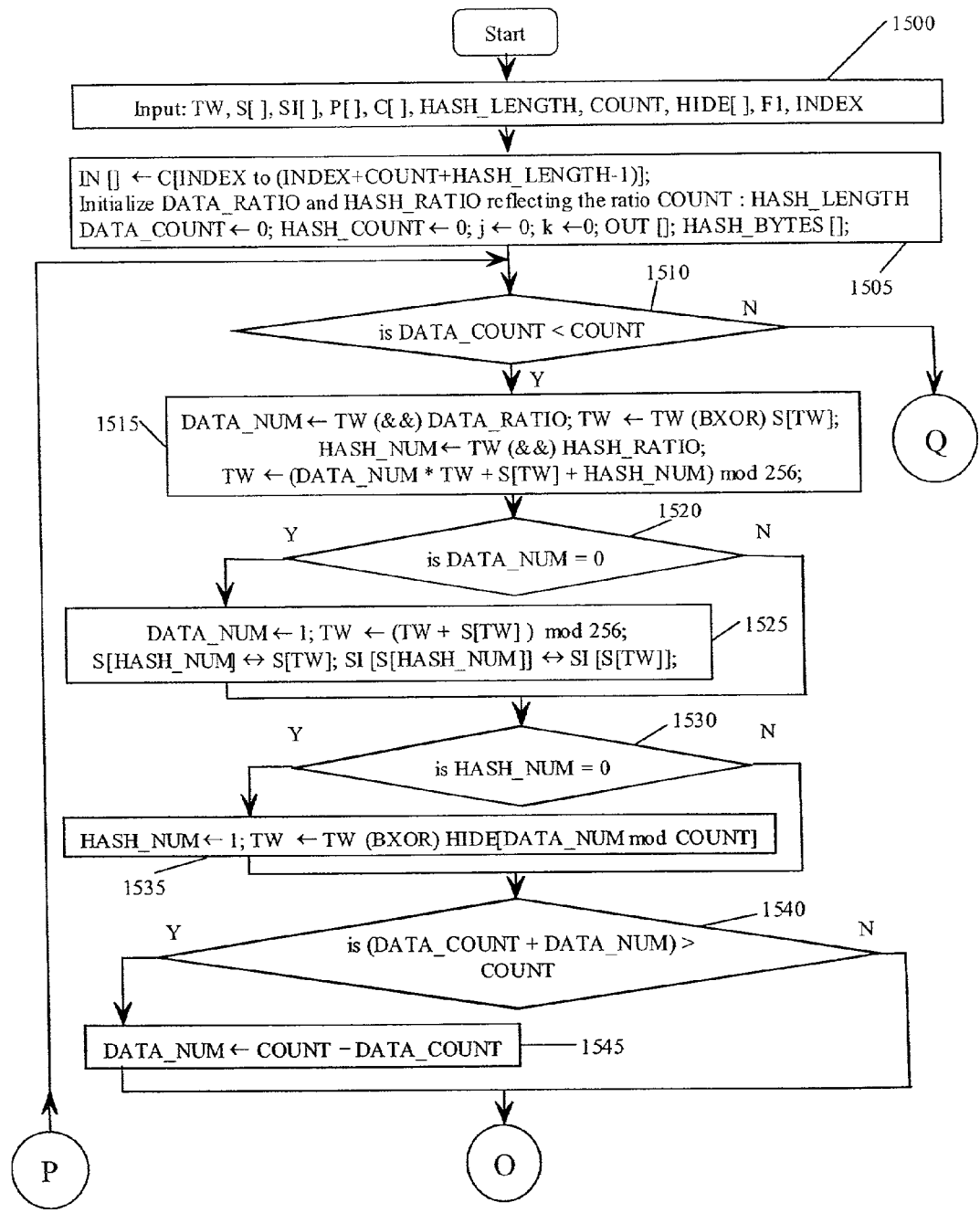
FIGS. 23 and 24 are an exemplary embodiment of operations performed by the third verification routine for verifying hash bytes and decrypting cipher text data.
Figure 24:
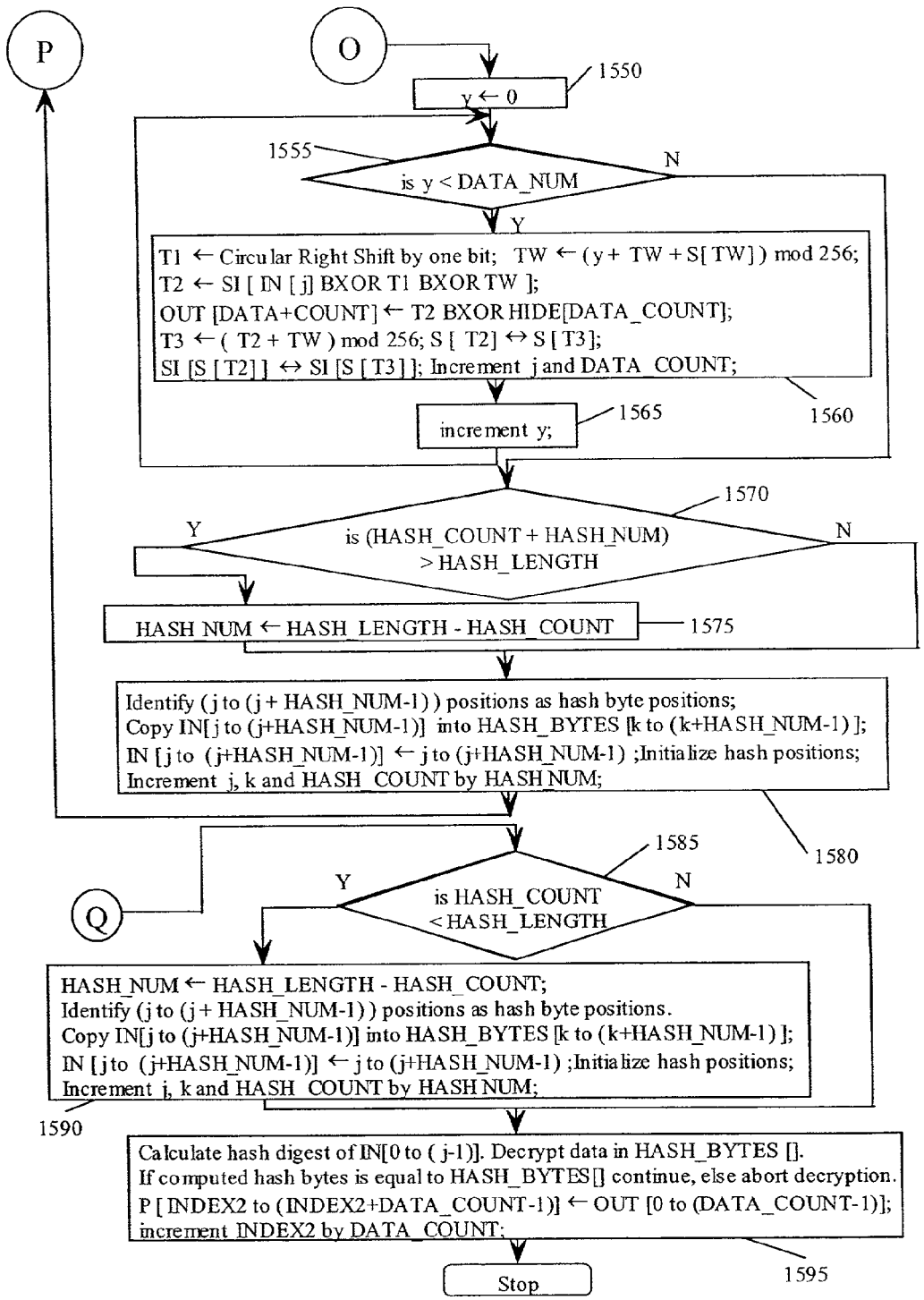

The state-varying hybrid stream cipher differentiates the decryption function based on the percentage of randomness specified by the user (see item 1022). If the percentage of randomness (PR) selected by the user is zero, the decryption is accomplished by a routine (see items 1028, 1029, 1031), where one embodiment of the same is shown in FIGS. 23–24. If the value of PR is greater than zero or equals −1, decryption is achieved by the routine (see items 1026, 1027, 1030), where one embodiment of the same is shown in FIGS. 19–22.

In the event that the value of PR is greater than the first threshold (PR>0), the amount of random data removed is the result of multiplying the contents of PR with TW (see item 1024), and is stored in the variable TAR. If the value of PR is equal to a second threshold (PR=−1), the function considers the amount of random data to be removed as automatic. The function then performs BXOR operations on consecutive values of TW to compute the amount of random data to be removed. This value is stored in the variable TAR (see item 1025). The function then determines if there are "COUNT" elements to be decrypted in the cipher text sequence (see item 1026). If the number of data elements available in the cipher text stream is less then COUNT, the variable COUNT is adjusted to the amount of data elements remaining in the cipher text (see item 1027). Thus, the decryption function can work on any given length of cipher text, without appending zeros to the cipher text sequence.

Another feature introduced by the state-varying hybrid stream cipher involves a second verification and decryption routine which includes decrypting "COUNT" cipher text, removing "TAR" random data, and verifying the hash bytes in cipher text stream (see item 1030). The details of this verification and decryption routine are presented in FIGS. 19–22. In general, cipher text positions and hash byte positions are identified based on the ratio COUNT:HASH_LENGTH. Next, the combined stream data (including cipher text and hash bytes) and the random data are separated in the data sequence. Then, the second verification routine decrypts the cipher text at the positions previously identified, copies the hash bytes into the array HASH_BYTES[ ], and initializes the hash byte positions in the data stream. If the user had specified a digital signature, the hash byte positions are initialized with the bytes from the digital signature. Otherwise, the routine initializes the hash byte positions with the internal positional variable, which is equivalent to automatically adding a signature to the cipher text. The data in the array HASH_BYTES[ ] is then decrypted and stored in the array HASH_BYTES[ ]. The hash digest of the data stream is then computed and compared to the bytes stored in the array HASH_BYTES[ ]. If the digests are identical, the routine continues with the decryption. If the digests are not identical, the second verification routine is aborted. This is important from the point of security, as an improper hash signature would indicate that some error has occurred. Errors could arise due to transmission, data storage (media on which data is stored is damaged or corrupted), virus infected files, and cipher text modified during transmission. Another feature that can be incorporated is that error-correcting codes can be interspersed in the data stream and could be used to correct errors in transmission or media storage, or may be correct bits modified by an interloper.

If the percentage of randomness specified by the user is zero, random data does not exist in the cipher text stream. The third verification routine ensures that there are "COUNT" cipher text elements in the data stream (see item 1028). If the number of data elements available in the cipher text stream is less then COUNT, the variable COUNT is adjusted to the amount of data elements remaining in the cipher text (see item 1029). Thus, the process can operate on any given length of cipher text, without appending zeros to the cipher text sequence. A third verification routine is then executed which decrypts the cipher text, and verifies the hash signature in the data sequence (see item 1031). The details of the complete process are presented in FIGS. 23–24. In general, the routine identifies "COUNT" cipher text and "HASH_LENGTH" hash byte positions in the data stream. In the next operation, the routine decrypts the cipher text, copies the hash bytes to the array HASH_BYTES[ ], and initializes the hash byte positions with a digital signature, or may be use data elements from a pseudo-random sequence. If the user has not specified a digital signature, the routine initializes the bytes with the internal positional variable, which is equivalent to adding a signature automatically.

The data in the array HASH_BYTES[ ] is decrypted and stored in the array HASH_BYTES [ ]. The hash digest of the data stream is then computed and compared to the bytes stored in the array HASH_BYTES[ ]. If the digests are identical, the third verification routine continues with the decryption. If the digests are not identical, this verification routine is aborted. This is important from the point of security, as an improper hash signature would indicate that some error has occurred. Errors could arise due to transmission, data storage (media on which data is stored is damaged or corrupted), virus infected files, and cipher text modified during transmission. Another feature that can be incorporated is that error-correcting codes can be interspersed in the data stream and could be used to correct errors in transmission or media storage, or to correct bits modified by an interloper.

1. Exemplary Embodiment of a First Verification Routine

Referring now to FIGS. 17 and 18, an exemplary embodiment of a routine for verifying hash bytes among random data stream is shown. The amount of random numbers added at the beginning of the cipher text stream is stored in the variable TAR, and the cipher text is stored in the array C[ ]. The variable HASH_LENGTH stores the number of bytes generated by the hash algorithm. This number is dependent on the hash function being used (see item 1100). The first verification routine identifies and separates TAR random data bytes from the "HASH_LENGTH" hash bytes in the cipher text sequence, and then verifies correctness of the hash digest.

The first operation for this first verification routine is to initialize the values of RAND_RATIO and HASH_RATIO proportional to the ratio TAR:HASH_LENGTH (see item 1105). The values of RAND_RATIO and HASH_RATIO reflect the values corresponding to the bit lengths ratio proportional to TAR and HASH_LENGTH (see FIG. 4C), and are necessary to identify the random data bytes and hash bytes in the mixed data sequence.

The data to be verified is copied into an input array IN[ ]. A single iteration of the first verification routine ensures that "TAR" random numbers are removed from the cipher text data stream (see item 1110). In an operation in the routine, the variable RAND_NUM stores the amount of random data mixed in the sequence, and is computed as TW && RAND_RATIO (see item 1115). Since TW has been used, it is mapped to a new value using the transformation TW=TW BXOR S[TW]. It can be observed from this operation that the next value of TW depends on the internal state of the computing device S[ ]. In the next operation, the variable HASH_NUM stores the amount of hash bytes added in the sequence, and is computed as TW && HASH_RATIO. The count of random data identified is stored in the variable RAND_COUNT.

The first verification routine determines the effect of adding RAND_NUM to RAND_COUNT (see item 1120) to ensure that only "TAR" random data is identified. If the addition increases the value of RAND_COUNT beyond TAR, the first verification routine adjusts the value of RAND_NUM accordingly (item 1125). At this stage, "RAND_NUM" random data is removed (see items 1130–1150).

The first verification routine further stores the number of hash bytes identified in the variable HASH_COUNT. Then, it determines the effect of adding HASH_NUM to HASH COUNT (items 1155) to ensure that only "HASH LENGTH" hash bytes are identified and initialized. If the addition increases the value of HASH_COUNT beyond HASH_LENGTH, the first verification routine adjusts the value of HASH_NUM accordingly (see item 1160). The hash bytes stored in the hash positions are identified and copied into HASH_BYTES[ ]. The hash positions in the array IN[ ] are then initialized by the internal positional variable "j". If the user has specified a digital signature, then bytes from the signature may be used to initialize the bytes, or elements from a pseudo-random sequence can be used to initialized the hash position in the array IN[ ] (see item 1165). This routine repeats until "TAR" random data have been removed from the cipher text (see items 1110–1165).

The first verification routine further monitors the value of HASH_COUNT (see item 1170) to ensure that all "HASH_LENGTH" bytes have been identified and initialized. If this value is less than HASH_LENGTH, the remainder (HASH_LENGTH−HASH_COUNT) of the hash positions are identified, copied into HASH_BYTES[ ] and initialized (see item 1175). The data in HASH_BYTES [ ] is decrypted and stored in the array HASH_BYTES [ ] (see items 1180–1190).

The operations for decrypting cipher text data element involve re-mapping of the value of TW at the start of the decryption process (see item 1190). The value in the variable T1 is right shifted by one bit. For the decryption function, the cipher text is used as an index to lookup a value in the array SI[ ], and the value obtained is bitwise XOR'ed (BXOR'ed) with T1 and TW. The elements of the tables S[ ] and SI[ ] used in the current operation are shuffled with values from the respective tables (see also item 1190).

In the final operation, the hash digest of the array IN[ ] is computed. The hash digest is then compared with the bytes in HASH_BYTES[ ]. If the hash digest matches the hash bytes, the decryption function continues. Otherwise, the decryption function aborts (see item 1195).

2. Exemplary Embodiment of a Second Verification Routine for Removing Random Data, Decrypting Cipher Text and Verifying Hash Bytes in the Current Block Referring to FIGS. 19–22, an exemplary embodiment of a second verification routine for removing random data, decrypting cipher text and verifying hash bytes in the current block is shown. The cipher text at this stage of the decryption function is a mix of random data, cipher text (encrypted plain text) and hash bytes. The amount of random numbers to be removed is stored in the variable TAR. The variable HASH_LENGTH stores the number of bytes generated by the hash function. The number of cipher text elements to be decrypted in the current block is stored in the variable COUNT. The cipher text to be decrypted is copied into an input array IN[ ] (see item 1205).

The first operation of the second verification routine involves identifying the hash byte positions and cipher text positions in the mixed data stream. To accomplish such distribution, the values of DATA_RATIO and HASH_RATIO are evaluated in item 1205 to be proportional to the ratio COUNT:HASH_LENGTH (see FIG. 4C). The process iterates until "COUNT" cipher text positions are identified (see item 1210) and decrypted. Next, the variable DATA_NUM stores the number of cipher text bytes mixed in the stream, and is computed as TW && DATA_RATIO. Since TW has been used, it is mapped to a new value using the transformation TW=TW BXOR S[TW] so that the next value of TW depends on the internal state of the computing device S[ ]. The variable HASH_NUM stores the number of hash bytes mixed in the stream, and is computed as TW && HASH_RATIO. As TW has been used, it is mapped to a new value (see item 1215).

The second verification routine ensures that DATA_NUM and HASH_NUM are non-zero to achieve proper mixing (see items 1220–1235). The count of cipher text positions identified is stored in the variable DATA_COUNT, and after adding DATA_NUM to DATA_COUNT, the routine determines the effects (see item 1240). If the addition increases the value of DATA_COUNT beyond COUNT, the second verification routine adjusts the value of DATA_NUM accordingly (see item 1245). The next "DATA_NUM" positions in the data stream are identified as cipher text positions (see item 1250).

The count of hash bytes identified is stored in the variable HASH_COUNT. The second verification routine then determines the effect of adding HASH NUM on HASH_COUNT (see item 1255) to ensure that only "HASH_NUM" hash bytes will be identified. If the addition increases the value of HASH_COUNT beyond HASH_LENGTH, the routine adjusts the value of HASH_NUM accordingly (see item 1260). Then "HASH_NUM" hash positions are identified (see item 1265). This sequence iterates until "COUNT" cipher text positions have been identified in the array DATA_HASH POS[ ] (see items 1220–1265).

The second verification routine further monitors the value of HASH_COUNT (see item 1270) to ensure that all "HASH_LENGTH" hash bytes have been identified. If this value is less than HASH_LENGTH, the remainder (HASH_LENGTH−HASH_COUNT) of the hash positions is identified in DATA_HASH_POS[ ] (see item 1275). Thus, the routine identifies cipher text and the hash bytes in the mixed stream.

Figure 20:
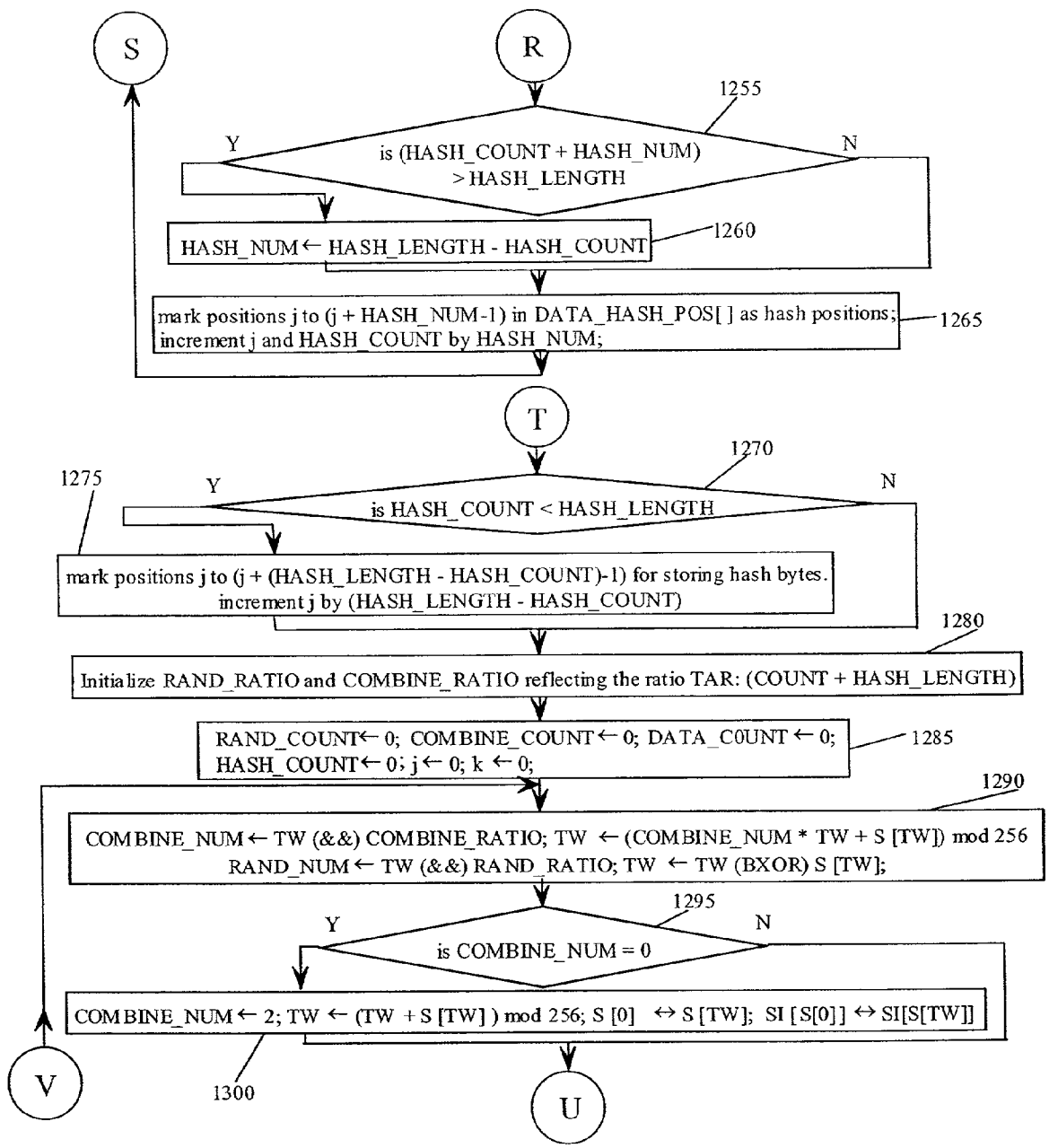

As shown in FIG. 20, the second verification routine further identifies the random data mixed with the combined stream. The combined stream is the hash distributed in the cipher text. As shown in item 1280, the values of RAND_RATIO and COMBINE_RATIO are initialized to be proportional to the ratio TAR:(COUNT+HASH_LENGTH) (see FIG. 4C) and assist in identifying the random bytes in the cipher text stream.

The variable COMBINE_NUM stores the number of data elements from the combined stream that have been used in the mixing, and is computed as TW && COMBINE_RATIO (see item 1290). Since TW has been used, it is mapped to a new value using the transformation TW=(COMBINE_NUM*TW+S[TW]) mod 256. Again, the next value of TW depends on the internal state of the computing device S[ ] and the value of COMBINE_NUM. Also, the variable RAND_NUM is computed as TW && RAND_RATIO.

Next, the second verification routine ensures that COMBINE_NUM and RAND_NUM are non-zero (see items 1295, 1300, 1305 and 1310) to achieve proper mixing. The count of plain text decrypted in the combined stream is stored in the variable DATA_COUNT. The routine determines the effect of processing "COMBINE_NUM" positions in the combined stream (see item 1315) to verify that sufficient elements are available in the mixed stream. The routine adjusts the value of COMBINE_NUM if there are insufficient positions in the combined stream (see item 1320).

The routine then processes COMBINE_NUM data elements from the combined stream (see items 1325–1350) using one iteration for each data element. If the current position in DATA_HASH_POS[ ] is reserved for a cipher text (see item 1335), one cipher text is decrypted and stored in OUT[ ] (see item 1340). Otherwise, the routine copies the bytes at hash positions into the array HASH BYTES[ ] and initializes the hash positions in the array IN[ ] with the internal positional variable (see item 1345), which is equal to adding a signature automatically. If the user has specified a signature, bytes from the signature may be used to initialize the hash positions, or elements from a pseudo-random sequence, or perhaps a sequence of bytes generated based on the signature may be used for initialization.

Figure 21:
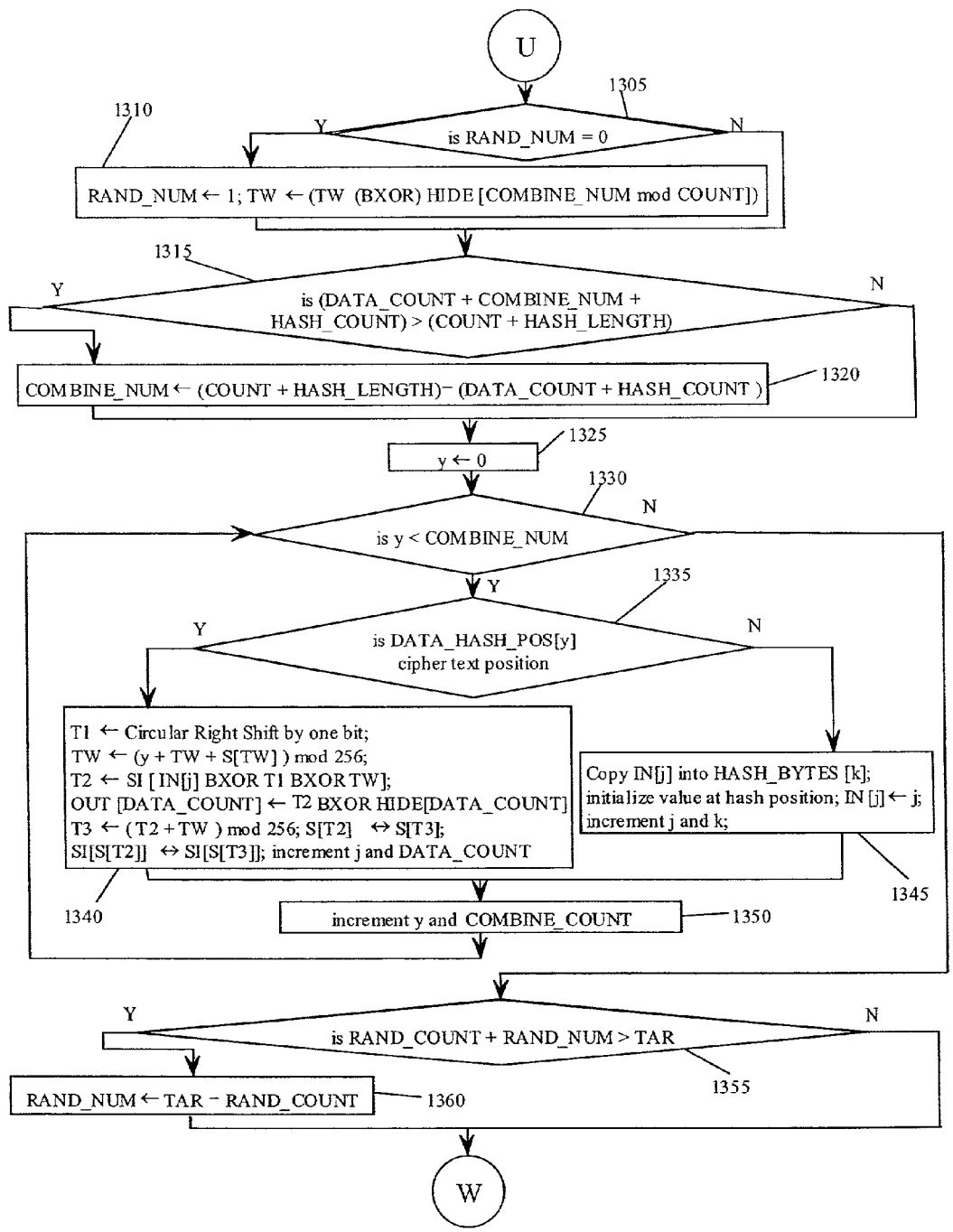

The operations for decrypting one cipher text data element, as shown in item 1340 of FIG. 21, is described next and generally shown in FIG. 25. The value of TW is mapped before being used in the decryption function (see item 1340). The variable T1 has been initialized with the value of F1 (see item 1018 of FIG. 16). The value in the variable T1 is right shifted by one bit. In the first operation of the decryption function, the cipher text is used as an index to lookup a value in the array SI[ ], and the value obtained by performing BXOR operation on T1 and TW. In the encryption process, the array HIDE[ ] was used to modify the plain text statistics before encryption. However, in the decryption function, the array HIDE[ ] is used to generate the plain text. The intermediate value and elements of the HIDE[ ] are used to generate the plain text. Since the cipher text is 8-bits long, the plain text generated is 8-bit long and is stored in the array OUT[ ]. The elements of the table S[ ] and SI[ ] used in the current operation are shuffled with values from the respective tables (see also item 1340).

The count of random data removed is stored in the variable RAND_COUNT. The routine then determines the effect of adding RAND_NUM to RAND_COUNT (see item 1355) to ensure that only "TAR" random numbers are identified and removed. If the addition increases the value of RAND_COUNT beyond TAR, the second verification routine adjusts the value of RAND_NUM accordingly (see item 1360). At this stage, as shown in FIG. 22, "RAND_NUM"

random data is removed (see items 1365–1385). This cycle repeats until "COUNT" plain text elements have been decrypted (see item 1390).

The second verification routine further determines the value of COMBINE COUNT to check whether all elements of the mixed stream have been processed. If this value is less than (COUNT+HASH_LENGTH), hash positions are still available in the mixed stream. Hence the remainder of the hash bytes are copied to HASH_BYTES[ ], and the hash positions are initialized (see items 1390, 1395 and 1400). If the user has specified a signature, bytes from the signature may be used, or may be a sequence of bytes generated based on the signature, or elements from a pseudo-random sequence may be used to initialize the hash positions. If the user has not specified a signature, the process initializes the hash bytes based on an internal positional variable "j", which is equivalent to adding the signature automatically.

The second verification routine determines the value of RAND_COUNT to ensure that "TAR" random data have been identified and removed (see item 1405). If this value is less than TAR, the remainder (TAR−RAND_COUNT) of the random bytes is identified and removed (see items 1410–1430). Since the encryption process has previously mixed "TAR" random data, "COUNT" cipher text data elements and "HASH_LENGTH" hash bytes, the exact same quantities should be processed in the decryption function.

Thereafter, the hash digest of the cipher text in the array IN[ ] is computed. The data in HASH_BYTES[ ] is decrypted in the manner described in items 1180–1190 of FIG. 18 and stored in the array HASH_BYTES[ ]. The hash digest is then compared with the bytes in HASH_BYTES[ ]. If the hash digest is identical, the decryption function continues. Otherwise, the second verification routine aborts. The plain text elements in OUT[ ] are then copied into the array P[ ] (see item 1435).

3. Exemplary Embodiment of the Third Verification Routine for Verifying Hash Bytes and Decrypting Cipher Text Referring now to FIGS. 23 and 24, an exemplary embodiment of operations performed by the third verification routine for identifying and verifying the hash bytes and decrypting the cipher text in the data stream. The amount of cipher text bytes to be decrypted in this operation is stored in the variable COUNT. The variable HASH_LENGTH stores the number of bytes generated by the hash function and its value is dependent on the hash function being used (see item 1500).

The third verification routine initializes the values of DATA_RATIO and HASH_RATIO to be proportional to the ratio COUNT:HASH_LENGTH (see FIG. 4C) to identify the cipher text and hash bytes in the data stream. The cipher text to be decrypted is copied to the input array IN[ ] and the routine loops until "COUNT" cipher text elements have been identified and decrypted (see items 1505 and 1510).

In particular, the variable DATA_NUM stores the number of cipher text elements mixed in the data stream, and is computed as TW && DATA_RATIO. DATA_RATIO reflects the mixing coefficient and assists in identifying the cipher text bytes in sequence (see item 1515). Since TW has been used, it may be mapped to a new value using the transformation TW=TW BXOR S[TW] so that the next value of TW depends on the internal state of the computing device S[ ]. Then, the variable HASH_NUM stores the number of hash bytes mixed in the stream, and is computed as TW && HASH_RATIO. HASH_RATIO reflects the mixing coefficient and assists in identifying the cipher text bytes in sequence. The value of TW is re-mapped to a new value based on S[ ], DATA_NUM and HASH_NUM as shown in item 1515 in FIG. 23.

The third verification routine ensures that DATA_NUM and HASH_NUM are non-zero (see items 1520–1535) to achieve proper mixing. The number of data elements decrypted is stored in the variable DATA_COUNT. The routine further determines the effect of adding DATA_NUM to DATA_COUNT (see item 1540) to ensure that only COUNT elements are decrypted. If the addition increases the value of DATA_COUNT beyond COUNT, the routine adjusts the value of DATA_NUM (see item 1545). Next, the routine decrypts "DATA_NUM" cipher text elements and stores the plain text generated in OUT[ ] (see items 1550–1565).

The operations for decrypting one cipher text data element involve re-mapping of the value of TW before being used in the decryption. The variable T1 has been initialized with the value of F1 (see item 1018 of FIG. 16). The value in the variable T1 is right shifted by one bit. For the decryption function, the cipher text is used as an index to lookup a value in the array SI[ ], and the value obtained is bitwise XOR'ed (BXOR'ed) with T1 and TW. The intermediate value and elements of the HIDE[ ] are used to generate the plain text (see item 1560). Since the cipher text is 8-bit long, the plain text generated is 8-bit long and is stored in the array OUT[ ]. The elements of the tables S[ ] and SI[ ] used in the current operation are shuffled with values from the respective tables (see also item 1560).

The number of hash bytes identified in the mixed stream is stored in the variable HASH_COUNT. The third verification routine determines the effect of adding HASH_NUM to HASH_COUNT to ensure that only "HASH_LENGTH" hash bytes are identified and initialized (see item 1570). If the addition increases the value of HASH_COUNT beyond HASH_LENGTH, the routine adjusts the value of HASH_NUM (see item 1575). Then, "HASH_NUM" hash bytes are copied to the array HASH_BYTES[ ] and the hash positions are initialized in the array IN[ ] (see item 1580). If the user has specified a signature, bytes from the signature may be used, or elements from a pseudo-random sequence may be used to initialize the hash positions. The iterations continue until "COUNT" plain text elements have been decrypted (see items 1510–1580).

The routine determines the value of HASH_COUNT to ensure that all of "HASH_LENGTH" bytes have been identified and initialized. If this value is less than HASH_LENGTH, the remainder (HASH_LENGTH−HASH_COUNT) of the hash positions are identified and copied into HASH_BYTES[ ], and these positions are initialized in the array IN[ ] (see items 1585 and 1590). Thus, the routine separates COUNT cipher text and HASH_LENGTH hash bytes from the data stream, and decrypts the separated cipher text.

As shown in item 1595, the hash digest of the array IN[ ] is computed. The data in HASH_BYTES[ ] is decrypted in the manner described in items 1180–1190 of FIG. 18 and stored in the array HASH BYTES[ ]. The hash digest is then compared with the bytes in HASH_BYTES[ ]. If the hash digest is identical to the bytes in the HASH_BYTES, the decryption function continues, else the routine aborts. The plain text elements in OUT[ ] are then copied into the output array P[ ].

II. Illustrative System Implementations

Figure 26:
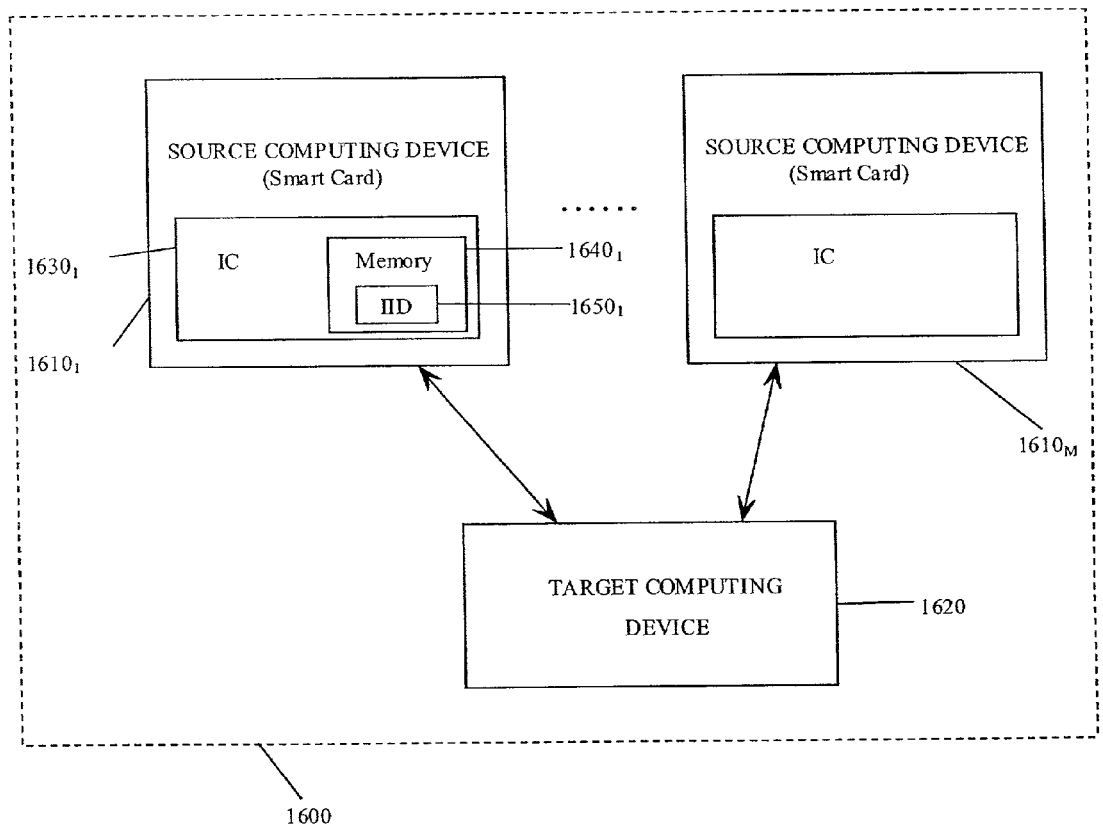
FIG. 26 is a first exemplary embodiment of a system utilizing the invention.

Referring to FIG. 26, an exemplary embodiment of a system utilizing the invention is shown. The system 1600 comprises one or more source computing devices 1610$_1$–1610$_M$ (M≧1) in communication with a targeted computing device 1620. For example, each of the computing devices may be loaded with software, firmware or hardware that enables encryption and/or decryption of information using a state-varying hybrid stream cipher as described in FIGS. 1–24. Of course, there exist a wide range of system embodiments for utilizing the state-varying hybrid stream cipher.

For instance, as shown in FIG. 26, the source computing devices 1610$_1$–1610$_M$ may be smart cards, each implemented with an integrated circuit 1630$_1$–1630$_M$ to perform the state-varying hybrid stream cipher. As an example, the integrated circuit 1630$_1$ may be configured with on-chip memory 1640$_1$ to store the encryption function and/or the decryption function of the state-varying hybrid stream cipher. A unique IID (e.g., IID 1650$_1$) would also be stored for each smart card (e.g., card 1610$_1$), which would enable that smart card to generate a unique encryption function. The targeted computing device 1620 may be a server for a financial institution that runs an application of the state-varying hybrid stream cipher as well. This enables a unique communication channel between the smart card and the server.

Figure 27:
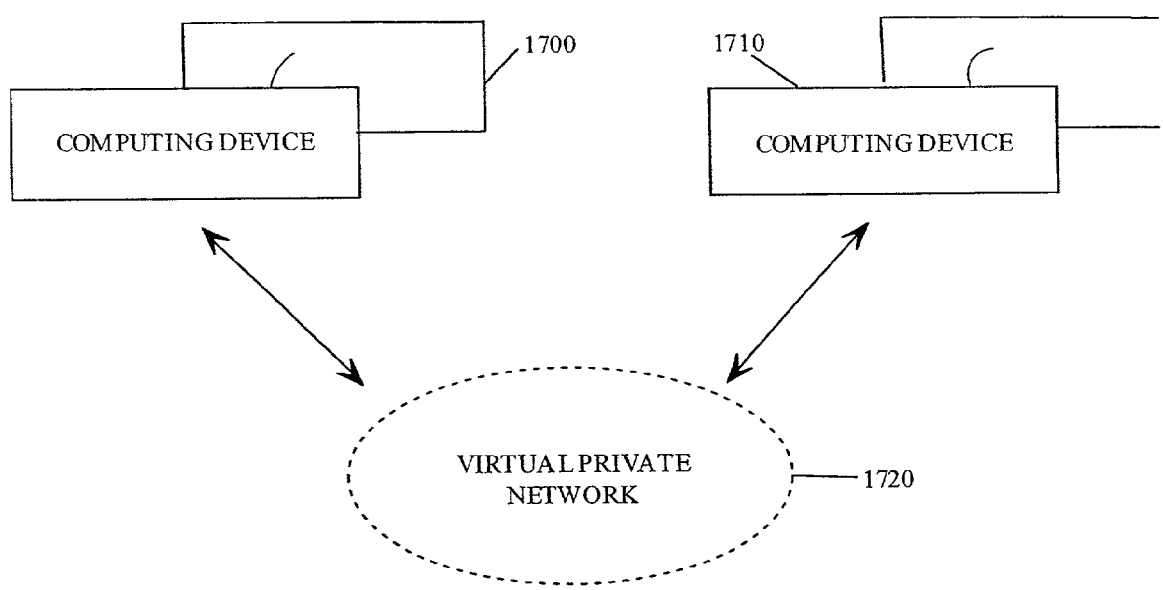
FIG. 27 is a second exemplary embodiment of a system utilizing the invention.

In another embodiment, as shown in FIG. 27, different groups of computing devices (e.g., groups 1700 and 1710) may be assigned different IIDs. Within these groups 1700 and 1710, the computing devices employ state-varying hybrid stream cipher functionality and are in communication with a network (e.g., a virtual private network, or a LAN or a WAN and the like) 1720 or a node coupled to a network (e.g., a server, gateway, intermediary data provider, etc.) employing such functionality. Thus, communications between groups 1700 and 1710 cannot be known even if passwords were predicted by knowing personal user information, or by other methods (reading memory or temporary space). Additionally, at least one unique IID may be reserved for multicast. The virtual private network 1720 could globally update software or download encrypted content with the same software or content being encrypted differently.

Although not shown as a figure, another exemplary embodiment is using the state-varying hybrid stream cipher for establishing secure communication channels between a user (e.g., an individual, business, etc.) with a service provider such as an Internet Service Provider (ISP), an online service organization, customer support, or a sales processing-procuring business system and the like. For the purpose of illustration only, the example of an ISP is discussed. A user buys a service from the ISP. The ISP allocates a unique IID to the individual user, and the state-varying hybrid stream cipher within a communication package is installed as software, hardware or as firmware at the user's computing device. Now, all communications between the ISP and the user are encrypted and unique, and no other interloper, or another user from the same ISP will be able to decrypt and understand the communications.

Figure 28:
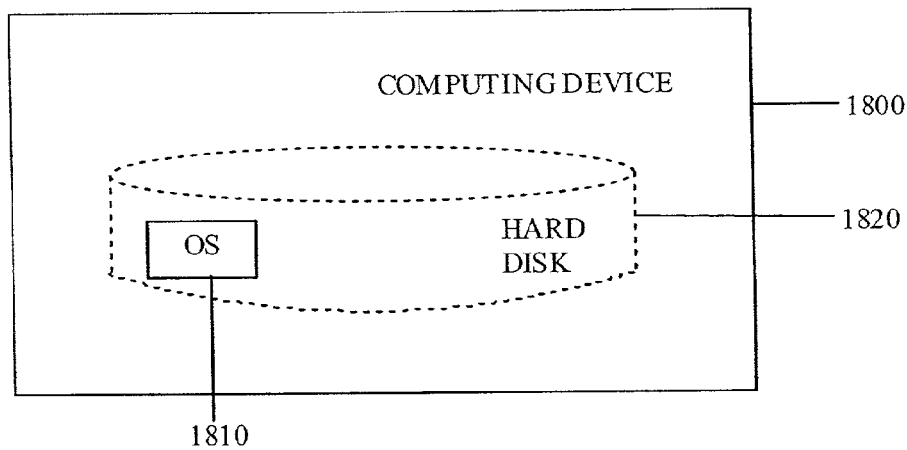
FIG. 28 is a third exemplary embodiment of a system utilizing the invention.

In yet another embodiment, as shown in FIG. 28, an operating system (OS) 1810 of a computing device 1800 is configured with state-varying hybrid stream cipher functionality. In one embodiment, all information stored within a hard disk 1820 of the computing device 1800 would be encrypted, including application files, text files, temporary files and the like. Each installation of the operating system 1810 will have a different IID, in contrast with conventional encryption techniques that are limited to a single methodology. Since encryption on one computing device is different from encryption on another computing device, it is more difficult for a person to replicate his or her efforts in hacking into a similar computing device. The reason is that uncovering the encryption key is not sufficient; rather, the hacker needs the IID for a particular encryption.

In yet another embodiment, although not shown, the state-varying hybrid stream cipher functionality may be employed within a server to enhance protection of information stored herein. Use of the state-varying hybrid stream cipher would ensure that the server would store information uniquely and securely, different from other servers even those using the same encryption key. This feature is highly valuable for database servers or web application servers.

Figure 29:
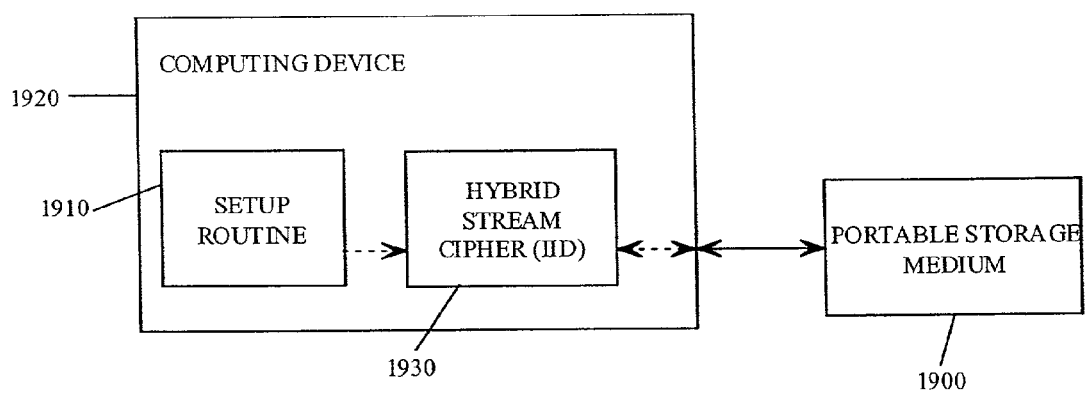
FIG. 29 is a fourth exemplary embodiment of a system utilizing the invention

Another embodiment, as shown in FIG. 29, the state-varying hybrid stream cipher functionality may be used for hard disk encryption. For instance, a secure application generates IIDs and perhaps random percentages. This data is stored on a portable storage medium 1900 such as an iButton for example. The iButton™ is a smartcard encased in a metal case, which is extremely sturdy and will self-destruct if tampered with. The same application further generates a setup routine 1910 to be installed on a targeted computing device 1920. This setup routine 1910 features an allocated IID and random percentage. When the setup routine 1910 is executed on the targeted computing device 1920, the state-varying hybrid stream cipher with the allocated IID is installed as a routine 1930. The user can encrypt and decrypt files on the computing device 1920 specifying a password, and the portable storage medium 1900 needs to be in communication with the state-varying hybrid stream cipher 1930. If the user wants to encrypt or decrypt files on computing device 1920 using the state-varying hybrid stream cipher, the application will not allow such encryption and/or decryption until the targeted computing device 1920 is in communication with the portable storage medium 1900, and the user password is correct.

Another exemplary embodiment using the state-varying hybrid stream cipher is to enhance secure transmission of data through the Internet. Generally, at the present time, encryption/decryption is performed at the application layer of the OSI 7 layer model for network communications protocol. The state-varying hybrid stream cipher included within the network layer would greatly enhance security, as the data seen by an interloper between router A and router B. would be totally different from the same data being transmitted between router B and router C. This feature will have an impact on the Internet, especially if the state-varying hybrid stream cipher is incorporated at the network layer itself. Another example where this invention is useful is in incorporating the state-varying hybrid stream cipher in wireless LAN (for example BLUETOOTH™), establishing secure individual wireless communications between two computing devices, and thus, preventing an interloper from reading and understanding the communications.

Another embodiment is using the state-varying hybrid stream cipher for electronic mail applications. Three embodiments for utilizing the state-varying hybrid stream cipher for electronic mail (e-mail) application scenarios are as follows.

Figure 30:
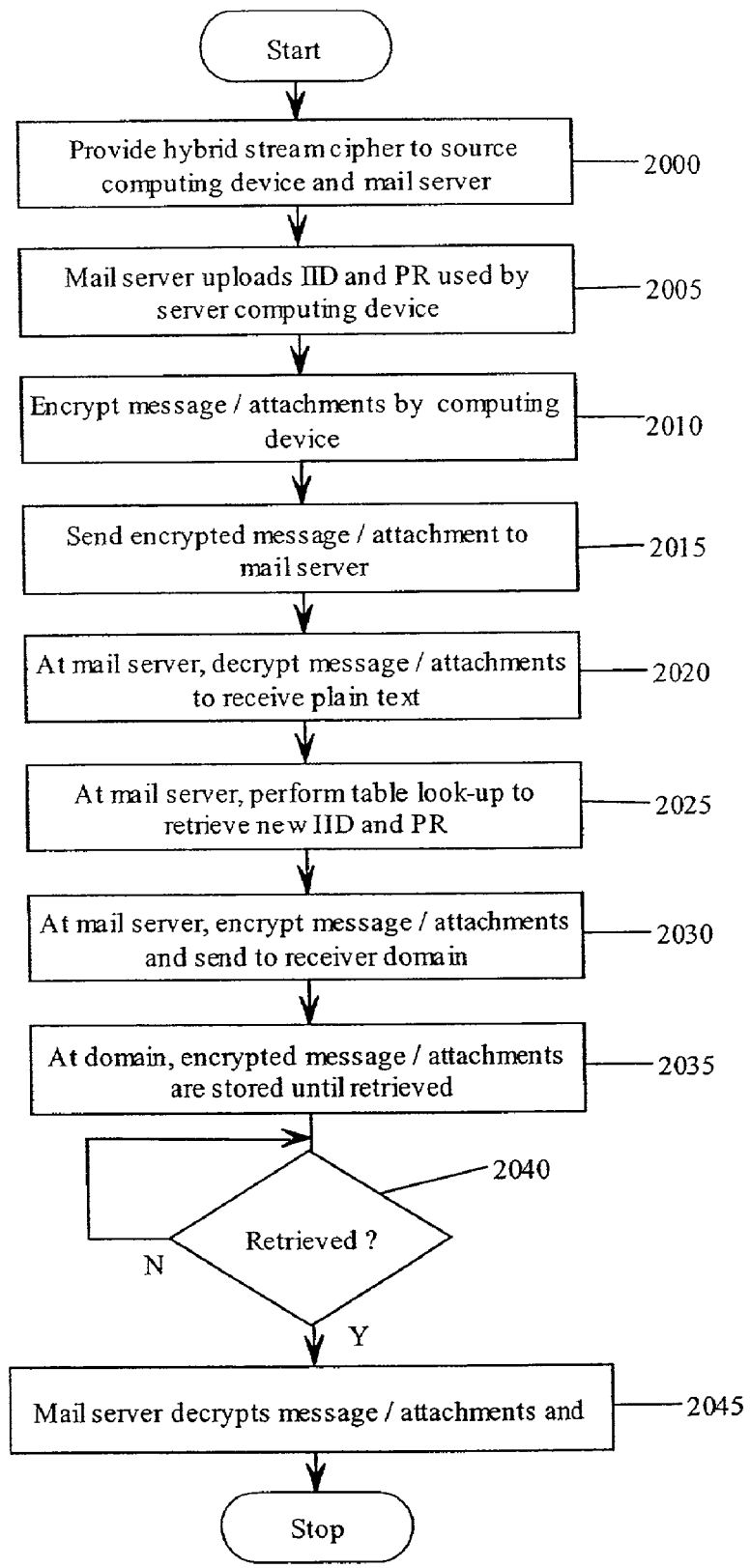
FIG. 30 is a first embodiment of the e-mail application system utilizing the invention.

As shown in FIG. 30, a first embodiment of the e-mail application scenario is shown. Herein, the state-varying hybrid stream cipher is integrated into a source computing device and a mail server (see item 2000). The mail server uploads an IID and a percentage of random data (PR) to be used to source computing device (see item 2005). When encryption is desired, an encryption function loaded on the source computing device utilizes the IID and PR parameters to encrypt a message and/or attachments to the message (see item 2010). The encrypted message is sent to the mail server (see item 2015).

At the mail server, the encrypted message is received and the information associated with the message is decrypted to recover the plain text version (see item 2020). Thereafter, the mail server performs a "look-up" of a table, which has been initialized to contain other secure domains that the current mail server communicates. From the table, a new IID and PR are retrieved (see item 2025). The mail server encrypts the message using the new set of parameters (IID and PR) and sends it through the normal communication protocol (e.g., SMTP) to the receiver's domain (see item 2030). Optionally, if the recipient domain is not on the list, the mail server sends it as plain text. Of course, this feature can be changed based on the requirements of the existing infrastructure to which it is applied.

The recipient domain stores the encrypted message in the server (see item 2035). Recipient (user) logs on to his domain to read his electronic mail "e-mail" (see item 2040). This prompts the mail server to read the stored message for recipient, decrypts it by looking up the table (initialized to contain other secure domains that the current mail server receives data from), encrypts it with the IID and PR sent to the user when he logged on (see item 2045).

Figure 31:
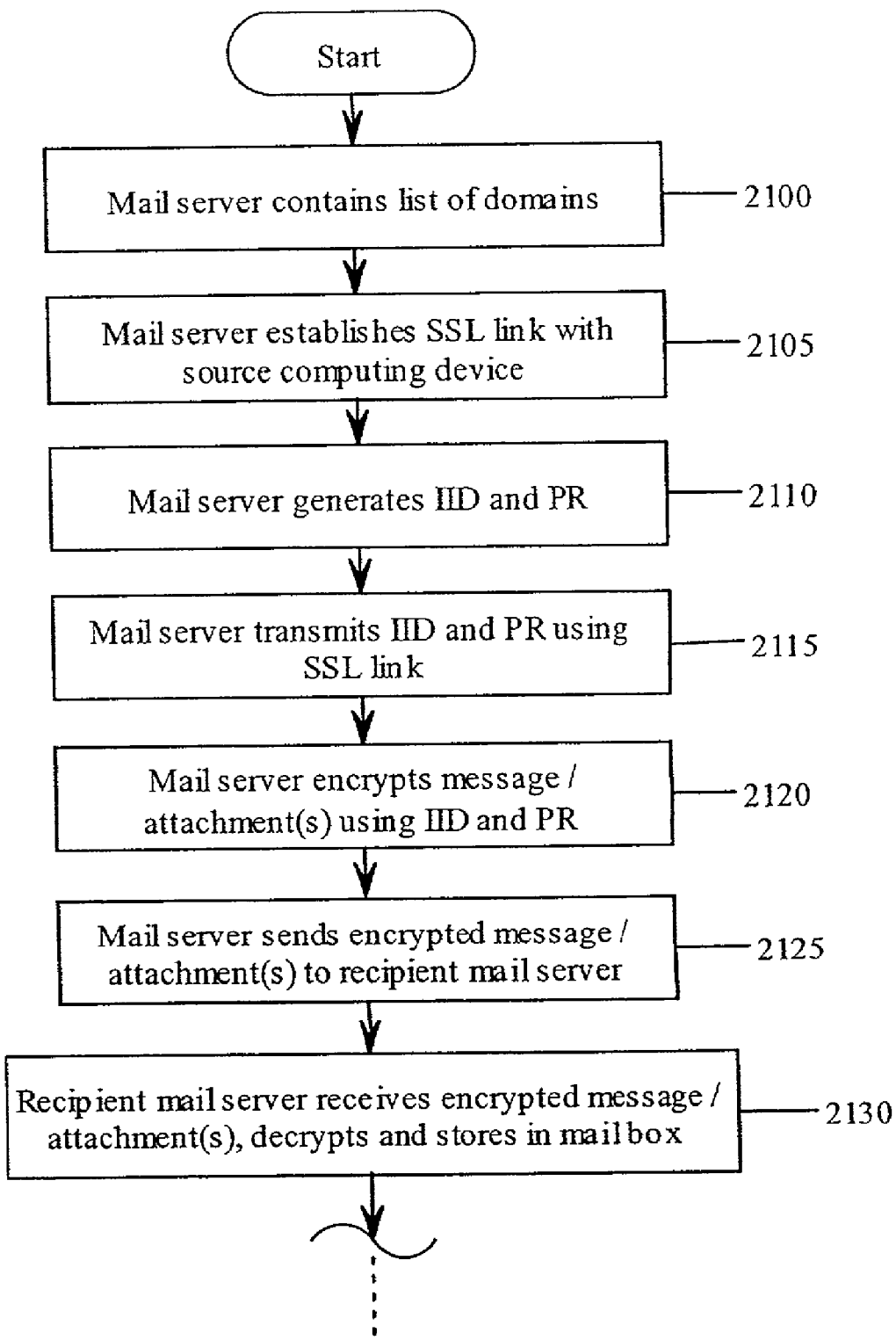
FIG. 31 is a second embodiment of the e-mail application system utilizing the invention.

As shown in FIG. 31, a second embodiment of an e-mail application scenario is shown. For this embodiment, an assumption is made that there is no problem transmitting data unencrypted from the source computing device to the mail server. Herein, the mail server contains a list of domains where data is to be transmitted securely (see item 2100). The mail server establishes an SSL transaction link with the source computing device after a DNS look up (see item 2105). It randomly generates an IID and a PR in a range, and transmits this data using SSL (see items 2110 and 2115). The mail server then encrypts the message and attachments and sends it to the recipient mail server (see items 2120 and 2125). Recipient mail server receives the data, decrypts and stores it in mailbox for the recipient (see item 2130). The rest of the process of data transfer from mail server to source computing device remains unchanged as described in FIG. 30.

A third embodiment of an e-mail application scenario is contemplated but is not shown. Herein, data transfers between the source computing device and the mail server are performed as described in FIG. 30. For data transfers between the mail server and a recipient mail server, these transfers are performed as described in FIG. 31.

Although not shown, an exemplary embodiment of a secure socket layer (SSL) is contemplated. Initially, authentication operations are performed under SSL. In particular, a client computing device sends a request to connect to the secure server. In response, the secure server sends its pre-signed digital certificate to the client computing device in accordance with a handshake procedure. The client computing device verifies the digital certificate issued. For example, the client computing device may compare the information in the digital certificate with information received concerning the site (e.g., its domain name and its public key). If the information matches, the client computing device accepts the site as authenticated and the SSL routine proceeds. Otherwise, the client computing device can cancel the connection or proceed without authentication.

Thereafter, a session key is generated by client computing device and exchanged with the server using the server's public key (or asymmetric methods). The client computing device compares the information in the certificate with the information it just received concerning the site: its domain name and its public key. If the information matches, the client computing device accepts the site as authenticated. The client computing device indicates to the server what ciphers, or types of encryption keys, it can communicate with. In response, the server chooses one of the common cipher(s) and informs the client computing device. Using that cipher, the client computing device generates a session key (a symmetric encryption key used only for this transaction) and encrypts it using the server's public key. The client computing device sends the encrypted session key to the server. The server recovers the session key for subsequent encryption/decryption during this communication session.

As one user enters data on the web page and begins encryption, where all the items entered by the user are encrypted into cipher text. Herein, the client computing device and the server use the session key to encrypt or decrypt the data. For example, a user may be required to enter his or her name, credit card number, date of birth, telephone number, e-mail and item purchased (name of item or catalog number) when purchasing items over the Internet. Once the user selects the "Submit" button on browser, the client encrypts the data using a symmetric encryption method (RC4, IDEA, triple DES). Here, the name, credit card number, e-mail or other information is encrypted with the same encryption method.

One fundamental problem with this conventional encryption scheme is that the level of security offered to a credit card number is same as the level of security offered to the name of a person. In accordance with the state-varying hybrid stream cipher, however, different levels of security may be created for different items in the SSL transaction. For example, the name and date of birth of the user may be assigned the lowest levels of security (level 1) while credit card number as well as contact information (e.g., telephone number or e-mail address) may be assigned substantially higher levels of security, and thus, require a higher percentage of randomness to be entered.

III. Illustrative User Interfaces for Computing Devices Employing The State-Varying Hybrid Stream Cipher Referring now to FIG. 32, an exemplary embodiment of a user interface for a computing device utilizing the state-varying hybrid stream cipher is shown. The user interface is configured to enable one or more of the following salient features to be practiced: (1) track files used daily; (2) encrypt and/or decrypt of one or more files on the hard disk; (3) export the files securely to any media; and (4) import files and decrypt/encrypt securely to a laptop or hard disk.

Figure 32:
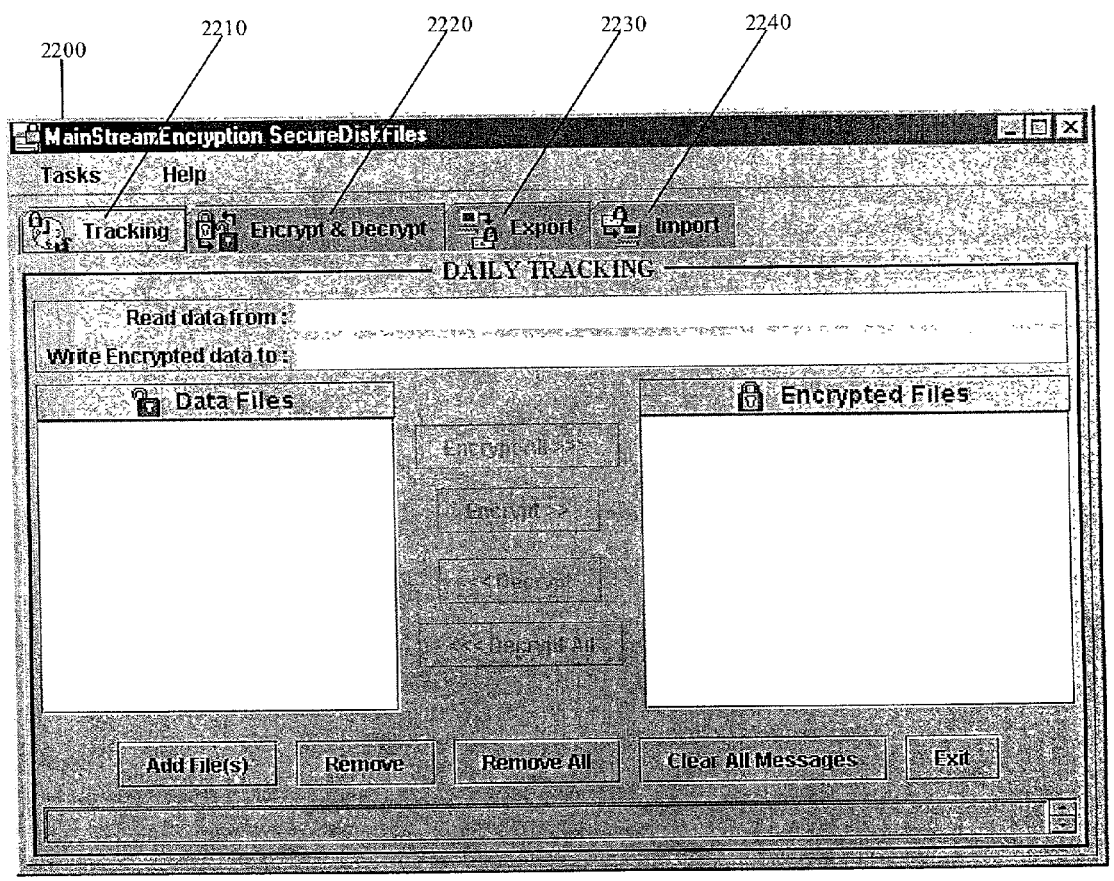
FIG. 32 is an exemplary embodiment of a user interface for a computing device utilizing the state-varying hybrid stream cipher.

As shown in FIG. 32, the user interface includes a menu window 2200 that allows for the selection of one or more of the following tab buttons: (i) Tracking 2210, (ii) Encrypt & Decrypt 2220, (iii) Export 2230, and (iv) Import 2240. When selected, the Tracking tab button 2210 lists files used every day as well as enables encryption for data storage and decryption for reading/editing data within the file. The Encrypt & Decrypt tab button 2220 is used to encrypt and decrypt directories and groups of files. The Export tab button 2230, when selected, is used for create files to be exported while the Import tab button 2240 is used to import files and store them as encrypted files on the hard disk.

Figure 33:
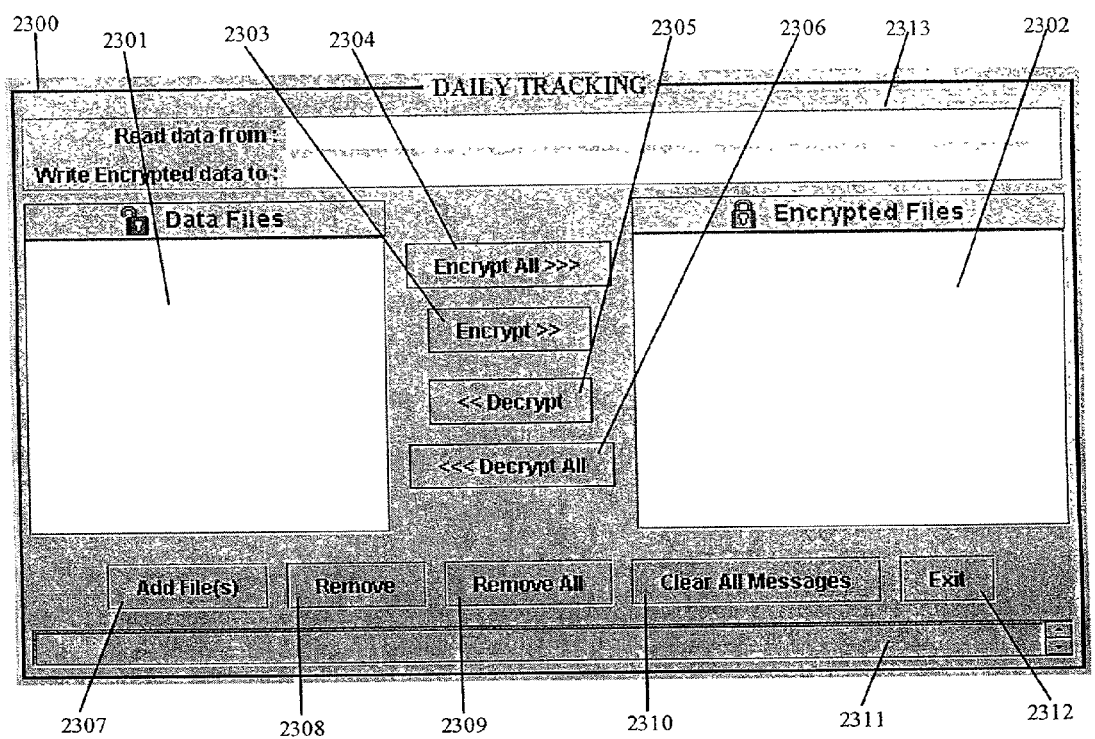
FIG. 33 is an exemplary embodiment of a window for encryption and decryption of repeatedly accessed files.

Referring now to FIG. 33, an exemplary embodiment of a window 2300 for encryption and decryption of repeatedly accessed files is shown. When the user wants to read or edit a particular file, the user decrypts the particular file and re-encrypts the file, and perhaps other decrypted files. The particular functionality of selectable items viewable on the window 2300 is described below.

The "Data Files" list 2301 contains list of data files that are tracked. This is the main tracking list. A file placed on this list is re-encrypted at the end of the day or after completion of a task involving such file.

The "Encrypted Files" list 2302 contains the list of encrypted files. A user would need to decrypt a file of list 2302 before reading and/or editing data in this file.

The "Encrypt All" button 2303, when selected, encrypts all of the files in the Data Files list 2301. After encryption, the files are displayed in the Encrypted Files list 2302.

The "Encrypt" button 2304, when selected, encrypts the file(s) selected in the Data Files list 2301. After encryption, the selected file(s) is displayed in the Encrypted Files list 2302.

The "Decrypt" button 2305, when selected, decrypt file(s) selected in the Encrypted Files list 2302. After decryption, the file(s) is displayed in the Data Files list 2301.

The "Decrypt All" button 2306, when selected, decrypts all of the files in the Encrypted Files list 2302. After decryption, the files are displayed in the Data Files list 2301.

The "Add File(s)" button 2307, when selected, allows the user to add files to the tracking list. In particular, if the selected file is not encrypted, it is displayed in Data Files list 2301. If the selected file is encrypted, it is displayed in the Encrypted Files list 2302.

The "Remove" button 2308, when selected, allows the user to remove selected items from the tracking list. If files are selected in the Data Files list 2301, they are removed from the Data Files list 2301. Similarly, if files are selected in the Encrypted Files list 2302, items are removed from the Encrypted Files list 2302.

The "Remove All" button 2309, when selected, allows the user to remove all files from the tracking list. If the focus is in the Data Files list 2301, all items in the Data Files list 2301 are removed. Similarly, if the focus is in the Encrypted Files list 2302, all items in the Encrypted Files list 2302 are removed.

The "Clear All Messages" button 2310, when selected, erases all the messages in the status box at the bottom of the application.

The "Status" bar 2311 displays messages during use of the application.

The "Exit" button 2312, when selected, causes the application to close. The application exits if there are no files in the Data Files list 2301. If there are files in the Data Files list 2301, the application prompts the user for confirmation.

The "File Information" field 2313 features a plurality of text fields to display the source file and the destination file for encryption or decryption.

Figure 34:
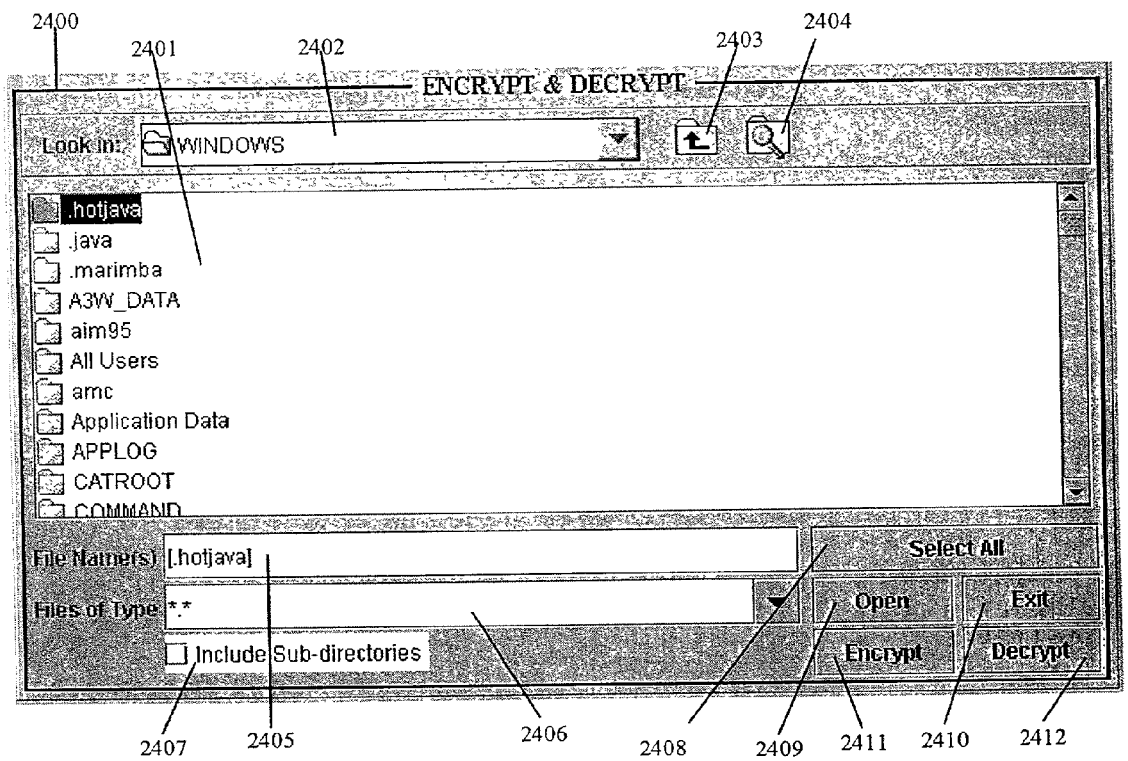
FIG. 34 is an exemplary embodiment of an Encrypt & Decrypt window.

Referring to FIG. 34, an exemplary embodiment of an Encrypt & Decrypt window 2400 is shown. For this embodiment, the Encrypt & Decrypt (E&D) window 2400 appears when the user selects the "Encrypt & Decrypt" tab button 2220 as shown in FIG. 32. The Encrypt & Decrypt functionality allows the user to encrypt or decrypt groups of files and directories. The particular functionality of selectable items viewable on the E&D window 2400 is described below.

The "Directory" listing 2401 displays list of directories and files in the current directory.

The menu box 2402 is a drop down listing that contains the roots of the file system and the path of the current directory. The user can select any directory in the current path or root of the file system.

The parent directory 2403 image button, when selected, causes the parent directory of the current displayed directory to be displayed.

The Go-To directory image button 2404, when selected, presents a tree hierarchical view of all the directories in the local file system. The user is able to select the directory, causing a subsequent display of all directories and files in the selected directory. This enables the user to select a directory more easily.

The Selected Directories and Files text field 2405 contains the list of files and directories selected by the user. In one embodiment, the selected directories are enclosed with square brackets. Commas separate all selected entries.

The "File Filter" menu 2406 is a drop down list that contains commonly used filters. The File Filter menu 2406 specifies the types of files that are to be displayed in the Directory listing 2401.

The "Include Sub-directories" option box 2407, when selected, causes operations to be performed on files in the sub-directories of the current directory. If the option is not selected, only files in the displayed directory are used.

The "Select All" button 2408, when selected, enables all files in the directory to be displayed.

The "Open" button 2409, when selected, enables display of the contents of the selected directory. The user can also open a directory by double clicking the directory in the list.

The "Exit" button 2410, when selected, causes the application to close. The application exits if there are no files in the data files tracking list. If there are files in the data files tracking list, the application prompts the user for confirmation.

The "Encrypt" button 2411, when selected, causes encryption of the selected files. Files encrypted will have ".enc" appended to the filename. If a directory is selected, it encrypts files in that directory. Note that the files encrypted depend on the filter selected. If "*.dat" was selected in the filter, only files with the "dat" extension are encrypted in the directory. If the Include Sub-directories option box is selected, then all files in the subdirectories of the selected directory are encrypted. Files with extension "enc" will not be encrypted again.

The "Decrypt" button 2412, when selected, decrypts the selected files. If a directory is selected, it decrypts files in that directory. Note that the files decrypted depend on the filter selected. If "*.enc" was selected in the filter, only files with the "enc" extension are decrypted in the directory. If the "Include Sub-directories" option box is selected, then all files in the subdirectories of the selected directory are decrypted. Decrypting of files that do not have an extension of "enc" is not possible, and hence is skipped.

Figure 35:
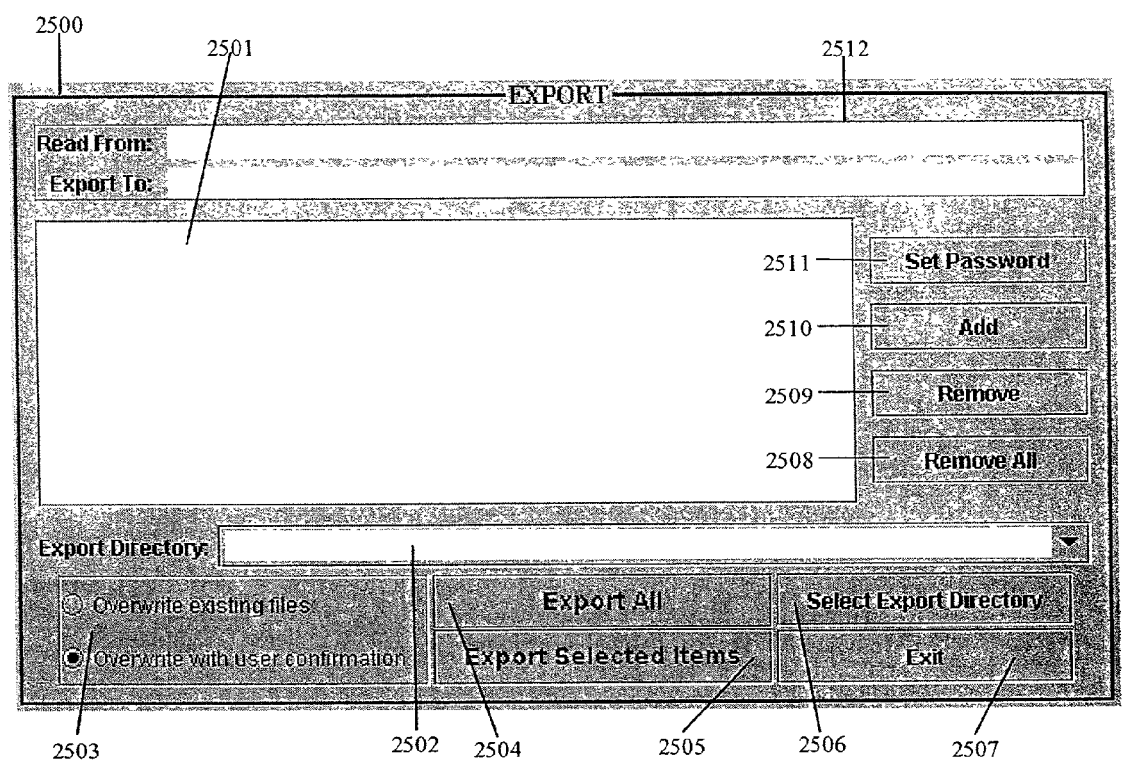
FIG. 35 is an exemplary embodiment of an Export window.

Referring now to FIG. 35, an exemplary embodiment of an Export window 2500 is shown. When a user wants to copy files (or data) from one computing device to another, the files are copied onto a floppy or sent over a network. To allow users to transport the data more safely and securely, an export feature is provided for the user interface of FIG. 32. Files exported with the application are appended with the extension of "xnc". The particular functionality of selectable items viewable on the window 2500 is described below.

The "Export Files" list 2501 is a field that is used to display a listing of files selected for export.

The "Export Directory" item 2502 is a drop-down list containing a history of exported directories where the exported files are stored. The directory displayed is the current export directory.

The "Overwrite" option 2503 allows the user to select confirmation in the case when the destination file exists. If the option "Overwrite exiting files" is selected, then the destination file is overwritten without user confirmation. However, if the user had selected the option "Overwrite with user confirmation", a dialog pops up in the event that the file to be exported is present in the export directory for confirmation.

The "Export All" button 2504, when selected, enables all the files in the Export Files list 2501 to be exported. Files are zipped and encrypted to reduce the amount of storage space requirements of media, for example a floppy disk.

The "Export Selected Items" button 2505, when selected, enables only selected files in the Export Files list 2501 to be exported.

The "Select Export Directory" button 2506, when selected, presents the user with a tree view of the directory structure of the local file system. This allows the user to select the directory for storing exported files. The user can also choose the export directory from a history of export directories in the Export Directory menu 2502.

The "Exit" button 2507, when selected, closes the application. The application exits if there are no files in the data files tracking list. If there are files in the data files tracking list, the application prompts the user for confirmation.

The "Remove All" button 2508, when selected, enables the user to remove all the files from the Export Files list 2501.

The "Remove" button 2509, when selected, enables the user to remove the selected files from Export Files list 2501.

The "Add" button 2510, when selected, enables the addition of files to the Export Files list 2501.

The "Set Password" button 2511, when selected, enables the setting of the password for export. After setting the password, the caption of the Set Password tab button 2511 changes to "Change Password", and allows the user to change the export password. The most recently set password is used in the export process.

The "File Information" field 2512 displays the source file and the destination file for export.

Figure 36:
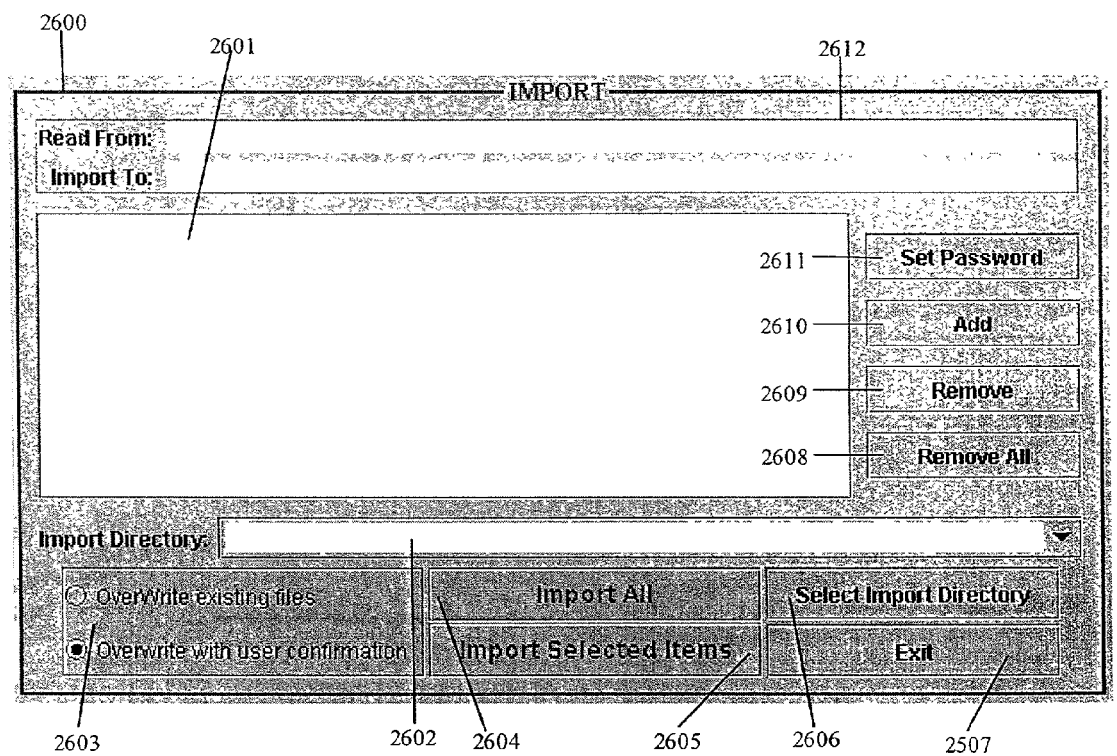
FIG. 36 is an exemplary embodiment of an Import window.

Referring now to FIG. 36, an exemplary embodiment of an Import window 2600 is shown. Selection of the Import tab button 2240 of FIG. 32 allows files exported from a first computing device to be imported to a second computing device. "Import" is the exact reverse of export. The user sets the password for import. The password needs to be the same additional password the user specified at the time of export. The application first decrypts the file, unzips the file, and finally encrypts and stores the file on local storage. If the import password is different from the exported password, an import of the file will fail. The particular functionality of selectable items viewable on the Import window 2600 is described below.

The "Import Files" list 2601 is a field that is used to display a listing of files selected for import.

The "Import Directory" item 2602 is a drop-down list containing a history of imported directories where the imported files are stored. The directory displayed is the current import directory.

The "Overwrite" option 2603 allows the user to select confirmation in the case when the destination file exists.

The "Import All" button 2604, when selected, enables all the files in the Import Files list 2601 to be imported.

Import Selected Items button 2605, when selected, imports the selected file(s) in the list.

The "Select Import Directory" button 2606, when selected, presents the user with a tree view of the directory structure of the local file system. This allows the user to select the directory for storing imported files. The user can also choose the import directory from a history of import directories in the Import Directory list 2602.

The "Exit" button 2607, when selected, closes the application. The application exits if there are no files in the data files tracking list. If there are files in the data files tracking list, the application prompts the user for confirmation.

The "Remove All" button 2608, when selected, enables the user to remove all the files from the Import Files list 2601.

The "Remove" button 2609, when selected, enables the user to remove the selected files from Import Files list 2601.

The "Add" button 2610, when selected, enables the addition of files to the Import Files list 2601.

The "Set Password" button 2611, when selected, enables the setting of the password for import. After setting the password, the caption of the Set Password tab button 2611 changes to "Change Password", and allows the user to change the import password. The most recently set password is used in the import process.

The "File Information" field 2612 displays the source file and the destination file for import.

IV. Digital Rights Management Scenario(Selling Music Online with Copyright Protection).

In accordance with another embodiment, the state-varying hybrid stream cipher functionality may be used for digital rights management to sell music digitally and securely through the Internet. The state-varying hybrid stream cipher allows for the addition of copyright information associated with the music as a digital signature that includes one or more of the following: (i) the entity or person that sold the music, (ii) the person or entity that owns the music property rights, and (iii) the entity or person to whom the digital music was sold. This copyright information is enclosed as plain text, and modifying any part of the plain text would prevent the music from being played by the media player that includes the state-varying hybrid stream cipher. A second important factor is that the music sold to one person for playback on a selected player can not be used on another player. This is accomplished by encrypting each player with the IID of a particular user.

Figure 37:
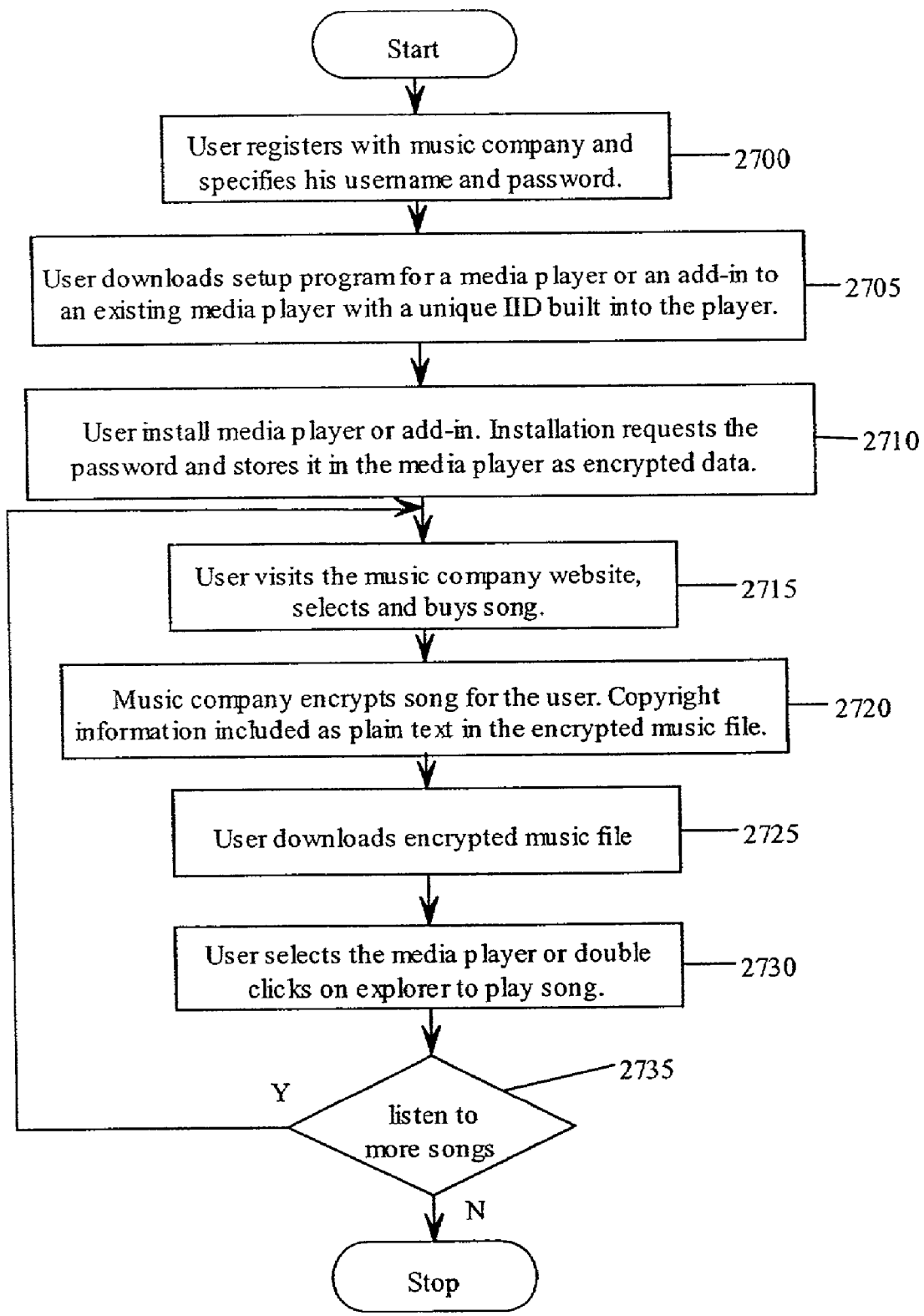
FIG. 37 is an exemplary embodiment of a mechanism for securely selling digital music online.

As shown in FIG. 37, an exemplary embodiment of a mechanism for securely selling digital music online is shown. In the first operation, a new user visits the music company's website and registers with the music company (see item 2700). Registration involves the user choosing a user name and password. The user then downloads a setup program from the music company (see item 2705), which installs a new media player or a plug-in to an existing media player, unique to the user. Each user is allocated a unique IID by the music company. The setup requests the registrant for his password, and then the program installs a new media player or perhaps a plug-in to an existing media player (see item 2710), which contains the state-varying hybrid stream cipher. The media player or plug-in contains the IID and password stored securely in the media player, perhaps as encrypted data. Thus, each user will have a unique media player.

Now, the user is ready to download and listen to songs from the music company. User visits the music company website, selects and buys song (see item 2715). The music company encrypts song for user (see item 2720). The copyright information may be collected and used as a digital signature at the time of encryption. For the purpose of illustration, consider the copyright message for the song "Harmony", sung by Brittany Spears, sold by Time Warner Inc. and purchased by user "Tom" could be the following: "Copyright (C) of Time Warner Inc., Harmony by Brittany Spears sold to user Tom tw12313".

This copyright information is stored in the encrypted music file as plain text, and is not visible in the encrypted data. Modifying the copyright information will not allow the encrypted music file to be decrypted, and hence cannot be heard using the individual media player. Any image or logo, or a sequence of bytes may be added to the digital signature. The IID allocated to the user by the music company is used in the state-varying hybrid stream cipher for encryption. The password selected by the user at the time of registration is used as an encryption key.

Thereafter, the user downloads the encrypted music file (see item 2725). User selects the song by double clicking the song or by loading the song into the media player (see item 2730). The media player contains the state-varying hybrid stream cipher decryption routine. The media player first reads the copyright information from the encrypted music file, displays the copyright and then decrypts the music and plays it. If the copyright information has been changed or modified, the media player will not be able decrypt, and hence will not play the song. Another important benefit accorded is that the music will not decrypt on any other user's media player. If the user wants to listen to more songs items 2715 to 2730 are repeated. Once a song has been downloaded to the user computer, the user could listen to it any number of times. However, the user will not be able to distribute or sell the music by removing the copyright included in the song.

Thus, the use of the state-varying hybrid stream cipher offers new technology for digital rights management. A similar process could be repeated for selling movies online in the future. Though not described in detail, this state-varying hybrid stream cipher may be used in a manner similar to digital rights management discussed above to sell software encrypted online for a particular user or a company. The decryption function would then be included in the install program to decrypt and install the program.

For instance, another embodiment using the state-varying hybrid stream cipher involves for software copyright protection. The retailer or seller buys the software and stores on a secure computing device such as a server. The retailer may connect to the company that manufactures the software instead of storing it on his secure server. A seller or buyer visits the retailer and buys the software. The server obtains information about the user (for example, his name and telephone number), composes a copyright message including the retailer and the buyer information. The copyright message with a uniquely identified IID is used to encrypt the software sold to the user. The unique serial number that accompanies the compact disk (CD) is used as an encryption key. The IID and decryption routine are built into the setup program.

The copyright message as plain text, encrypted software data, and the setup program including the state-varying hybrid stream cipher are copied to a CD and sold to the user. This enables any software manufacturing company to customize each copy sold to the users, and since each copy includes a unique copyright message, it becomes difficult for copying and reselling. Modifying or removing the copyright message will ensure that the program will not get installed. Since each copy of the software was customized to a user, it will be easy to track the source of illegal copies.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it may be possible to implement the invention or some of its features in hardware, firmware, software or a combination thereof where the software is provided in a processor readable storage medium such as a magnetic, optical, or semiconductor storage medium, or may be use a different set of functions or pseudo-random sequences, and the like.

The invention claimed is:

1. A state-varying hybrid stream cipher operating within a computing device, comprising:
   a first software routine to divide incoming plain text into variable-sized blocks with each block varying in size in response to variations of an internal state of the computing device, the internal state of the computing device being altered by the incoming plain text; and
   a second software routine to convert the plain text into cipher text based on an encryption key, an internal identifier and the internal state of the computing device.

2. The state-varying hybrid stream cipher of claim 1, wherein the first software routine produces the variable-sized blocks based on the encryption key, the internal identifier, an output of a first non-linear function and the internal state of the computer device.

3. The state-varying hybrid cipher of claim 2, wherein each current block of the plain text is determined by (i) producing a pseudo-random sequence using a second non-linear function including the encryption key, the internal identifier and the output of the first non-linear function as inputs and (ii) accessing contents of the pseudo-random sequence as a number of data elements of the plain text forming the current block.

4. The state-varying hybrid cipher of claim 1 further comprising:
   a third software routine to determine if a plurality of random data elements are to be distributed within the cipher text and to compute a hash digest of the random data elements.

5. The state-varying hybrid cipher of claim 4 further comprising a fourth software routine to perform a first shuffling operation on the internal state of the computing device based on the encryption key so that a single bit modification of the encryption key requires complete recalculation of the internal state of the computing device used to encrypt the random data elements.

6. The state-varying hybrid cipher of claim 4, wherein the second software routine further performs a second shuffling operation on the internal state of the computing device prior to encrypting the distribution of random data elements based on the encryption key and the internal identifier to mitigate a likelihood of prediction of the internal state of the computing device upon knowledge of the encryption key.

7. The state-varying hybrid cipher of claim 4, wherein the third software routine determines a statistical amount of random data elements distributed within the cipher text is programmable based on a percentage value entered by a user.

8. The state varying hybrid cipher of claim 7, wherein the distribution of random data elements within the cipher text is based on the encryption key, the internal identifier and internal state of the computing device.

9. The state-varying hybrid cipher of claim 1 further comprising a third software routine to distribute error correcting codes in the cipher text in order to correct modifications.

10. The state-varying hybrid cipher of claim 1, wherein the internal state of the computing device is periodically modified without user intervention.

11. The state-varying hybrid cipher of claim 1, wherein the internal state of the computing device is initialized by an Initialization Vector being a seed value.

12. A computing device comprising:
a memory; and
logic coupled to the memory, the logic to perform a state-varying stream cipher operation using an encryption key on input data segmented into at least three random sized blocks with each block varying in length in response to variations of an internal state of the computing device altered by the incoming plain text, the logic using an initialization vector being a seed value only during an encryption process with no corresponding seed value being used during a decryption process.

13. The computing device of claim 12, wherein the stream cipher operation involves encryption.

14. The computing device of claim 12, wherein the logic is an integrated circuit.

15. The computing device of claim 12, wherein the internal state of the computing device varies over time without user intervention.

16. The computing device of claim 15, wherein the variation of the internal state of the computing device is periodic being set at a time that an encryption process begins for each block of input data.

17. The computing device of claim 12, wherein the computing device is one of a smart card and an operating system.

18. The state-varying hybrid cipher of claim 1, wherein a third software routine is a mixing function that dynamically positions encrypted plain text of the cipher text based on the internal state of the computing device.

* * * * *